US011087561B2

(12) United States Patent
Fu et al.

(10) Patent No.: US 11,087,561 B2
(45) Date of Patent: Aug. 10, 2021

(54) THREE-DIMENSIONAL SKETCHING IN MOBILE AUGMENTED REALITY

(71) Applicant: City University of Hong Kong, Kowloon (HK)

(72) Inventors: Hongbo Fu, Shatin (HK); Kin Chung Kwan, Shatin (HK)

(73) Assignee: City University of Hong Kong, Kowloon (HK)

( * ) Notice: Subject to any disclaimer, the term of this patent is extended or adjusted under 35 U.S.C. 154(b) by 0 days.

(21) Appl. No.: 16/510,561

(22) Filed: Jul. 12, 2019

(65) Prior Publication Data
US 2021/0012574 A1   Jan. 14, 2021

(51) Int. Cl.
*G06T 19/20* (2011.01)
*G06T 15/20* (2011.01)
*G06T 19/00* (2011.01)
*G06F 3/01* (2006.01)

(52) U.S. Cl.
CPC .............. *G06T 19/20* (2013.01); *G06F 3/017* (2013.01); *G06T 15/205* (2013.01); *G06T 19/006* (2013.01)

(58) Field of Classification Search
None
See application file for complete search history.

(56) References Cited

U.S. PATENT DOCUMENTS

| 2002/0140666 | A1* | 10/2002 | Bradski | G06F 1/1684 345/156 |
| 2009/0300553 | A1* | 12/2009 | Pettigrew | G06T 11/20 715/856 |

OTHER PUBLICATIONS

Tang et al. (Learning to Create 3D Models via an Augmented Reality Smartphone Interface, IEEE, 2015) (Year: 2015).*
Arora et al., "Experimental Evaluation of Sketching on Surfaces in VR", Experimental Evaluation of Sketching on Surfaces in VR, May 6-11, 2017, pp. 5643-5654.
Arora et al., "SymbiosisSketch: Combining 2D & 3D Sketching for Designing Detailed 3D Objects in Situ", URL : http://dx.doi.org/10.1145/3173574.3173759, In CHI '18, Apr. 21-26, 2018, 16 pages.
Zane Assets, "Paint Space AR", https://www.paintspacear.com/, 2008, retrieved Feb. 20, 2020, 6 pages.

(Continued)

*Primary Examiner* — Kyle Zhai
(74) *Attorney, Agent, or Firm* — Amin, Turocy & Watson, LLP

(57) ABSTRACT

An enhanced multimodal interface and various enhanced tools are provided to enable a user to create 3-D augmented reality (AR) sketches using a mobile device. Mobile device can comprise a sketch generator component (SGC) that can integrate multiple sources of inputs with enhanced tools, comprising enhanced 3-D snapping and proxy creation tools. The inputs comprise touch screen data, motion data, and image data from a camera. SGC can provide the interface, which can support absolute and relative drawing. Via the interface, the user can select and use desired enhanced tools to create a 3-D AR sketch that augments visual content of a real-world environment captured by the camera with drawing content added by the user using the enhanced tools. SGC enables a user to create desired strokes, planar or curved surface proxies, snapping points, or other sketch features, wherein proxies can align with real-world surfaces.

31 Claims, 23 Drawing Sheets

(56) References Cited

OTHER PUBLICATIONS

Bae et al., "EverybodyLovesSketch:3D Sketching for a Broader Audience", URL : https://doi.org/10.1145/1622176.1622189, In UIST '09, Oct. 4-7, 2009, 10 pages.
Bergig et al., "In-Place 3D Sketching for Authoring and Augmenting Mechanical Systems", URL : http://citeseerx.ist.psu.edu/viewdoc/download?doi=10.1.1.476.86&rep=rep1&type=pdf, In ISMAR 2009, Oct. 19-22, 2009, pp. 87-94.
Bier, Eric A., "Snap-Dragging in Three Dimensions", URL : https://doi.org/10.1145/91394.91446,1990, In ACM SIG-GRAPH Computer Graphics, vol. 24. 193-204.
Bourguignon et al., "Drawing for illustration Annotation in 3D", In Computer Graphics Forum, vol. 20. Wiley Online Library, DOI: 10.1111/1467-8659.00504, 2001, 9 pages.
Piya et al., "RealFusion: An Interactive Workflow for Repurposing Real-World Objects towards Early-stage Creative Ideation", RealFusion: An Interactive Workfow for Repurposing Real-World Objects towards Early-stage Creative Ideation, 2016, pp. 85-92.
Felice et al., "Beyond Snapping: Persistent, Tweakable Alignment and Distribution with StickyLines", DOI: 10.1145/2984511.2984577, In UIST 2016. ACM, Oct. 2016, pp. 1-12.
Deering, Michael F., "HoloSketch: A Virtual Reality Sketching/Animation Tool", URL : https://cumincad.architexturez.net/system/files/pdf/a91e.content.pdf, ACM TOCHI 2, Sep. 1995, vol. 2, No. 3, pp. 220-238.
Dorsey et al., "The Mental Canvas: A Tool for Conceptual Architectural Design and Analysis", DOI 10.1109/PG.2007.64, 2007, In PG '07. pp. 201-210.
Dorta et al., "Hyve-3D and the 3D Cursor:Architectural co-design with freedom in Virtual Reality", URL : https://doi.org/10.1177/1478077116638921, International Journal of Architectural Computing 14, 2, 2016, pp. 87-102.
Fiser et al., "Advanced Drawing Beautification with ShipShape", URL : https://doi.org/10.1016/j.cag.2016.02.003, Apr. 8, 2016, Computers & Graphics 56, 14 pages.
Google, "Just a Line", URL : https://justaline.withgoogle.com/, Mar. 2018, retrieved Feb. 19, 2020, 2 pages.
Grimm et al., "Just Draw It: A 3D sketching System", URL : https://openscholarship.wustl.edu/cse_research/85, 2012, In SBIM '12. Eurographics Association, 16 pages.
Grossman et al., "Creating Principal 3D Curves with Digital Tape Drawing", URL : https://doi.org/10.1145/503376.503398, In CHI '02, Apr. 20-25, 2002, vol. No. 4, Issue No. 1, pp. 121-128.
Huo et al., "Window-Shaping: 3D Design Ideation by Creating on,Borrowing from, and Looking at the Physical World", URL : http://dx.doi.org/10.1145/3024969.3024995, In Proceedings of the Tenth International Conference on Tangible, Embedded, and Embodied Interaction. ACM, Mar. 20-23, 2017, pp. 37-45.
Jackson et al., "Lift-Off: Using Reference Imagery and Freehand Sketching to Create 3D Models in VR", IEEE TVCG 22, 10 pages.
Kallio, Kiia, "3D6B Editor: Projective 3D Sketching with Line-Based Rendering", Eurographics Workshop on Sketch-Based Interfaces and Modeling, 2005, 7 pages.
Keefe et al., "CavePainting: A Fully Immersive 3D Artistic Medium and Interactive Experience", In Proceedings of the 2001 symposium on Interactive 3D graphics, ACM, 2001, pp. 85-93.
Keefe et al., "Drawing on Air: Input Techniques for Controlled 3D Line Illustration", IEEE Transactions on Visualization and Computer Graphics, URL : http://vis.cs.brown.edu/docs/pdf/Keefe-2007-DOA.pdf, vol. 13, No. 5, Sep./Oct. 2007, pp. 1067-1081.
Kim et al., "Agile 3D Sketching with Air Scaffolding", CHI 2018 Demonstration, URL : https://doi.org/10.1145/3170427.3186522, Apr. 21-26, 2018, 1 page.
Kim et al., "SketchingWithHands: 3D Sketching Handheld Products with First-Person Hand Posture", URL : http://dx.doi.org/10.1145/2984511.2984567, In UIST '16. ACM, Oct. 16-19, 2016, pp. 797-808.
Lakatos et al., "T (ether): Spatially-aware handhelds, gestures and proprioception for multi-user 3D modeling and animation", URL : https://static.googleusercontent.com/media/research.google.com/en//pubs/archive/43152.pdf, In Proceedings of the 2nd ACM symposium on Spatial user interaction. ACM, Oct. 4-5, 2014, pp. 90-93.
Li et al., "High-precision, consistent EKF-based visual-inertial odometry", URL : http://ijr.sagepub.com/content/32/6/690, The International Journal of Robotics Research 32, 6, DOI: 10.1177/0278364913481251, Jun. 7, 2013, pp. 691-711.
Li et al., "SweepCanvas: Sketch-based 3D Prototyping on an RGB-D Image", URL : http://dx.doi.org/10.1145/3126594.3126611, In UIST 2017, Oct. 22-25, 2017, 13 pages.
Lipson et al., "Optimization-Based Reconstruction of a 3D Object From a Single Freehand Line Drawing", Computer-Aided Design, vol. 28, Issue 8, Aug. 1996, pp. 651-663.
Liu., "AR+Brush", URL : https://itunes.apple.com/nz/app/ar-brush/id1273579764?mt=8, 2018, retrieved Feb. 20, 2020, 3 pages.
Nee et al., "Augmented reality applications in design and manufacturing", CIRP Annals—Manufacturing Technology 61, URL : https://doi.org/10.1016/j.cirp.2012.05.010,2012, pp. 657-679.
Nerurkar et al., U.S. Appl. No. 15/595,617, "System and Method for Concurrent Odometry and Mapping", Nov. 23, 2017, 49 pages.
Nuernberger et al., "SnapToReality:Aligning Augmented Reality to the Real World", DOI: http://dx.doi.org/10.1145/2858036.2858250, In Proceedings of the 2016 CHI Conference on Human Factors in Computing Systems. ACM, 2016, pp. 1233-1244.
Paczkowski et al., "Insitu: Sketching Architectural Designs in Context", ACM Transactions on Graphics, vol. 30, No. 6, Article 182, Publication date: Dec. 2011, 10 pages.
Vinayak et al., "MobiSweep: Exploring Spatial Design Ideation Using a Smartphone as a Hand-held Reference Plane", URL : DOI:http://dx.doi.org/10.1145/2839462.2839490, In TEI'16, Feb. 14-17, 2016, pp. 12-20.
Sachs et al., "3-Draw: A Tool for Designing 3D Shapes", IEEE Computer Graphics and Applications 6, Nov. 1991, pp. 18-26.
Schkolne et al., "Surface Drawing: Creating Organic 3D Shapes with the Hand and Tangible Tools", URL : http://citeseerx.ist.psu.edu/viewdoc/download?doi=10.1.1.309.1967&rep=rep1&type=pdf, In CHI '01. ACM, Mar. 31-Apr. 5, 2001, 8 pages.
Schmidt et al., "Analytic Drawing of 3D Scaffolds", ACM Transactions on Graphics, vol. 28, No. 5, Article 149, Publication date: Dec. 2009, 10 pages.
Siek et al., "Fat Finger Worries:How Older and Younger Users Physically Interact with PDAs" URL : http://yvonnerogers.com/wp content/uploads/2014/07/Interact05.pdf, In IFIP Conference on Human-Computer Interaction. Springer, 2005, 14 pages.
Tano et al., "Truly Useful 3D Drawing System for Professional Designer by "Life-Sized and Operable" Feature and New Interaction", IFIP International Federation for Information Processing 2013, 2013, pp. 37-55.
Xin et al., "Napkin Sketch—Handheld Mixed Reality 3D Sketching", In VRST '08, DOI: 10.1145/1450579.1450627, Oct. 27-29, 2008, pp. 223-226.
Xu et al., "True2Form: 3D Curve Networks from 2D Sketches via Selective Regularization", ACM Trans. Graph. 33, 4, Article 131, Sep. 4, 2014, 15 pages.
Xu et al., "Model-Guided 3D Sketching", URL : http://www.ieee.org/publications_standards/publications/rights/index.html, IEEE Transactions on Visualization and Computer Graphics, DOI 10.1109/TVCG.2018.2860016, 2018, 13 pages.
Yee et al., "Augmented Reality In-Situ 3D Sketching of Physical Objects", In Intelligent UI workshop on sketch recognition. Apr. 4-9, 2009, 4 pages.
Zheng et al., "SMARTCANVAS: Context-inferred Interpretation of Sketches for Preparatory Design Studies",DOI: 10.1111/cgf.12809, Comput. Graph. Forum, vol. 35, No. 2, 2016, pp. 37-48.
Zou et al., "Progressive 3D Reconstruction of Planar-Faced Manifold Objects with DRF-Based Line Drawing Decomposition", IEEE TVCG 21, 2, DOI:10.1109/TVCG.2014.2354039, 2013 14 pages.
Kwan et al. "Mobi3DSketch: 3D Sketching in Mobile AR" Association for Computing Machinery, 2019, 11 pages.
TechTiq Solutions Ltd. "Latest Technologies for Android App Development 2018" [http://techtiqs.blogspot.com/2018/08/technologies-for-android-app-development.html], Aug. 2018, retrieved Mar. 13, 2020, 5 pages.

(56) References Cited

OTHER PUBLICATIONS

"Tilt Brush" [https://www.tiltbrush.com/], Google. Retrieved Mar. 13, 2020, 9 pages.
Constine, Josh. "Facebook Stories adds funky AR drawing and Instagrams Boomerang" [https://techcrunch.com/2018/04/12/facebook-3d-drawing/], Apr. 12, 2018, retrieved Mar. 13, 2020, 4 pages.
"Gravity Sketch" [https://www.gravitysketch.com/] retrieved Mar. 13, 2020, 7 pages.

* cited by examiner

THREE-DIMENSIONAL SKETCHING IN MOBILE AUGMENTED REALITY

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The subject disclosure relates generally to augmented reality, e.g., to three-dimensional sketching in mobile augmented reality.

BACKGROUND

Mid-air three-dimensional (3-D) sketching systems primarily have been explored in virtual reality (VR) and typically can involve having to use special and/or expensive hardware for motion capture and immersive, stereoscopic displays. Such sketching systems also are usually employed with regard to VR as opposed to augmented reality (AR), which can involve different challenges than VR, since AR can involve augmenting visual images of a real-world environment, whereas VR can involve images of a virtual environment. Also, such conventional 3-D sketching systems typically can be inaccessible or not practical for use in outdoor environments. Further, due in part to the physical limitations and other limitations of such conventional 3-D sketching systems, it usually can be difficult and/or not feasible to create large-scale or distant objects in a 3-D sketch.

The above-described description is merely intended to provide a contextual overview relating to creating sketches using devices, and is not intended to be exhaustive.

SUMMARY

The following presents a simplified summary of various aspects of the disclosed subject matter in order to provide a basic understanding of some aspects described herein. This summary is not an extensive overview of the disclosed subject matter. It is intended to neither identify key or critical elements of the disclosed subject matter nor delineate the scope of such aspects. Its sole purpose is to present some concepts of the disclosed subject matter in a simplified form as a prelude to the more detailed description that is presented later.

One or more embodiments, such as one or more systems, devices, methods, computer readable storage mediums, and techniques disclosed herein, relate to creating multi-dimensional (e.g., three-dimensional (3-D)) augmented reality (AR) sketches. Disclosed herein is a mobile device comprising at least one memory that stores executable components, at least one processor, coupled to the at least one memory, that executes or facilitates execution of the executable components. The executable components comprise a camera component that captures visual content of a real-world environment. The executable components also can comprise an interface component that receives drawing information from a user to facilitate generating drawing content in relation to the visual content, wherein a portion of the drawing information facilitates generation of at least one of a surface proxy, a stroke, or a snapping point associated with the drawing content. The executable components further can comprise a sketch generator component that generates a three-dimensional augmented-reality composite image that integrates the visual content of the real-world environment with the drawing content, wherein the drawing content is generated based at least in part on the drawing information received from the user and at least one of the surface proxy, the stroke or the snapping point.

Also disclosed herein is a method that comprises capturing, by a mobile device comprising a processor, visual content of a real-world environment. The method also comprises receiving, by a user interface of the mobile device, input information from a user to facilitate creating drawing content in relation to the visual content, wherein a portion of the input information facilitates creating at least one of a surface proxy, a stroke, or a snapping point associated with the drawing content. The method further comprises creating, by the mobile device, a three-dimensional augmented-reality sketch that integrates the visual content of the real-world environment with the drawing content, wherein the drawing content is created based at least in part on the input information received from the user and at least one of the surface proxy, the stroke, or the snapping point.

Further disclosed herein is a machine-readable medium storing computer-executable instructions that, in response to execution, cause a wireless device comprising a processor to perform operations. The operations can comprise sensing one or more objects of a real-world environment to facilitate generating three-dimensional visual image information that depicts the one or more objects. The operations also can include receiving, via an interface of the wireless device, drawing information associated with a user identity to facilitate generating three-dimensional drawing content associated with the three-dimensional visual image information, wherein a portion of the three-dimensional drawing information facilitates generating at least one of a planar surface proxy, a curved surface proxy, a stroke, or a snapping point associated with the three-dimensional drawing content. The operations further can comprise generating, on a touch display screen of the wireless device, a three-dimensional augmented-reality sketch that incorporates the three-dimensional drawing content with the three-dimensional visual image information depicting the one or more objects of the real-world environment, wherein the three-dimensional drawing content is generated based at least in part on the drawing information and at least one of the planar surface proxy, the curved surface proxy, the stroke, or the snapping point.

The following description and the annexed drawings set forth in detail certain illustrative aspects of the disclosed subject matter. These aspects are indicative, however, of but a few of the various ways in which the principles of the disclosed subject matter may be employed, and the disclosed subject matter is intended to include all such aspects and their equivalents. Other advantages and distinctive features of the disclosed subject matter will become apparent from the following detailed description of the disclosed subject matter when considered in conjunction with the drawings.

DETAILED DESCRIPTION

Figure 1:
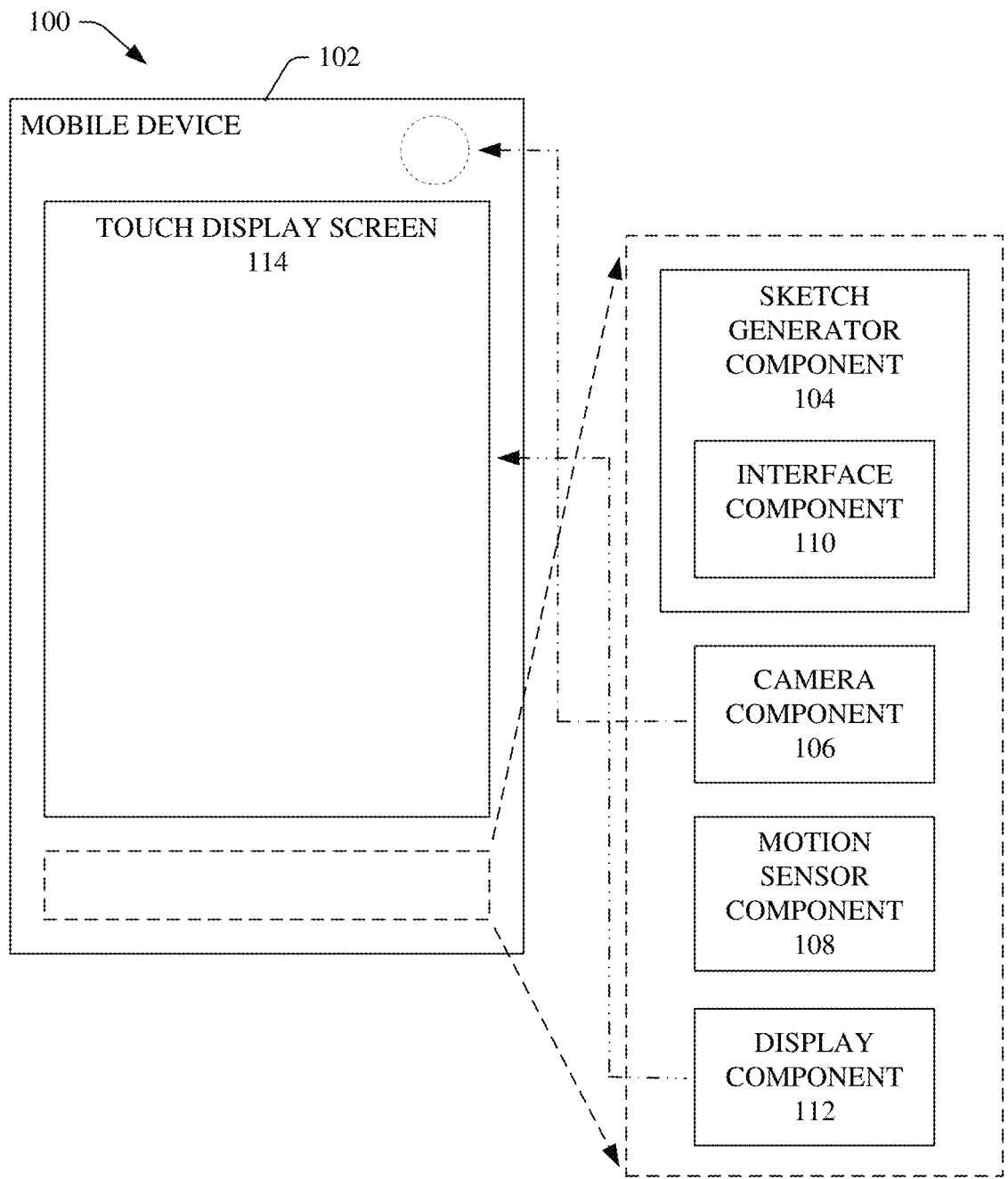
FIG. 1 illustrates a block diagram of an example system that can efficiently and desirably create multi-dimensional (e.g., three-dimensional (3-D)) AR sketches using a mobile device, in accordance with various aspects and embodiments of the disclosed subject matter.

The disclosed subject matter is described with reference to the drawings, wherein like reference numerals are used to refer to like elements throughout. In the following description, for purposes of explanation, numerous specific details are set forth in order to provide a thorough understanding of the various embodiments of the subject disclosure. It may be evident, however, that the disclosed subject matter may be practiced without these specific details. In other instances, well-known structures and devices are shown in block diagram form in order to facilitate describing the various embodiments herein.

Mid-air three-dimensional (3-D) sketching systems primarily have been explored in virtual reality (VR) and typically can involve having to use special and/or expensive hardware for motion capture and immersive, stereoscopic displays. Such sketching systems also are usually employed with regard to VR as opposed to augmented reality (AR), which can involve different challenges than VR, since AR can involve augmenting visual images of a real-world environment, whereas VR can involve images of a virtual environment. Also, such conventional 3-D sketching systems typically can be inaccessible or not practical for use in outdoor environments. Further, due in part to the physical limitations and other limitations of such conventional 3-D sketching systems, it usually can be difficult and/or not feasible to create large-scale or distant objects in a 3-D sketch.

Motion tracking algorithms can allow real-time tracking of mobile devices (e.g., mobile or smart phone, electronic pad or tablet, . . . ) and have enabled a few mobile applications for 3-D sketching in AR. However, these mobile applications are merely suitable only for making relatively simple drawings. For instance, such mobile applications do not take into consideration special challenges with mobile 3-D sketching for mobile devices, including the lack of a stereoscopic display, a relatively narrow field of view that is available on a display screen of a mobile device, and the coupling of two-dimensional (2-D) input, 3-D input, and display screen.

The disclosed subject matter can take into consideration such special challenges, and can address the aforementioned deficiencies and other deficiencies associated with traditional mobile 3-D sketching for mobile devices. To that end, presented are techniques, systems, methods, and means that can enable users to desirably create mid-air multi-dimensional (e.g., 3-D) AR sketches (e.g., relatively sophisticated or complex 3-D AR sketches) using a mobile device (e.g., a smart or mobile phone, an electronic tablet or pad, . . . ), in accordance with various aspects and embodiments of the disclosed subject matter. The disclosed subject matter can comprise a mobile device that can include a sketch generator component that can integrate multiple sources of inputs, with enhanced tools, including enhanced 3-D snapping tools, which can be utilized to create snapping points on strokes or proxies, and enhanced proxy tools, which can be utilized to create planar or curved surface proxies. The multiple sources of inputs can comprise, for example, touch screen data from touch screen sensors of the mobile device, sensed or captured image data from a camera(s) of the mobile device, motion data relating to motion of the device as sensed by an accelerometer, a gyroscope, an inertial measurement unit (IMU), and/or camera, etc., of the mobile device, and/or other sensor data from other sensors of or associated with the mobile device. The motion data can include motion tracking data of real-tie inside-out 3-D motion tracking of the mobile device that can be performed by the sketch generator component utilizing a desired motion tracking algorithm, the IMU (and/or accelerometer and/or gyroscope), and the camera. The sketch generator component can provide (e.g., generate) an enhanced (e.g., improved, effective, efficient, and/or otherwise more desirable) multimodal interface that can support absolute and relative drawing by a user, allowing relatively easy creation of 3-D AR sketches (e.g., 3-D concept designs) in situ.

A user can use the sketch generator component, including the enhanced interface, of the mobile device to create or draw desired multi-dimensional (e.g., 3-D) AR sketches that can integrate the visual content of the real-world environment (e.g., indoor environment or outdoor environment) captured by the mobile device (e.g., captured by the camera (s) of the mobile device) with drawing content (e.g., sketch features) created, by the user, on or in relation to the captured visual content. For instance, in connection with creating a multi-dimensional AR sketch on the display screen of the mobile device, a camera of the mobile device can be capturing visual content of the real-world environment. The user can utilize the mobile device (e.g., a single mobile device) to create (e.g., generate) one or more desired proxies (e.g., planar surface proxy and/or a curved surface proxy) that can be displayed in the display screen with the captured visual content of the real-world environment. For example, a user can create a desired proxy by pressing a button (e.g., a create proxy button on the menu) on the enhanced user interface, and, in response to the button being pressed, the sketch generator component can generate the desired proxy based at least in part on (e.g., according to) the current position and orientation of the mobile device, as determined by the sketch generator component from the sensor data of the sensors of the mobile device. The sketch generator component can enable relatively easy creation of desired proxies to align with real-world surfaces, such as real-world surfaces contained in the visual content of the real-world environment viewed and captured by the mobile device. The user also can utilize a snapping tool (e.g., by pressing a snapping tool button on the menu of the enhanced user interface) to create desired snapping points by tapping (e.g., tapping a finger) on a stroke or a proxy on the display screen (e.g., touch display screen). The strokes, points, and proxies, etc., of the sketch generator component can be highly integrated with each other in order to enable users to achieve desired and/or different design goals and to create reasonably sophisticated (e.g., complex), high quality multi-dimensional (e.g., 3-D) AR sketches (e.g., 3-D AR sketches that are more sophisticated and of higher quality than AR sketches that can be generated using conventional mobile AR applications). The disclosed subject matter, by employing the sketch generator component on a mobile device, can enable users, using the mobile device, to create such desirable (e.g., relatively sophisticated, higher quality) multi-dimensional AR sketches, which can augment the visual content of the real-world environment (e.g., indoor or outdoor environment) with the visual illustration(s) created by a user, even if the mobile device can lack a stereoscopic display and/or can have a relatively narrow field of view (e.g., as compared to larger, multiple, and/or specialized devices).

The mobile device, comprising the sketch generator component, can be utilized, for example, to create desirable multi-dimensional AR sketches (e.g., 3-D concept designs) in the context of real-world environments, which can comprise or relate to creative art designs, architecture (e.g., landscape architecture, building architecture, or other structural architecture), annotation (e.g., real-world annotation of a real-world environment), and/or other desired types of expression (e.g., AR expression) by a user.

These and other aspects and embodiments of the disclosed subject matter are described with regard to the figures.

Turning to FIG. 1, illustrated is a block diagram of an example system 100 that can efficiently and desirably create multi-dimensional (e.g., 3-D) AR sketches using a mobile device, in accordance with various aspects and embodiments of the disclosed subject matter. In an aspect, the system 100 can comprise a mobile device 102 that can comprise various functions, and can comprise and/or utilize various applications. In accordance with various embodiments, the mobile device 102 can be or can comprise a mobile (e.g., a cellular) or smart phone, an electronic pad or tablet, an electronic gaming device, a personal digital assistant (PDA), or other type of electronic and/or communication device.

In some embodiments, the mobile device 102 can comprise a sketch generator component 104 that can be utilized to create multi-dimensional AR sketches (e.g., mid-air 3-D AR sketches) on the mobile device 102. The sketch generator component 104 can enable users (e.g., users with drawing skills) to create 3-D AR sketches (e.g., composite sketches, images, or designs) in the context of real-world environments using a single mobile device 102, and without having to utilize head-mounted displays (HMDs), external controllers, cave automatic virtual environment (CAVE)-like systems, or other specialized equipment.

The sketch generator component 104 can receive inputs, such as sensor data, from multiple sources, including various sensors, which can comprise a camera component 106 (e.g., a capture component), a motion sensor component 108 (e.g., IMU, accelerometer, and/or gyroscope), and/or another type of sensor. The sketch generator component 104 also employ enhanced tools, including enhanced proxy creations tools and enhanced snapping tools to facilitate creation of 3-D AR sketches. The sketch generator component 104 further can comprise an interface component 110 that can be presented to the user, in part, via the display component 112 (e.g., touch display screen 114 of the display component 112) of the mobile device 102, wherein the interface component 110 can comprise a multimodal interface that can enable users to create 3-D AR sketches using absolute drawing and/or relative drawing (e.g., in a seamless manner), which can allow the creation of 3-D AR sketches by users in situ. The sketch generator component 104 can integrate the information (e.g., sensor data) received from the multiple sources, the enhanced tools, and the multimodal interface of the interface component 110 to address and overcome issues associated with mobile 3-D AR sketching, such issues including, for example, a lack of stereoscopic display on the device, a relatively narrow field of view of the device (e.g., as compared to HMDs), and the coupling of 2-D input, 3-D input, and display.

The camera component 106 can comprise one or more cameras that can sense or perceive real objects (e.g., person, furniture, vehicle, building, or tree, . . . ) in a real-world environment (e.g., indoor environment or outdoor environment) and can capture visual content (e.g., visual images) that can depict or represent the real objects sensed or perceived by the one or more cameras. Each of the one or more cameras can have a desired number of pixels (e.g., 8 megapixels, 12 megapixels, 16 megapixels, or other desired number of pixels greater or less than 16 megapixels) to provide a desired level of detail with regard to the real objects being sensed or perceived by the one or more cameras.

The motion sensor component 108 can comprise one or more sensors that can sense (e.g., detect) and/or track the motion (e.g., movement), position, and/or orientation of the mobile device 102. The sketch generator component 104 can operate in conjunction with or coordinate with the motion sensor component 108 and the camera component 106 to track (e.g., track in real time) the motion, position, and/or orientation of the mobile device 102 based at least in part on the results of analyzing the sensor data generated by the motion sensor component 108 and other sensor data (e.g., visual image data) produced by the camera component 106. In some embodiments, the sketch generator component 104 can employ one or more desired motion tracking algorithms, such as, for example, concurrent odometry and mapping (COM) or visual inertial odometry (VIO), to perform real-time inside-out 3-D motion tracking of the mobile device 102 by using the one or more cameras of the camera component 106 and one or more sensors (e.g., IMU, accelerometer, and/or gyroscope), of the motion sensor component 108.

The interface component 110 can generate and present, via the touch display screen 114 of the display component 112, one or more interfaces that can be utilized by a user to create 3-D AR sketches (e.g., mid-air 3-D AR sketches). Each of the one or more interfaces can comprise and present one or more buttons, controls, menus, or other features that can be utilized (e.g., selected or manipulated) by the user in connection with creating a 3-D AR sketch, such as more fully described herein. For example, the interface component 110 can generate and present, via the touch display screen 114, an interface that can present a menu (e.g., a fan menu) comprising a number of controls (e.g., a proxy control, a grab control, or a paste control, . . . ) that can be available for selection by the user, an action button (e.g., create proxy control) where the function of the action button can be determined or changed based at least in part on the control (e.g., proxy control) selected in the menu, a cursor that can indicate a current location on the touch display screen (and the sketch or image displayed thereon) where a last action left off or a next action can be started (unless the cursor is moved to another location) and/or can facilitate mid-air drawing by the user, and/or one or more other features (e.g., object menu (e.g., object fan menu), a shortcut bar, and/or a tool bar, . . . ), such as more fully described herein.

The touch display screen 114 can have a desired size (e.g., 4 inches diagonal, 5 inches diagonal, 6 inches diagonal, or other desired size greater or less than 6 inches diagonal) and dimensions, shape (e.g., rectangular, square, . . . ), and resolution (e.g., 1334×750 pixels, 2436×1125 pixels, 2960× 1440 pixels, 3840×2160 pixels, or other desired resolution. The touch display screen 114 also can comprise or be associated with a set of sensors (e.g., an array of sensors) that can sense touches of an object(s) (e.g., finger(s), stylus, ear, cheek, . . . ) on the touch display screen 114 or hovering of an object(s) in proximity to the touch display screen 114. A user can touch the touch display screen 114 to select or manipulate buttons, controls, interfaces, or other features of the interface component 110, sketch generator component 104, touch display screen 114, applications, or other components of the mobile device 102. For instance, the user can use a finger to touch a control (e.g., create proxy control, create snapping point control, . . . ) on an interface of the interface component 110 to select the control (e.g., a control associated with an enhanced tool), can use a finger to touch the touch display screen 114 and move the finger in a desired manner on the touch display screen 114 to create a desired stroke, and/or can perform other touch-related actions on the touch display screen 114 to facilitate creating 3-D AR sketches, such as more fully described herein.

In accordance with various embodiments, the camera component 106 can capture visual content (e.g., visual image) of one or more real-world objects of a real-world environment. For instance, a user can be pointing the camera component 106 at one or more real-world objects of the real-world environment, and the camera component 106 can capture or sense the visual content that can depict or represent the one or more real-world objects of the real-world environment. As desired, the camera component 106 can capture the visual content depicting or representing the one or more real-world objects from various perspectives (e.g., viewing angles, or spatial positions) to depict or represent the one or more real-world objects in 3-D.

The user can input information (e.g., drawing information) to the interface component 110 to select desired controls and associated enhanced tools, draw strokes, etc., to create 3-D drawing content in relation to the captured visual content (e.g., 3-D visual image), wherein the sketch generator component 104 can integrate the 3-D drawing content with the visual content to create a 3-D AR sketch (e.g., 3-D AR composite image). For instance, the interface component 110 can receive the input information from the user. The sketch generator component 104 can analyze the input information. Based at least in part on the results of the analysis, the sketch generator component 104 can determine whether the user is selecting a control, and, if so, which control is being selected; determine whether the user is making a stroke, and, if so, the form and location of the stroke; determine whether the user is creating a planar or curved surface proxy, and, if so, the form and location of such surface proxy; determine whether the user is creating a snapping point(s), and, if so, the form and location of the snapping point(s); and/or determine whether the user is selecting another type of control and/or performing another type of drawing action.

For example, the user can desire to create a planar or curved surface proxy of a desired form in a desired location of the 3-D AR sketch in relation to the visual content of the sketch. The user can provide (e.g., input) certain input information, via the interface component 110, to select a proxy tool (e.g., from a tool menu on an interface (e.g., from a menu (e.g., fan menu)) on the interface) of the interface component 110, and, in response to selection of the proxy tool, the sketch generator component can present an action button, which can be a proxy creation button, on the interface of the interface component 110. Such input information of the user also can include selection, by the user, of the proxy creation button on the interface of the interface component 110.

The user also can provide certain other input information (e.g., by applying a finger(s) to the touch display screen 114), via the interface component 110, to select the type of surface proxy (e.g., planar surface proxy or curved surface proxy), the location, form, shape, and/or dimensions of the surface proxy. Based at least in part on the results of an analysis of such input information, the sketch generator component 104 can select the desired type of surface proxy, determine the location, form, shape, and/or dimensions of the surface proxy, and generate the desired type of surface proxy in the desired location of the 3-D AR sketch in relation to the visual content, wherein the surface proxy can have the desired form, shape, and/or dimensions.

As another example, the user can desire to create a stroke of a desired form in a desired location of the 3-D AR sketch in relation to the visual content of the sketch. The user can provide input information, via the interface component 110, to create a stroke that can be in a desired location of the 3-D AR sketch, and can have a desired form, shape, and/or dimensions of the stroke (e.g., a straight line, a curved line, a circle, or a rectangle, . . . ). Based at least in part on the results of an analysis of such input information, the sketch generator component 104 can determine the desired location of the stroke on the 3-D AR sketch, and the desired form, shape, and/or dimensions of the stroke, and can generate the stroke in the desired location of the 3-D AR sketch in relation to the visual content, wherein the stroke can have the desired form, shape, and/or dimensions.

As still another example, the user can desire to create a snapping point in a desired location of the 3-D AR sketch in relation to the visual content of the sketch. The user can provide input information, via the interface component 110, to create a snapping point that can be in a desired location of the 3-D AR sketch, such as, for example, at a certain point of a stroke (e.g., at an end point of a stroke, or at a middle point of the stroke) or at a certain point of a surface proxy (e.g., a particular side and/or a particular location on a side of the surface proxy, or a particular point on the surface of the surface proxy). Based at least in part on the results of an analysis of such input information, the sketch generator component 104 can determine the desired location of the stroke on the 3-D AR sketch, and the desired form, shape, and/or dimensions of the stroke, and can generate the stroke in the desired location of the 3-D AR sketch in relation to the visual content, wherein the stroke can have the desired form, shape, and/or dimensions. In some embodiments, based at least in part on an analysis of the 3-D AR sketch (e.g., the portion of the sketch that has been created by the user) and/or user activity of the user (e.g., user activity in relation to the sketch), the sketch generator component 104 can determine and generate (e.g., automatically or dynamically determine and generate) one or more snapping point recommendations to recommend one or more snapping points in respective locations of the 3-D AR sketch, and can present the one or more snapping point recommendations to the user via the interface component 110, as more fully described herein.

Based at least in part on the visual content (e.g., 3-D visual content) captured by the camera component 106 and the drawing content (e.g., various strokes, surface proxies, snapping points, and/or other sketch features) created by the user via input information of the user received via the interface component 110, the sketch generator component 104 can generate a 3-D AR sketch that can integrate the 3-D drawing content of the user with the visual content of the real-world environment to create a 3-D AR sketch (e.g., 3-D AR composite image). The sketch generator component 104 can present the 3-D AR sketch via the interface component 110, can present (e.g., communicate wirelessly or via a wireline communication connection) the 3-D AR sketch to another device (e.g., another communication device or display screen), and/or can store the 3-D AR sketch in a data store of or associated with the mobile device 102.

These and other aspects and embodiments of the disclosed subject matter are described or further described herein with regard to the other figures (and/or FIG. 1).

The disclosed subject matter, employing a sketch generator component (e.g., sketch generator component 104), provides a 3-D AR sketching system for users (e.g., artists, designers, . . . ) to create 3-D AR sketches (e.g., 3-D concept designs or composite images) in a real-world context using a single AR-enabled mobile device, as more fully described herein. The disclosed subject matter can overcome various challenges associated with using a mobile device for 3-D AR sketching, such challenges including the lack of a stereoscopic display on a mobile device, the relatively narrow field of view of the mobile device (as compared to HMDs of VR systems), and the coupling of 2-D input, 3-D input, and the display screen of a mobile device.

To tackle these and other challenges, the disclosed subject matter, employing the sketch generator component (e.g., sketch generator component 104), can provide enhanced tools, including enhanced surface proxy creation tools and enhanced snapping tools, which are improved over traditional surface proxy and snapping elements that are designed and used for 3-D sketching with 2-D inputs. For instance, the disclosed subject matter, employing the sketch generator component, can support and provide enhanced snapping tools that can enable explicit snapping and implicit snapping with snapping recommendations (e.g., suggestions), snapping curves or surfaces of curved or planar surface proxies, and one- or two-end point snapping for snapping of strokes to other strokes or surface proxies so that users may easily create 3-D AR sketches with well-connected strokes, as more fully described herein.

Figure 3:
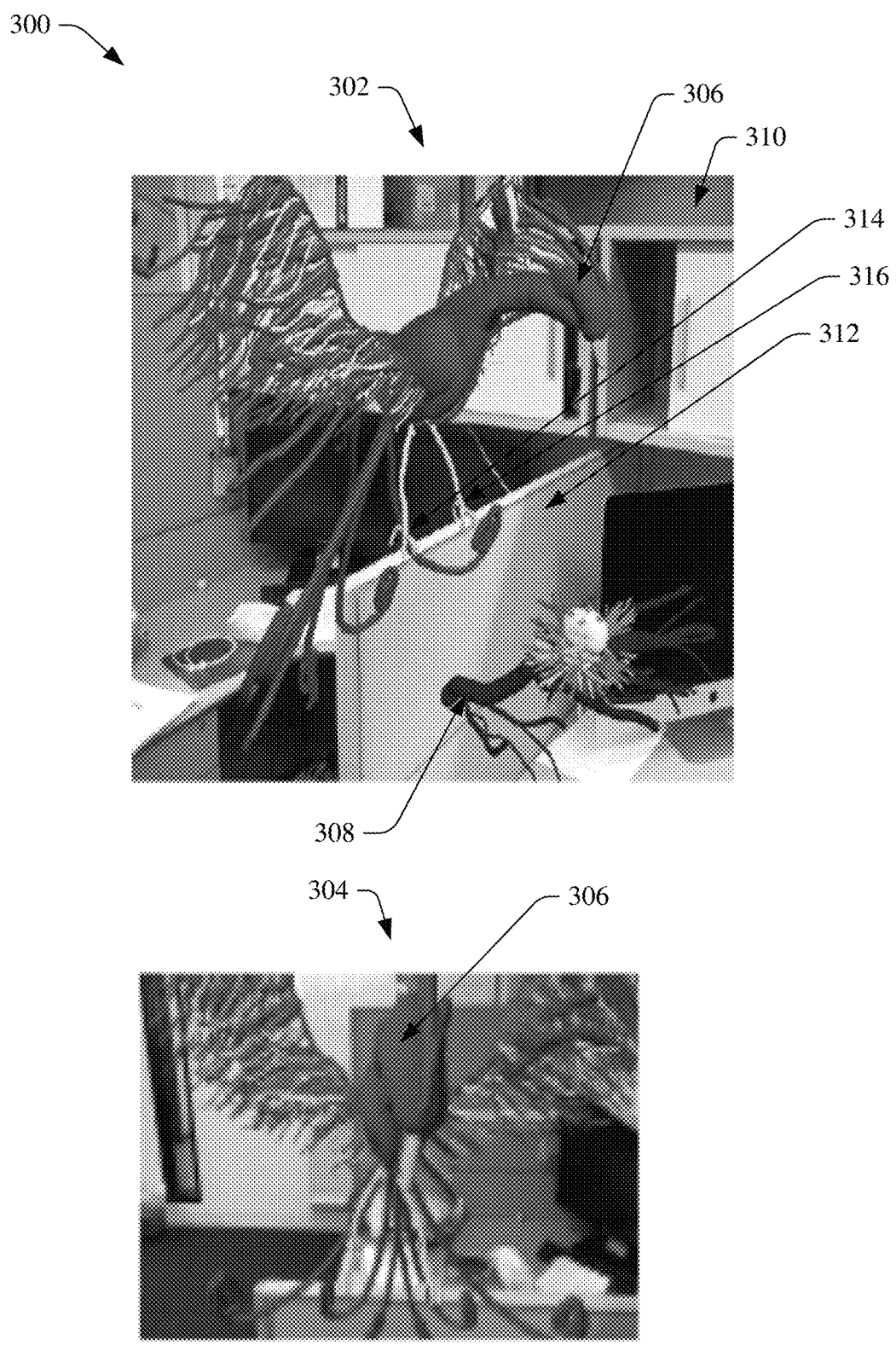
FIG. 3 depicts a diagram of an example 3-D AR sketch that can be created using a single mobile device in situ, in accordance with various aspects and embodiments of the disclosed subject matter.
Figure 4:
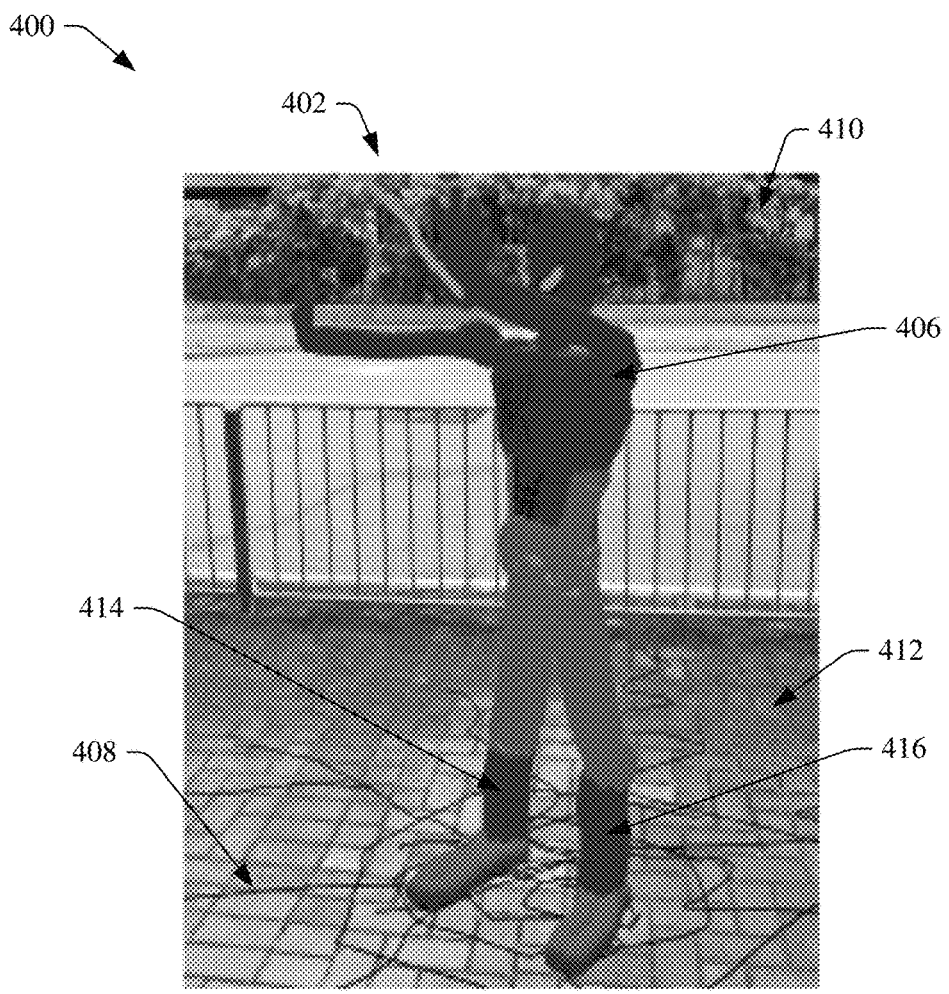
FIG. 4 presents a diagram of another example 3-D AR sketch that can be created using a single mobile device in situ, in accordance with various aspects and embodiments of the disclosed subject matter.
Figure 4:
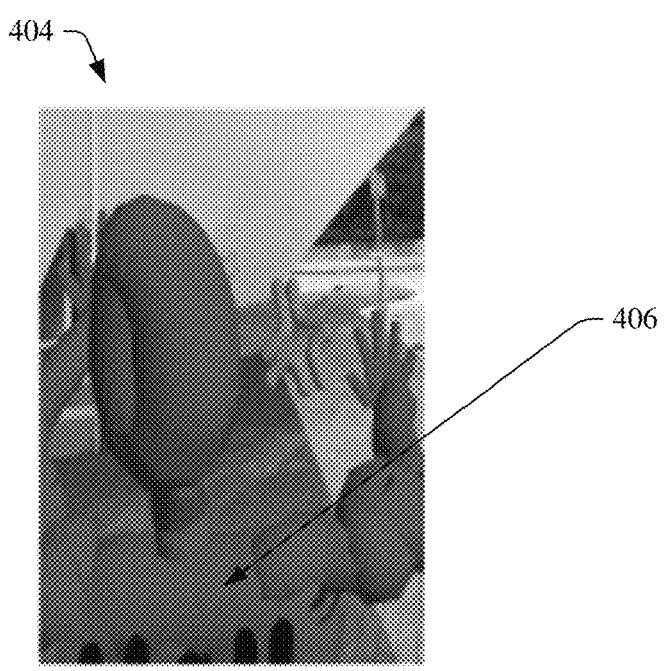

The disclosed subject matter, employing the sketch generator component (e.g., sketch generator component 104), also can utilize and exploit a 3-D pose of a mobile device (e.g., mobile device 102) to support and enable desirably quick anchoring of surface proxies (e.g., planar surface proxies) and desirably easy creation of extruded surfaces in 3-D space. Such surface proxies either manually anchored or obtained from environment understanding allow desirably easy attachment or integration of 3-D sketches to real-world environments. Such unified and enhanced features for snapping and surface proxies of the disclosed subject matter not only allow users (e.g., artists, designers) to sketch with greater precision, but also allow users to seamlessly switch between absolute drawing and relative drawing. The latter can be very useful, for example, for sketching large-scale objects (e.g., as depicted in FIGS. 2-4) through a relatively narrow field of view of the mobile device, whereas VR/AR-based 3-D sketching systems typically use the absolute positions of a continuously tracked 3-D stylus for defining 3-D curves.

The disclosed subject matter can comprise an interface component (e.g., interface component 110) that can utilize and provide (e.g., present) a multimodal interface that can incorporate multiple sources of inputs from a mobile device (e.g., mobile device 102) to seamlessly integrate mid-air 3-D AR sketching with surface-based 2-D sketching. Unlike traditional mid-air 3-D sketching systems in VR and AR, which typically have been limited to a room with a special hardware setup, the disclosed subject matter can work well both indoors and outdoors to enable a user to desirably create a 3-D AR sketch (e.g., a mid-air 3-D AR sketch) in an indoor or outdoor real-world environment. In FIGS. 2-4, the disclosed subject matter illustrates some representative sketching results, which, with this level of complexity, have not been demonstrated by existing AR 3-D sketching applications using a single mobile device.

Figure 2:
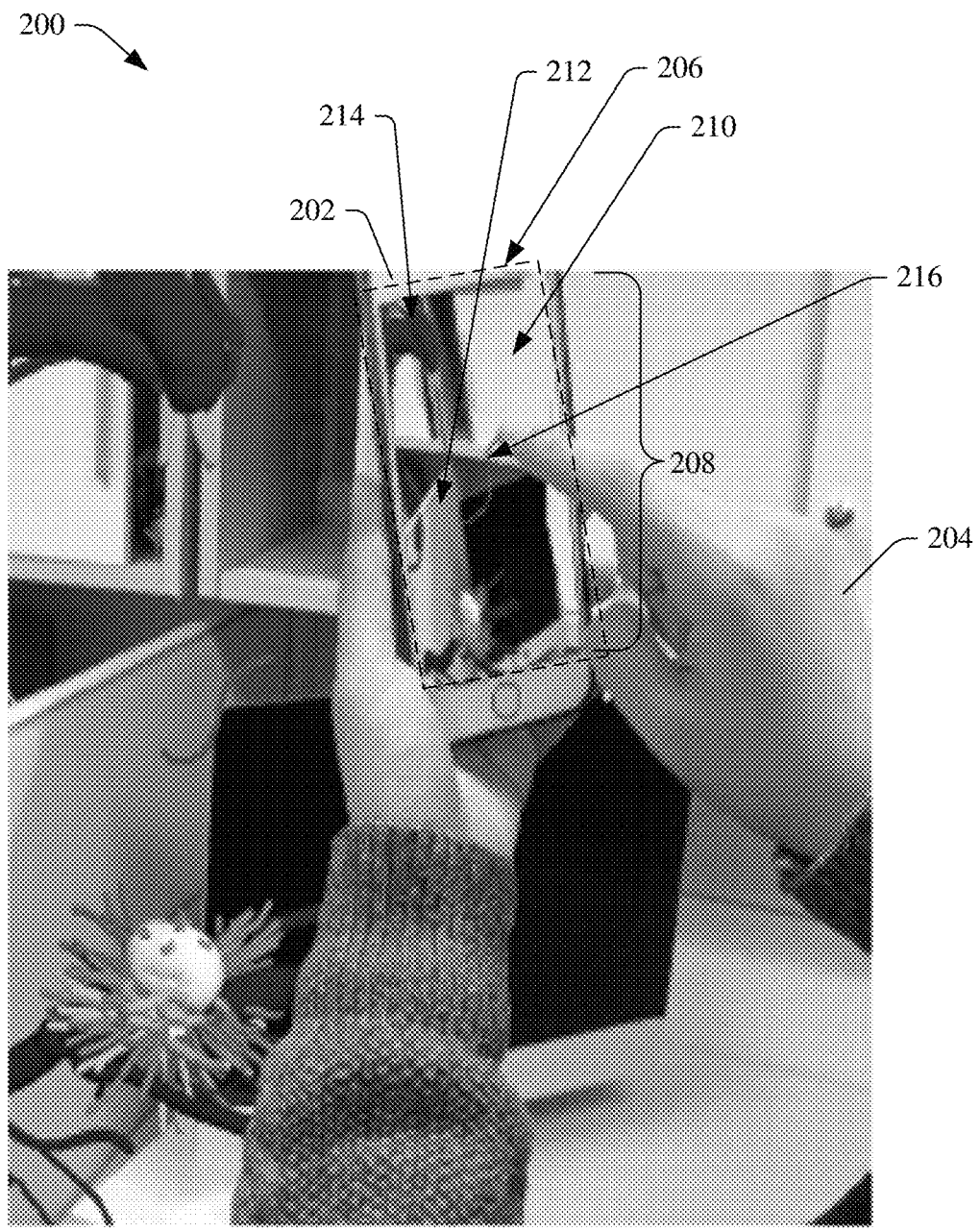
FIG. 2 depicts a diagram of an example image of a user using a mobile device with the sketch generator component to create a 3-D AR sketch, in accordance with various aspects and embodiments of the disclosed subject matter.

Referring briefly to FIG. 2 (along with FIG. 1), FIG. 2 depicts a diagram of an example image 200 of a user using a mobile device with the sketch generator component to create a 3-D AR sketch, in accordance with various aspects and embodiments of the disclosed subject matter. In the example image 200, a mobile device 202 is being used by a user 204 to create a 3-D AR sketch 206, a portion of which is presented on a touch display screen 208 of the mobile device 202. The 3-D AR sketch 206 comprises a visual image 210 (e.g., 3-D visual content) of real objects, such as cubical divider 212, in a real-world environment, as captured by the camera component (e.g., 106) of the mobile device 202.

The 3-D AR sketch 206 also includes drawing content 214 (e.g., 3-D drawing content) that can be drawn by the user 204 (e.g., using one or more fingers) employing the sketch generator component (e.g., 104) of the mobile device 202. The sketch generator component can integrate the drawing content with the real objects in the real-world environment depicted in the visual image 210 to form the 3-D AR sketch 206 (e.g., 3-D AR composite sketch or image). As depicted in the example image 200, the user 204 (e.g., using a finger) is touching the touch display screen 208 to create drawing content in the form of a stroke 216 (e.g., 3-D stroke) at a desired location of the 3-D AR sketch 206 in relation to the other drawing content 214 and the real objects (e.g., cubical divider 212) depicted in the visual image 210 in the 3-D AR sketch 206.

Turning briefly to FIG. 3 (along with FIG. 1), FIG. 3 depicts a diagram of an example 3-D AR sketch 300 that can be created using a single mobile device in situ, in accordance with various aspects and embodiments of the disclosed subject matter. The single mobile device (e.g., 102) can be utilizing a sketch generator component (e.g., 104), as more fully described herein, to enable a user to create the 3-D AR sketch 300. In FIG. 3, the example 3-D AR sketch 300 is shown from different viewing perspectives, such as a first viewing perspective 302 (e.g., first viewing angle) and a second viewing perspective 304 (e.g., second viewing angle). The first viewing perspective 302 shows the 3-D AR sketch from mainly a side view, for example, with respect to the bird 306 drawn by the user, but also providing a partial view of the front of the bird 306. The second viewing perspective 304 shows the 3-D AR sketch from mainly a front view of the bird 306.

As can be observed in the 3-D AR sketch 300, including the first viewing perspective 302 and second viewing perspective 304 of the 3-D AR sketch 300, the bird 306 and the other drawing content (e.g., tree branch 308 (with nest and egg)) are in 3-D, and the visual image 310 depicting the real-world environment, including real objects, such as cubical divider 312, is in 3-D. The legs 314 and 316 of the bird 306 are set on the top of the cubical divider 312, and the tree branch 308 is protruding from the side of the cubical divider 312.

Referring briefly to FIG. 4 (along with FIG. 1), FIG. 4 presents a diagram of another example 3-D AR sketch 400 that can be created using a single mobile device in situ, in accordance with various aspects and embodiments of the disclosed subject matter. The single mobile device (e.g., 102) can be utilizing a sketch generator component (e.g., 104), as more fully described herein, to enable a user to create the 3-D AR sketch 400. In FIG. 4, the example 3-D AR sketch 400 is shown from different viewing perspectives, such as a first viewing perspective 402 (e.g., first viewing angle) and a second viewing perspective 404 (e.g., second viewing angle). The first viewing perspective 402 shows the 3-D AR sketch from mainly a side view, for example, with respect to 3-D drawing of Spiderman 406 drawn by the user, but also providing a partial view of the front of Spiderman 406. The second viewing perspective 404 shows the 3-D AR sketch from mainly a partial back view of Spiderman 406.

As can be observed in the 3-D AR sketch 400, including the first viewing perspective 402 and second viewing perspective 404 of the 3-D AR sketch 400, the illustration of Spiderman 406 and the other drawing content (e.g., webbing 408) drawn by the user are in 3-D, and the visual image 410 depicting the real-world environment, including real objects, such as the sidewalk 412, is in 3-D. Also, the legs 414 and 416 of Spiderman 406 are set on the top of the sidewalk 412, and the webbing 408 is laying on the sidewalk 412.

As disclosed herein, 3-D sketching has been employed in VR. For instance, mid-air 3-D drawing or surface modeling has been explored as immersive VR applications. 3-D sketching in VR often involves having to use special equipment, such as HMDs or CAVE-like systems for immersive, stereoscopic visualization, and 3-D styluses (or similar devices) for direct 3-D inputs. Also, in such VR applications, both the head of a user and a stylus have to be accurately tracked to align the input and output spaces. Although such specialized and intricate setups potentially can enable various applications like 3-D concept design, it has been shown that precise 3-D sketching in mid-air can be challenging primarily because of the limited human ability to sketch freely in 3-D without a physical supporting surface. This problem possibly can be alleviated to some degree by using haptic constraints or reference imagery. The recent development of VR HMD and motion-tracked controller hardware and software has made mid-air 3-D sketching in VR somewhat more accessible by users. However, due to the relatively expensive cost of the special VR hardware and its rather complex (e.g., complicated) setup, VR-based 3D sketching still can be limited to a relatively small group of users.

In contrast, the disclosed subject matter can make 3-D sketching, such as 3-D AR sketching, more accessible and widespread to a larger number of users, and the disclosed subject matter can enable desirable drawing of 3-D AR sketches on a mobile device via use of an AR 3-D sketching interface (e.g., interface component 110) for 3-D AR sketches (e.g., 3-D AR concept designs or composite images) in situ. Further, it is noted that 3-D AR sketching can involve different challenges than 3-D VR sketching, since AR can involve augmenting visual images of a real-world environment, whereas VR can involve images of a virtual environment, and as more fully described herein, the disclosed subject matter can overcome the unique challenges associated with 3-D AR sketching, particularly 3-D AR sketching on a single mobile device, such as described herein.

With regard to 3-D sketching in AR, as compared to VR, AR can allow users to create (e.g., author or draw) 3-D sketches that can be more directly linked to real-world objects or environments, and thus, it can be desirable (e.g., advantageous or required) to have reasonably accurate tracking of users and/or objects in a physical space (e.g., 3-D physical space). For instance, some traditional AR systems involve a video see-through AR system for mid-air 3D sketching using an HMD with cameras and a drawing pen, both of which can be tracked by using a commercial motion capture (MoCap) system, or other similar AR systems. Another traditional mid-air AR sketching system attempts to address imprecise mid-air sketching by combining 3-D mid-air sketching using a motion-tracked stylus and 2-D surface sketching on a tablet, and displaying sketching results through an AR HMD. However, due to their use (e.g., essential use) of outside-in MoCap systems, such traditional AR systems are more like laboratory-based implementations, and are not very practical for use in mid-air 3-D AR sketching in various different environments (e.g., indoor and outdoor), can be undesirably complex and cumbersome in setting up and using, and can be undesirably expensive. Even if these traditional AR systems were to adopt inside-out motion tracking techniques, such AR systems still cannot be desirably (e.g., easily or suitably) adapted to the problem of 3-D AR sketching using a single mobile device, due to the various challenges (e.g., difficulty in precisely controlling 3-D position and orientation of a device in mid-air without a physical supporting surface, lack of stereoscopic display on mobile devices, and relatively narrow field of view on mobile devices) described herein. AR markers can provide an alternative way to register the real and the virtual worlds. For example, one traditional AR system can allow users to draw 3-D sketches in a small working volume on top of AR makers using a projective 3-D sketching approach. This traditional AR system is essentially "object-centered," and can involve (e.g., can require) the camera to always be viewing at (e.g., always being aimed of focused on) a sketched object being created. As a result, this traditional AR system generally can be more suitable for creating small-scale sketched objects, rather than large-scale 3-D AR sketches situated in a real-world environment. In contrast, the disclosed subject matter can involve a "viewer-centered" approach, which can result in different challenges and solutions, and also can enable desirable creation of larger-scale 3-D AR sketches situated in a real-world environment.

Recently, motion tracking techniques, such as COM and VIO, have been developed, wherein such techniques can rely on both the visual information from a mobile device's color camera and inertial measurements from the device's IMU sensors to robustly estimate the 3-D pose (e.g., 3-D position and 3-D orientation) of the camera (and thus the device) in real time. A few mobile AR platforms have been developed based on these motion tracking techniques. With such mobile AR platforms, users can use a mobile device as a 3-D stylus for mid-air 3-D sketching. While a number of mobile applications have been developed for experimenting 3-D sketching on these mobile AR platforms, such mobile applications are relatively simplistic in functionality and features, and are merely created for fun, instead of more serious tasks like 3-D concept design. Such mobile applications primarily use a mobile device as a 3-D stylus for mid-air 3-D sketching, similar to the traditional VR/AR 3-D sketching systems, and have not attempted to address the unique (e.g., special) challenges of mobile AR-based 3-D sketching.

3-D sketching can be performed with 2-D inputs. 2-D sketching still can be a very efficient way to express ideas, since the traditional input devices, such as computer mice, graphic tablets, and touchscreens, typically only support 2-D inputs. There is some research that deals with how to lift 2-D sketches into 3-D. This problem can be challenging due in part to its ill-posed nature, since theoretically there can be an infinite number of 3-D interpretations for a given 2-D sketch drawn from a specific viewpoint. Different kinds of regularity constraints like planarity, orthogonality, and symmetry have been proposed to solve for an optimal 3-D interpretation of a carefully drawn, complete 2-D sketch. Alternatively, 2-D strokes can be lifted into 3-D one by one interactively, for example, by making use of planar/curved 3-D surfaces for stroke projection, scaffolds, and geometric priors.

As more fully described herein, the disclosed subject matter can provide a sketch generator component (e.g., sketch generator component 104), comprising an interface component (e.g., interface component 110) that can provide for a mobile AR 3-D sketching interface that can enable users (e.g., artists, conceptual designers, . . . ) to create, relatively easily, 3-D AR sketches in situ using a single mobile device and examine such sketches from different viewing angles (e.g., different 3-D angles) using the single mobile device. Traditional 2-D or 3-D sketching systems typically are not able to do this, unless the real-world context is modeled digitally (which can be a challenging problem on its own) in advance. Merely using an AR-enabled mobile device as a 3-D pen for mid-air drawing, as can be done similarly in traditional AR/VR 3-D sketching systems and mobile applications, also typically cannot allow desirable (e.g., practical, suitable, and/or relatively easy) creation of 3-D AR sketches (e.g., concept designs) in situ.

Figure 5:
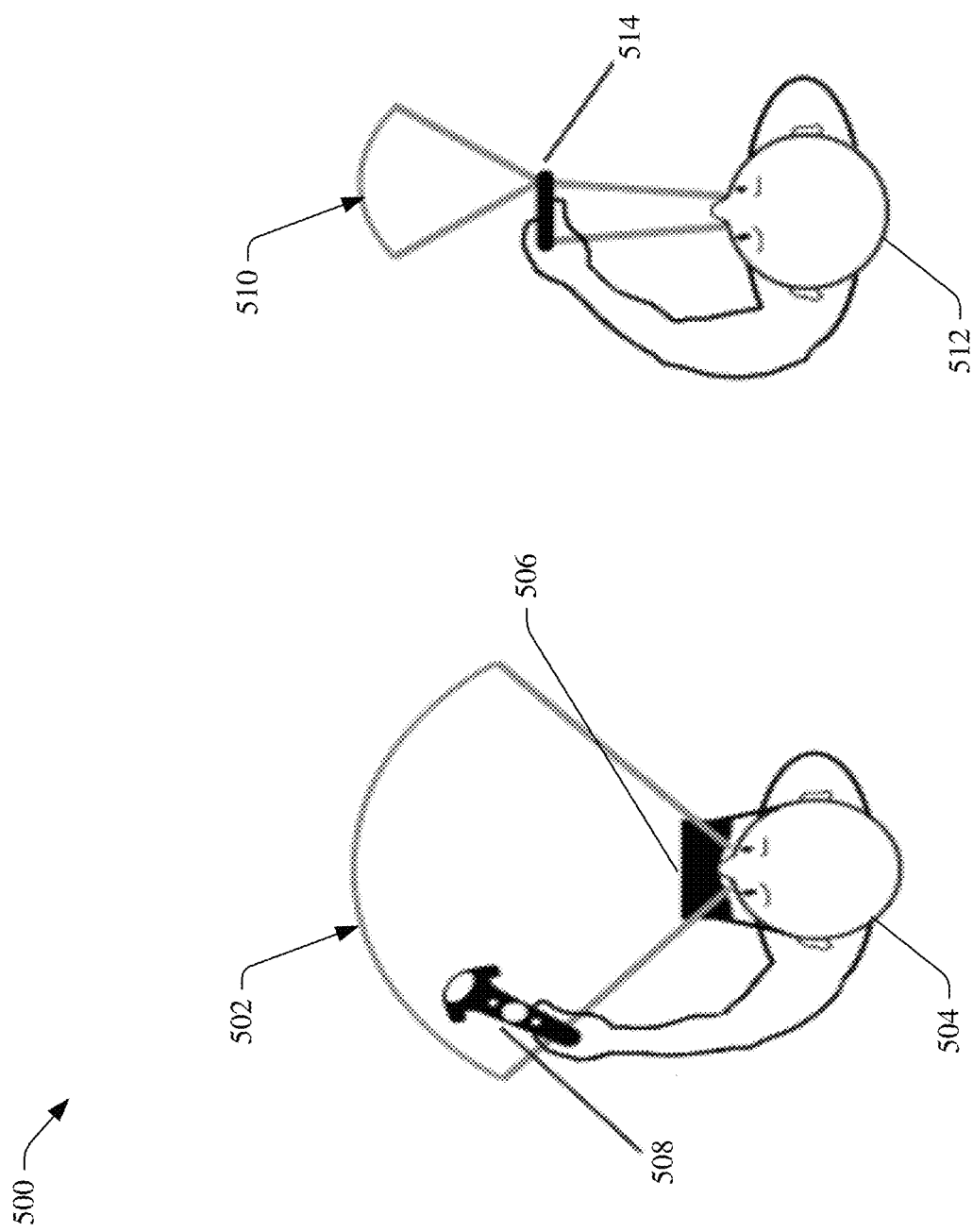
FIG. 5 presents a diagram of respective fields of view of a virtual reality (VR) head-mounted display (HMD) and a display screen of a mobile device.
Figure 6:
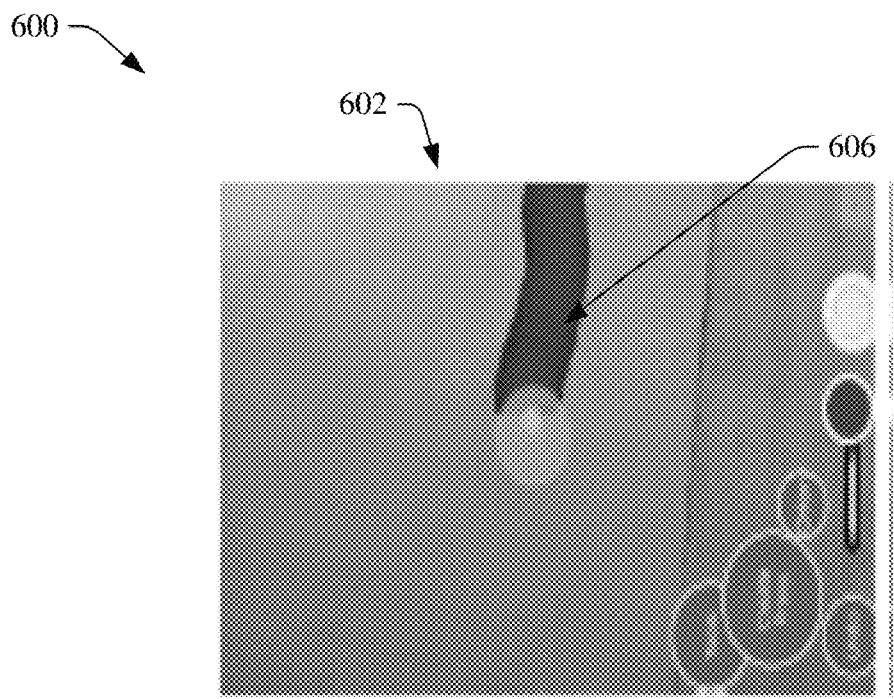
FIG. 6 presents a diagram of example images that can illustrate a lack of context that can result from the relatively narrower field of view of the display screen of the mobile device and the relatively small operation area for multi-touch interaction using the mobile device.
Figure 6:
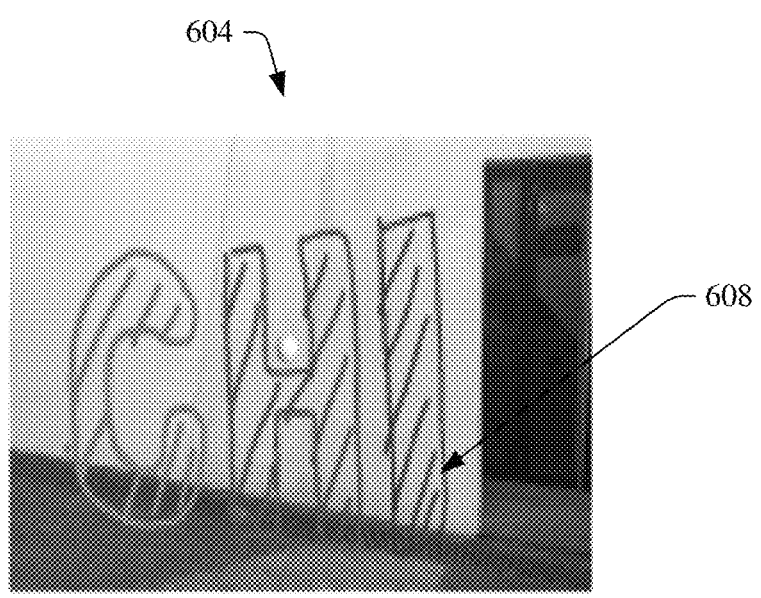

As described herein, mobile AR 3-D sketching can be faced with a number of challenges including the following challenges. 1) It can be difficult to desirably and precisely control the 3-D position and orientation of a device in mid-air without any physical supporting surface. 2) The displays of mobile devices typically may not be stereoscopic, which can make it difficult for users to perceive the depth of 3-D strokes on the display screen, which can result in drawings that have the wrong depth. 3) Display screens on mobile devices typically can have relatively smaller display screens (e.g., as compared to immersive VR displays, such as HMDs, and desktop computers), which can result in a relatively and/or extremely narrower field of view as compared to immersive VR displays (as shown in FIG. 5), and a relatively small operation area for multi-touch interaction, which can cause (e.g., relatively easily cause) users to draw undesirably (e.g., poorly) without seeing the whole context, for example, as illustrated in FIG. 6. 4) The output and 2-D/3-D input of a mobile device can be coupled, wherein such coupling can make it undesirably difficult for users to check whether the depth of a stroke being currently drawn by the user on the mobile device is reasonable or not by examining it from another viewpoint (e.g., another angle). 5) Steadily holding the device in mid-air usually can easily lead to fatigue or errors due in part to shaking of the device.

With further regard to the above-disclosed challenges, referring briefly to FIGS. 5 and 6, FIG. 5 presents a diagram of respective fields of view 500 of a VR HMD and a display screen of a mobile device, and FIG. 6 presents a diagram of example images 600 that can illustrate a lack of context that can result from the relatively narrower field of view of the display screen of the mobile device and the relatively small operation area for multi-touch interaction using the mobile device. With regard to FIG. 5, the respective fields of view 500 of FIG. 5 can comprise a first field of view 502 that a user 504 can have when using an HMD 506 as well as a controller 508, for example, to create VR sketches. The respective fields of view 500 of FIG. 5 also can include a second field of view 510 that a user 512 can have when using a mobile device 514 (e.g., a mobile phone, electronic tablet, or other handheld mobile device) to create AR sketches (e.g., 3-D AR sketches). As can be observed, the first field of view 502 that can be available to the user 504 when using the HMD 506 is significantly wider and larger than the second field of view 510 that can be available to user 512 when using the mobile device 514.

With regard to FIG. 6, the example images 600 can comprise a first image 602 that can include a portion of a 3-D AR sketch created on a mobile device and a second image 604 that can depict all or at least a larger portion of the 3-D AR sketch, including the portion of the 3-D AR sketch depicted in the first image 602, created on the mobile device. As can be observed from the first image 602 and second image 604, due in part to the relatively narrow field of view of the mobile device, there can be a lack of context in the first image 602, as it is not clear what the portion of a stroke 606 relates to in the overall 3-D AR sketch. When viewing the larger portion of the 3-D AR sketch in the second image 604, there can be more context and it can be clearer to the user that the portion of the stroke 606 is part of the "I" 608 in "CHI". The relatively narrower field of view on the smaller display screen of the mobile device, as compared to the HMD, can cause a user to draw strokes or other objects undesirably (e.g., poorly) as the user may be unable to see the whole context of the 3-D AR sketch. This problem can be amplified due in part to the relatively small operation area for multi-touch interaction on the touch display screen using the mobile device.

The disclosed subject matter, employing the sketch generator component 104, can alleviate, mitigate, or overcome these problems associated with the aforementioned challenges and other problems relating to creating 3-D AR sketches using a mobile device, such as disclosed herein.

Figure 7:
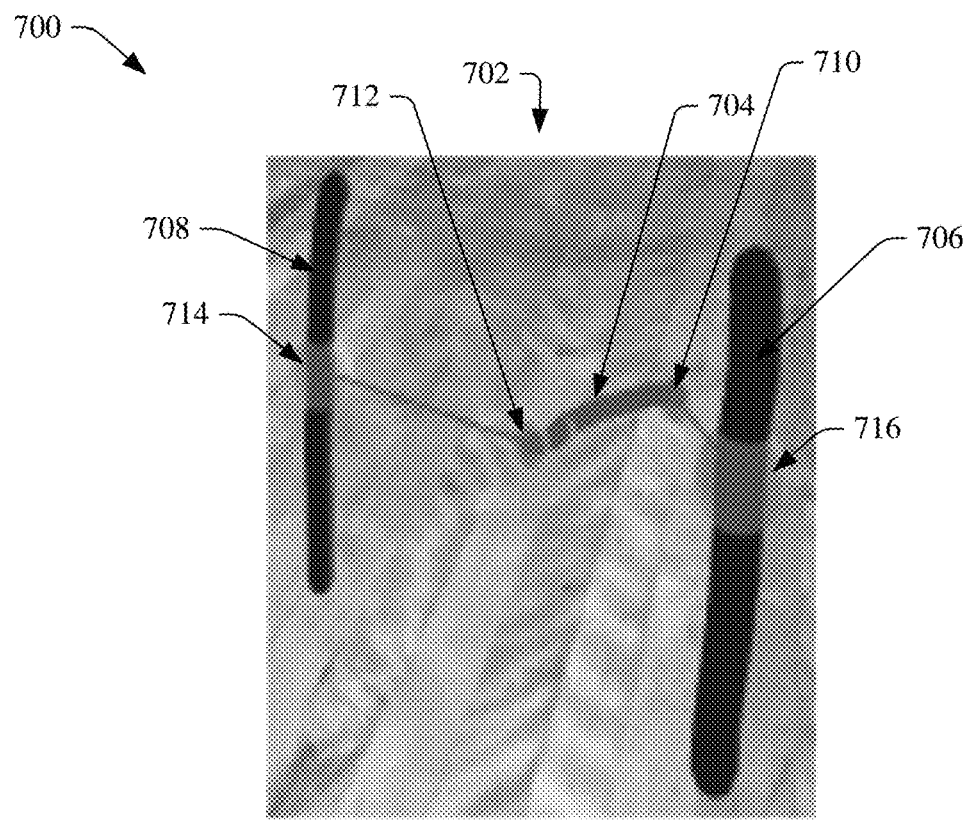
FIG. 7 presents a diagram of example images comprising a first drawing image that can illustrate strokes of a 3-D AR sketch before snapping has been performed, and a second drawing image that can illustrate the strokes of the 3-D AR sketch after snapping has been performed using the enhanced snapping tool, in accordance with various aspects and embodiments of the disclosed subject matter.
Figure 7:
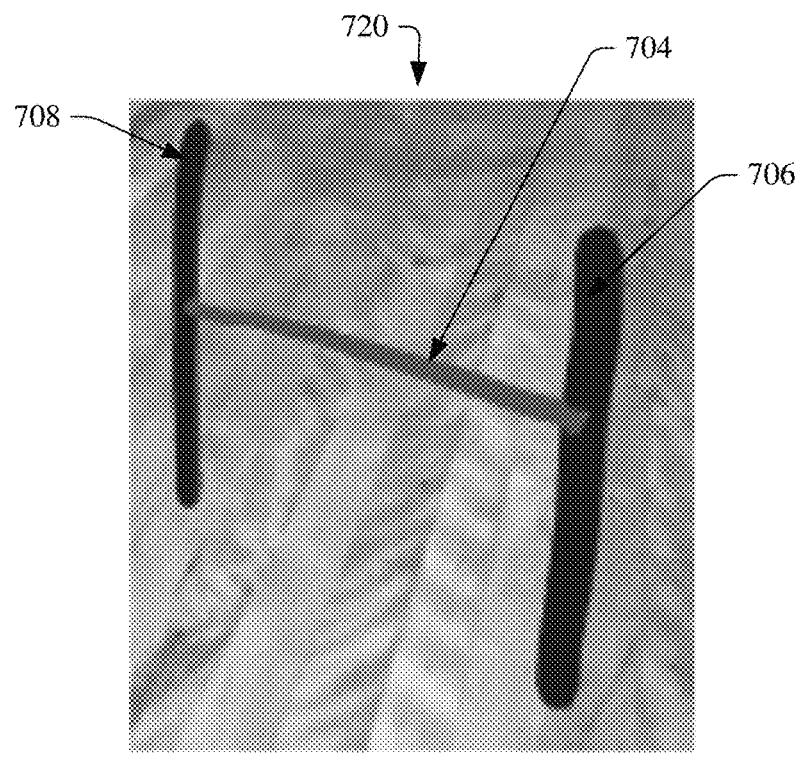

For instance, the sketch generator component 104 can enable a user to sketch (e.g., draw strokes, create surface proxies, create objects, . . . ) with greater precision on the mobile device than traditional systems and techniques. It can be difficult for users to determine the depth of a stroke being drawn from the current viewpoint on the touch display screen of a mobile device due to the lack of a stereoscopic display screen on the mobile device, and the user typically cannot check the depth of the stroke from another viewpoint while drawing the stroke due in part to the coupling of the input (e.g., input information to draw the stroke) and the output (e.g., display of the stroke on the display screen). This often can lead to 3-D curves that appear connected in the 2-D screen space, but actually are separate in the 3-D space. Referring briefly to FIG. 7, FIG. 7 presents a diagram of example images 700 that can illustrate, with regard to a first drawing image 702, a stroke 704 that can appear to be connected to another stroke 706 in a 2-D screen space, while actually not being connected to the other stroke 706 when viewed from a different viewing perspective in the 3-D space (as depicted in the first drawing image 702 of FIG. 7) (other aspects relating to the example images 700 of FIG. 7 will be described herein). Moreover, due in part to the relatively small-sized multi-touch display screen and the well-known "fat finger" problem, the strokes made by the user on the touch display screen actually may not be connected accurately even in the 2-D screen space, let alone be connected accurately in the 3-D space. As more fully described herein, in some embodiments, the sketch generator component 104 and interface component 110 can provide enhanced tools (e.g., enhanced proxy creations tools, enhanced snapping tools, . . . ) that can enable a user to create desirably planar or curved surface proxies and/or perform 3-D snapping of one or both endpoints of a stroke (e.g., 3-D stroke) to another stroke or a surface proxy to enhance drawing precision on a mobile device by users and reduce, mitigate, or suppress connection errors or other issues caused by these problems.

The disclosed subject matter, including the sketch generator component 104 and interface component 110, also can support and provide for relative drawing (e.g., 3-D relative drawing) on the mobile device 102 by the user, in accordance with various aspects and embodiments of the disclosed subject matter, as described herein. Traditional mid-air 3-D sketching systems typically have focused on the use of a tracked stylus for absolute 3-D positioning of a virtual 3-D brush. However, to overcome or mitigate the relatively narrow field of view challenge of mobile devices and create desirably large-sized 3-D AR sketches in mobile AR using a mobile device, users typically have to step away from virtual objects (e.g., a tree) until they see a global context for drawing. As a result, the sketches may be beyond the reach of the arm of the user.

The sketch generator component 104 can be utilized in a relative drawing mode for relative drawing to allow a user to use the mobile device 102 to draw 3-D AR sketches distantly, as well as being utilized in an absolute drawing mode for absolute drawing on the mobile device 102 by the user. To facilitate relative drawing by the user on the mobile device 102, the sketch generator component 104 can utilize the 3-D position from motion tracking relatively, with respect to one or multiple points in an existing 3-D AR sketch.

Figure 8:
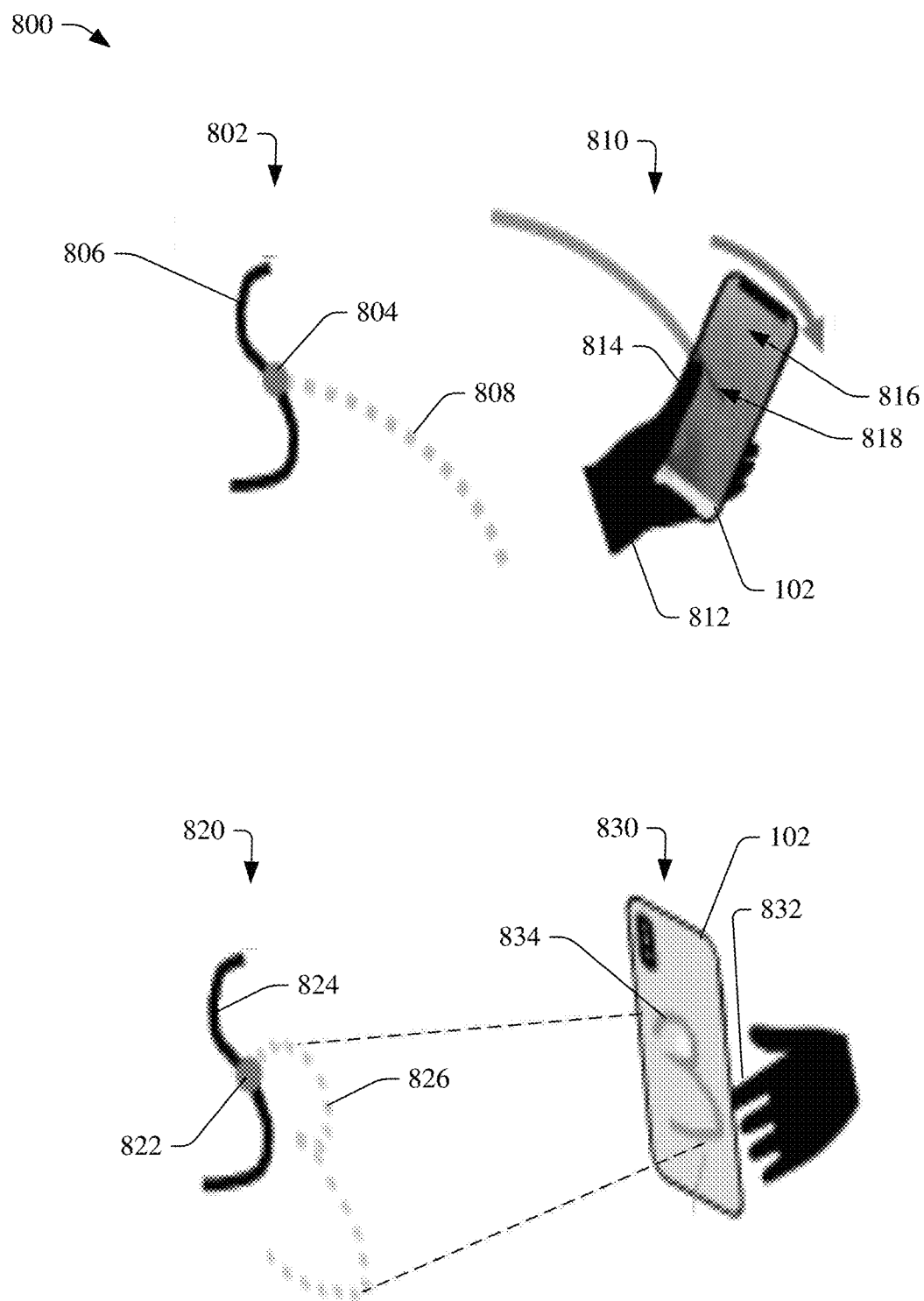
FIG. 8 illustrates a diagram of example images of drawing in the relative drawing mode and the absolute drawing mode on the mobile device, in accordance with various aspects and embodiments of the disclosed subject matter.

Turning briefly to FIG. 8, FIG. 8 illustrates a diagram of example images 800 of drawing in the relative drawing mode and the absolute drawing mode on the mobile device 102, in accordance with various aspects and embodiments of the disclosed subject matter. With or without using a snapping point, the sketch generator component 104 and interface component 110 can operate to enable a user to switch (e.g., easily or seamlessly switch) between relative drawing in the relative drawing mode and absolute drawing in the absolute drawing mode on the mobile device 102. With regard to mid-air 3-D drawing in relative drawing mode, the example images 800 can comprise a relative drawing image 802 that can depict a snapping point 804 of an existing stroke 806, wherein the user can draw a stroke 808 using relative drawing by holding a finger on the touch display screen (e.g., at the snapping point 804) of the mobile device 102 and moving the device 102 in the desired direction of the stroke 808 to draw the stroke 808 extending from the snapping point 804. While in relative drawing mode, the length of the stroke 808 is not limited to the size of the touch display screen (e.g., touch display screen 114). The sketch generator component 104 can determine the size and shape of the stroke 808, and the 3-D position and orientation of respective portions of the stroke 808, based at least in part on the touching (e.g., the location of the touching on the touch display screen 114) by the user and the tracking of the motion (e.g., real-time 3-D motion tracking) of the mobile device 102 as the user is touching the touch display screen (e.g., touch display screen 114) and moving the mobile device 102 in 3-D space.

With regard to mid-air 3-D drawing in absolute drawing mode, the example images 800 can comprise an absolute drawing image 810 that can illustrate the mobile device 102 in the hand 812 of the user, wherein the user can be using a thumb 814 to touch the touch display screen 816 of the mobile device 102 while moving the device 102 relative to the thumb 814 to create a stroke 818. As can be observed, while in absolute drawing mode, the size and shape of the stroke 818 can be limited to the size of the touch display screen 816 and does extend in the sketch beyond the end of the touch display screen 816, even if the user continues to move the mobile device 102.

With regard to surface-based 2-D drawing in relative drawing mode, the example images 800 can comprise a relative drawing image 820 that can depict a snapping point 822 of an existing stroke 824, the user can draw a stroke 826 using relative drawing by holding a finger on the touch display screen (e.g., at the snapping point 822) of the display component 112 (e.g., touch display screen 114 of the display component 112) of the mobile device 102 and moving the device 102 in the desired direction of the stroke 826 to have the stroke 826 (e.g., the number "3") extend from the snapping point 822 on the existing stroke 824. The sketch generator component 104 can determine the size and shape of the stroke 826 and present the stroke 826 on the touch display screen, based at least in part on the touching (e.g., the location of the touching on the touch display screen) by the user and the tracking of the motion of the mobile device 102 as the user is touching the touch display screen and moving the mobile device 102. While in relative drawing mode, the size of the stroke 826 is not limited by the size of the touch display screen.

With regard to surface-based 2-D drawing in absolute drawing mode, the example images 800 can comprise an absolute drawing image 830 that can depict a user using a finger 832 to touch the mobile device 102 (e.g., touch display screen 114 of the mobile device 102) and move the finger on the touch display screen of the mobile device 102 to draw a stroke 834 (e.g., the number "3") on the touch display screen. The sketch generator component 104 can determine the size and shape of the stroke 834 and present the stroke 834 on the touch display screen, based at least in part on the touching (e.g., the location of the touching on the touch display screen) by the user and the movement of the finger 832 of the user on the touch display screen of the mobile device 102 as the user creates the stroke 834. While in absolute drawing mode, the size of the stroke 834 can be limited by the size of the touch display screen.

The disclosed subject matter, by employing the sketch generator component 104 and interface component 110, also can enable desirable interaction with real environments (e.g., real objects in real-world environments) by the mobile device 102 and user. The sketch generator component 104, interface component 110, and other components of the mobile device 102 can enable the user to create 3-D drawing content with respect to 3-D visual content of real 3-D objects or scenes in a real-world environment to create a cohesive 3-D AR sketch comprising the 3-D drawing content and the 3-D visual content, as more fully described herein. The disclosed subject matter can have the capability of being able to understand the surrounding real environment (e.g., environment that surrounds the mobile device 102 and user), for example, by having the sketch generator component 104 and camera component 106 detect (e.g., automatically detect) planar structures (e.g., real planar structures) in a 3-D scene. The sketch generator component 104 can utilize the detected planes or can enable the interactive creation of similar surface proxies on the mobile device 102 by the user to create 3-D AR sketches in situ.

Figure 9:
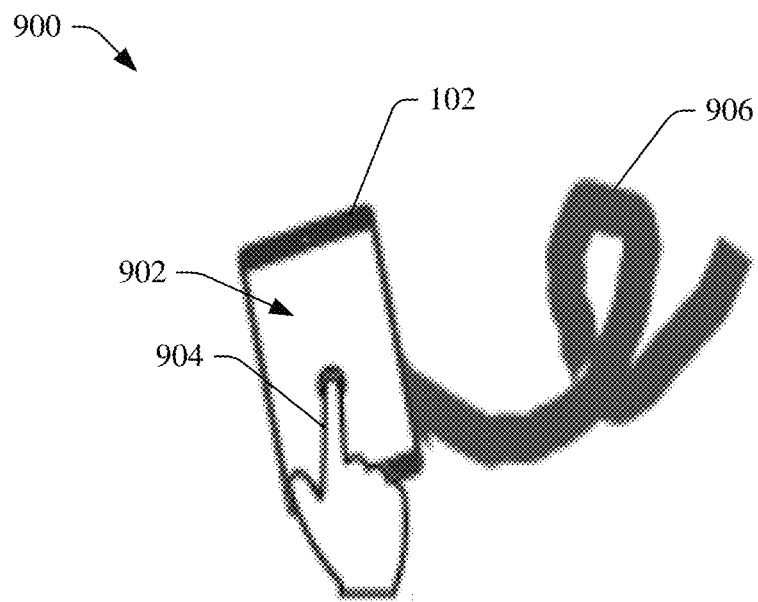
FIG. 9 illustrates a diagram of an example mid-air 3-D drawing operation, in accordance with various aspects and embodiments of the disclosed subject matter.
Figure 10:
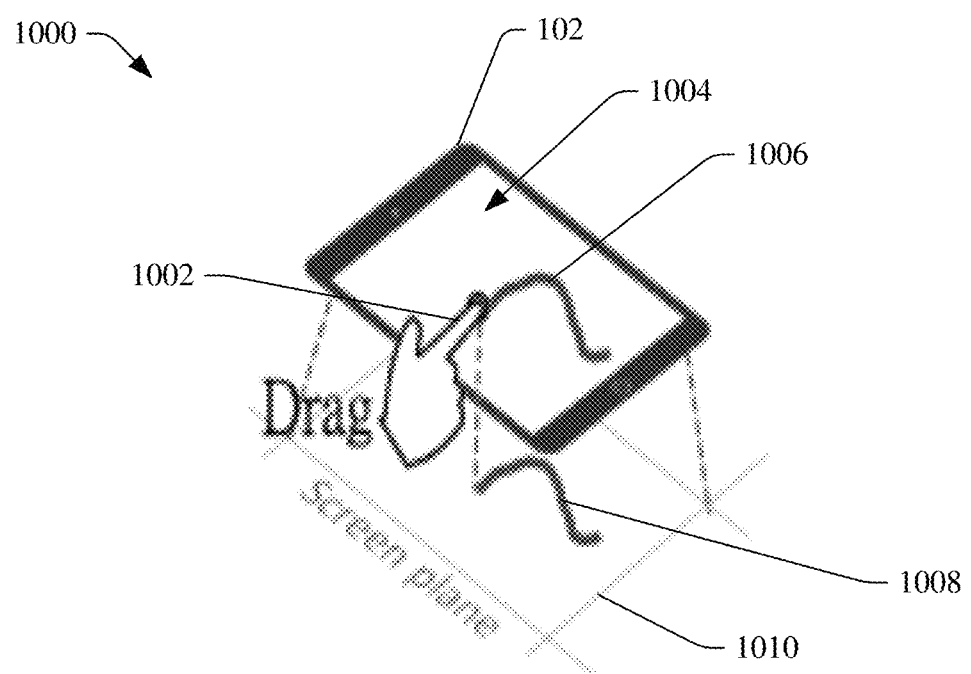
FIG. 10 presents a diagram of an example surface-based two-dimensional (2-D) drawing operation, in accordance with various aspects and embodiments of the disclosed subject matter.
Figure 11:
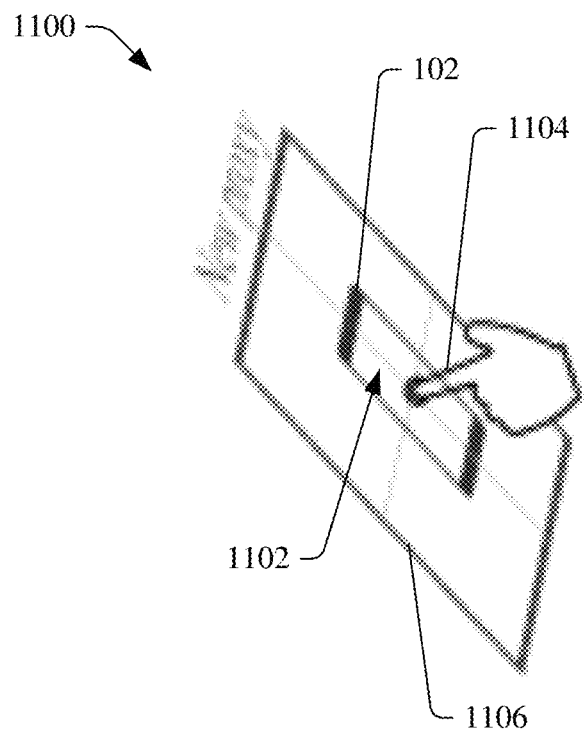
FIG. 11 depicts a diagram of an example proxy creation operation, in accordance with various aspects and embodiments of the disclosed subject matter.
Figure 12:
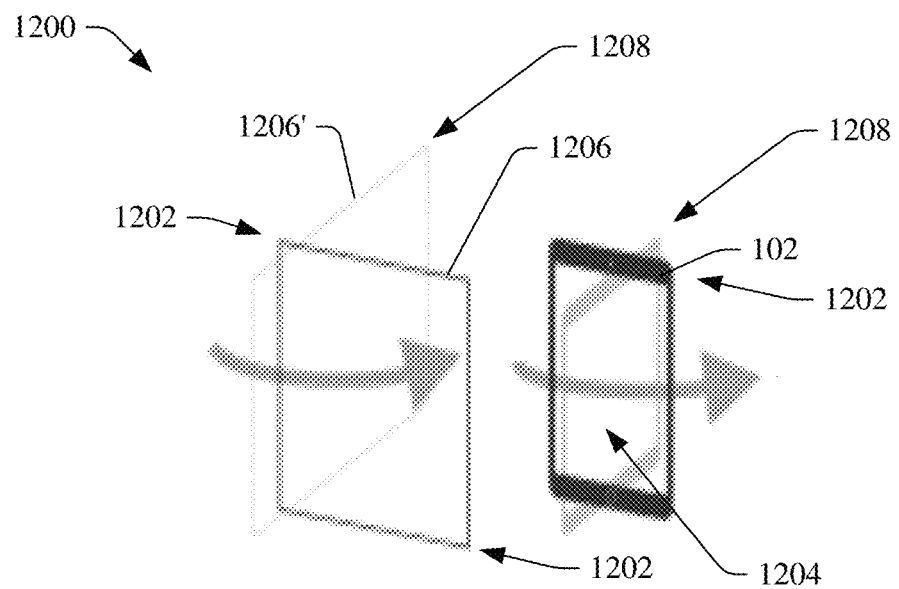
FIG. 12 illustrates a diagram of an example proxy rotation operation, in accordance with various aspects and embodiments of the disclosed subject matter.
Figure 13:
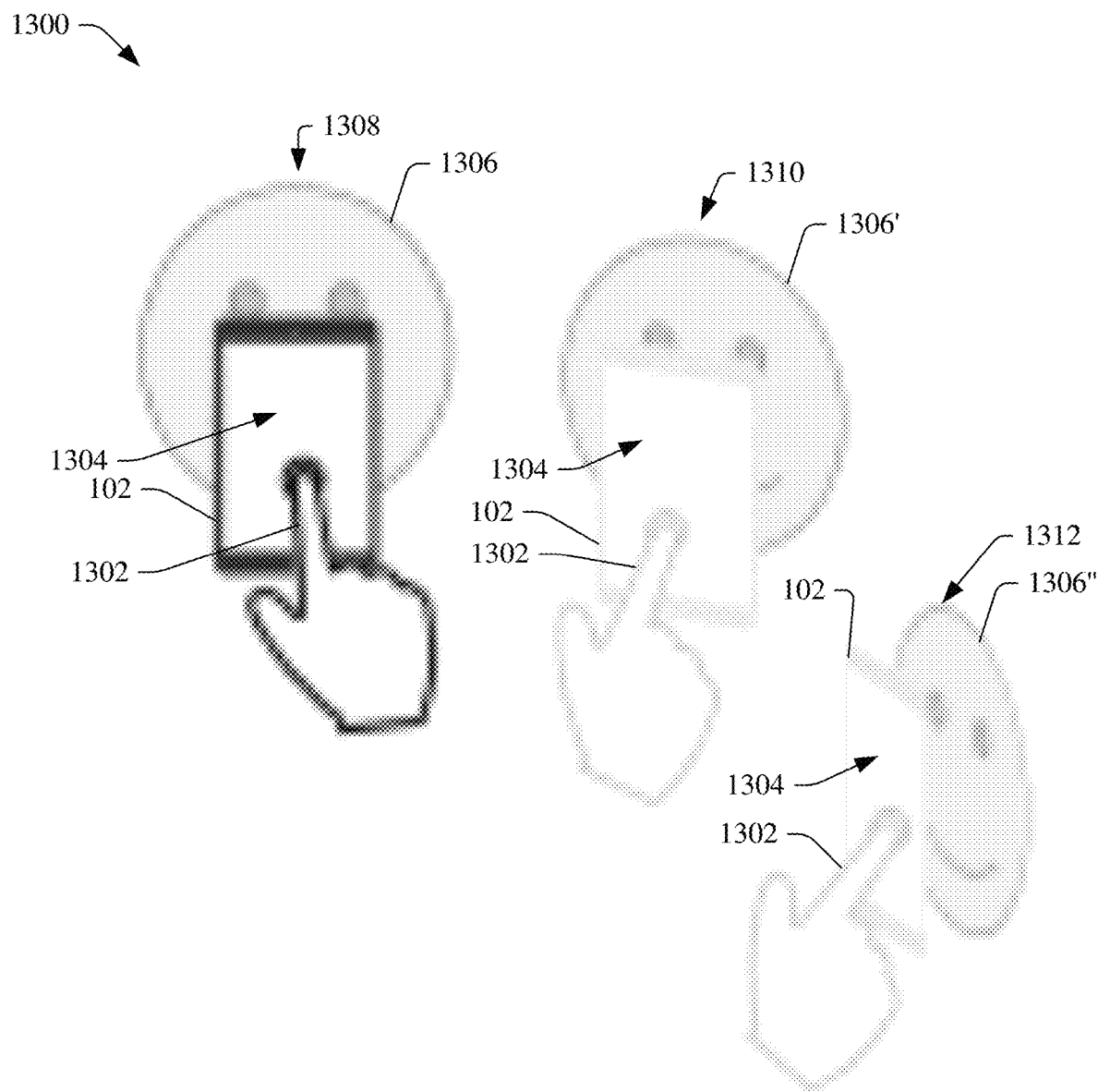
FIG. 13 depicts a diagram of an example cloning operation, in accordance with various aspects and embodiments of the disclosed subject matter.

Referring to FIGS. 9-13 (along with FIG. 1), FIGS. 9-13 depict diagrams of certain example operations that can be performed using the multimodal interface of the interface component 110 and the sketch generator component 104 for 3-D AR sketching on the mobile device 102, in accordance with various aspects and embodiments of the disclosed subject matter. FIG. 9 illustrates a diagram of an example mid-air 3-D drawing operation 900, FIG. 10 presents a diagram of an example surface-based 2-D drawing operation 1000, FIG. 11 depicts a diagram of an example proxy creation operation 1100, FIG. 12 illustrates a diagram of an example proxy rotation operation 1200, and FIG. 13 depicts a diagram of an example cloning operation 1300, in accordance with various aspects and embodiments of the disclosed subject matter.

The mobile device 102 can employ the sketch generator component 104, utilizing an AR platform, that can provide multiple sources of input from the touch display screen (e.g., multi-touch display screen) of the display component 112, motion tracking by the sketch generator component 104 and motion sensor component 108 (e.g., IMU sensors, accelerometer, and/or gyroscope), and/or other data inputs, which can be integrated into a desirable multimodal interface (e.g., interface component 110) to achieve desirable operation and performance of the mobile device 102 for creation of 3-D AR sketches by users. As more fully described herein, the sketch generator component 104 can provide enhanced tools, such as enhanced proxy creation tools and enhanced snapping tools that can enable users to create 3-D AR sketches of desirably and reasonably good quality and detail.

With further regard to FIG. 9, to perform the mid-air 3-D drawing operation 900, the user can be using the sketch generator component 104 of the mobile device 102 in relative drawing mode. The user can touch the touch display screen 902 of the device 102 with a finger 904, and can hold the finger 904 down on the touch display screen 902 while moving the device 102 in mid-air to facilitate creating a stroke 906. The motion sensor component 108 can sense and track the 3-D position, motion, and orientation of the device 102, and thus, the touch display screen 902, as the user is moving the device 102 while holding the finger 904 down in the touch display screen 902. The sketch generator component 104 can analyze the input data (e.g., sensor data, such as touch screen data and motion data) from the touching of the touch display screen 902 by the user's finger 904 and the tracking of the 3-D position, motion, and orientation of the device 102. Based at least in part on the results of analyzing the input data, the sketch generator component 104 can determine the stroke 906 (e.g., mid-air 3-D stroke), including the size, shape, relative position (e.g., relative 3-D position) of the stroke 906 in the real-world environment (e.g., position of the stroke 906 in relation to the real objects of the real world-environment and/or drawing objects the user has previously created for the sketch), and/or other characteristics of the stroke 906, that is being created by the user from the movement of the device 102 while holding the finger 904 on the touch display screen 902. The sketch generator component 104 can facilitate display of the stroke 906 in the 3-D AR sketch, wherein all or a portion of the 3-D AR sketch can be displayed on the touch display screen 902 at a given time, depending in part on viewing perspective of the user with regard to the 3-D AR sketch created on the device 102.

With regard to FIG. 10, to perform the example surface-based 2-D drawing operation 1000, the user can be using the sketch generator component 104 of the mobile device 102 in absolute drawing mode. The user can move (e.g., drag) a finger 1002 in a desired manner on the touch display screen 1004 of the device 102 to create a desired stroke 1006, in accordance with the movement of the finger 1002 on the touch display screen 1004. The sketch generator component 104 can receive input data, such as sensor data, from the touch display screen 1004, wherein the input data can indicate or represent the movement of the finger 1002 on the touch display screen 1004. The sketch generator component 104 can analyze the input data. Based at least in part on the results of the analysis of the input data, the sketch generator component 104 can create a corresponding stroke 1008 on a screen plane 1010 that can correspond to the touch display screen 1004, wherein the corresponding stroke 1008 can be created in relation to any other drawing content previously created by the user for the 3-D AR sketch and/or the visual content of the real-world environment captured by the camera component 106 that is in the screen plane 1010.

Regarding FIG. 11, to perform the example proxy creation operation 1100, the user can select the create proxy tool, which can be presented on the touch display screen 1102 of the mobile device 102 to the user by the sketch generator component 104 via a menu on an interface of the interface component 110. The user can use a finger 1104 to touch a desired location of the touch display screen 1102 while the device 102 is in a desired position and/or orientation in the 3-D space to create a surface proxy 1106 (e.g., planar surface proxy) in relation to the visual content of the real-world environment and/or other drawing content created by the user in the 3-D AR sketch. The sketch generator component 104 can receive input data from the sensors of the touch display screen 1102 that can indicate or represent where the user's finger 1104 is touching the touch display screen 1102 and other input data from the motion sensor component 108 that can indicate the position and/or orientation of the device 102 at the time of the touching of the touch display screen 1102. The sketch generator component 104 can analyze such input data. Based at least in part on the results of analyzing such input data, the sketch generator component 104 can determine the location of the touch display screen 1102 being touched by the user's finger 1104 and determine the position and/or orientation of the device 102 at the time of such touching, and the sketch generator component 104 can generate a surface proxy 1106 in the 3-D AR sketch that can represent or correspond to the location of the touch of the user's finger 1104 on the touch display screen 1102 and the position and/or orientation of the device 102 at the time of such touching. The sketch generator component 104 can present (e.g., display) the surface proxy 1106, or portion thereof, on the touch display screen 1102.

With regard to FIG. 12, to perform the example proxy rotation operation 1200, the user can select the create proxy tool provided by the sketch generator component 104 via an interface of the interface component 110. Using the create proxy tool, the user can create a surface proxy in a first position in the 3-D space. For instance, while the mobile device 102 is in the first position 1202 in the 3-D space the user can touch the touch display screen 1204 of the device 102 to facilitate creating the surface proxy 1206 in the first position 1202 in the 3-D space. The sketch generator component 104 can receive input data from the sensors of the touch display screen 1204 that can indicate or represent where the user is touching the touch display screen 1204 and other input data from the motion sensor component 108 that can indicate the position and/or orientation of the device 102 at the time of the touching of the touch display screen 1204. The sketch generator component 104 can analyze such input data. Based at least in part on the results of analyzing such input data, the sketch generator component 104 can determine the location of the touch display screen 1204 being touched by the user and determine the position and/or orientation of the device 102 at the time of such touching, and the sketch generator component 104 can generate the surface proxy 1206, having the first position 1202 in the 3-D space, in the 3-D AR sketch that can represent or correspond to the location of the user's touching on the touch display screen 1204 and the position and/or orientation of the device 102 at the time of such touching. The sketch generator component 104 can present (e.g., display) the surface proxy 1206, or portion thereof, in the first position 1202, on the touch display screen 1204.

The user can desire to rotate the position of the surface proxy 1206 from the first position 1202 to a second position 1208 in the 3-D space. Using the rotate proxy tool, the user can rotate the surface proxy 1206 from the first position 1202 in the 3-D space to generate surface proxy 1206' in the second position 1208 in the 3-D space. For instance, the user can move (e.g., rotate) the mobile device 102 to the second position 1208 in the 3-D space, and, in response to the user engaging the rotate proxy tool, the sketch generator component 104 can rotate the surface proxy 1206 from the first position 1202 in the 3-D space to generate the corresponding surface proxy 1206' in the second position 1208 in the 3-D space. For example, the sketch generator component 104 can receive input data from the sensors of the touch display screen 1204 that can indicate or represent that the user is engaging the rotate proxy tool and other input data from the motion sensor component 108 that can indicate the position and/or orientation (e.g., second position 1208) of the device 102 at the time of the engaging the rotate proxy tool. The sketch generator component 104 can analyze such input data. Based at least in part on the results of analyzing such input data, the sketch generator component 104 can determine the position and/or orientation (e.g., second position 1208) of the device 102 at the time of engaging the rotate proxy tool, and the sketch generator component 104 can rotate the surface proxy 1206 from the first position 1202 to generate the corresponding surface proxy 1206', in the second position 1208 in the 3-D space, in the 3-D AR sketch. The sketch generator component 104 can present (e.g., display) the surface proxy 1206', or portion thereof, in the second (e.g., rotated) position 1208, on the touch display screen 1204.

Regarding FIG. 13, to perform the example cloning operation 1300, the user can select the create clone tool provided by the sketch generator component 104 via an interface of the interface component 110. The user can use a finger 1302 to touch the touch display screen 1304 of the mobile device 102 to engage the create clone tool and/or to select the object 1306 to be cloned. In response to the user engaging the create clone tool, the sketch generator component 104 can identify and copy an object 1306 that is desired (e.g., selected) to be cloned by the user, wherein the object 1306 can be in a first position 1308 in the 3-D space. For instance, with regard to an object 1306 that is drawn by the user or is a real object captured by the camera component 106, the sketch generator component 104 can identify and copy the object 1306, which can be in the first position 1308.

The user can move the device 102 to a second position 1310, and can select the create clone tool to create a clone object 1306' in the second position 1310 in the 3-D space. In response to the create clone tool being selected or engaged by the user, the sketch generator component 104 can receive input data from the sensors of the touch display screen 1304 that can indicate or represent where the user is touching the touch display screen 1304 and other input data from the motion sensor component 108 that can indicate the position and/or orientation of the device 102 at the time of the touching of the touch display screen 1304. The sketch generator component 104 can analyze such input data. Based at least in part on the results of analyzing such input data, the sketch generator component 104 can determine the location of the touch display screen 1304 being touched by the user and determine the position and/or orientation (e.g., second position 1310) of the device 102 at the time of such touching, and the sketch generator component 104 can generate the clone object 1306', in the second position 1310 in the 3-D AR sketch that can represent or correspond to the location of the user's touching on the touch display screen 1304 and the position and/or orientation of the device 102 at the time of such touching. The sketch generator component 104 can present (e.g., display) the clone object 1306', in the second position 1310 in the 3-D space, on the touch display screen 1304.

If desired, the user can move the device 102 to a third position 1312 in the 3-D space (or one or more other positions), and can select the create clone tool to create another clone object 1306" in the third position 1312 in the 3-D space. In response to the create clone tool again being selected or engaged by the user, the sketch generator component 104 can receive input data from the sensors of the touch display screen 1304 that can indicate or represent where the user is touching the touch display screen 1304 and other input data from the motion sensor component 108 that can indicate the position and/or orientation (e.g., third position 1312) of the device 102 at the time of the touching of the touch display screen 1304. The sketch generator component 104 can analyze such input data. Based at least in part on the results of analyzing such input data, the sketch generator component 104 can determine the location of the touch display screen 1304 being touched by the user and determine the position and/or orientation (e.g., third position 1312) of the device 102 at the time of such touching. The sketch generator component 104 can generate the other clone object 1306", in the third position 1312 in the 3-D space, in the 3-D AR sketch that can represent or correspond to the location of the user's touching on the touch display screen 1304 and the position and/or orientation (e.g., third position 1312) of the device 102 at the time of such touching. The sketch generator component 104 can present (e.g., display) the other clone object 1306", in the third position 1312 in the 3-D space, on the touch display screen 1304. Thus, from these example operations, the 3-D AR sketch can comprise the object 1306 in the first position 1308, the clone object 1306' in the second position 1310, and the other clone object 1306" in the third position 1312, in the 3-D space, wherein the respective objects (e.g., 1306, 1306', and 1306") can have respective features or characteristics based at least in part on the respective positions (e.g., first position 1308, second position 1310, and third position 1312) of the respective objects, which can provide respective viewing perspectives of the respective objects to the user perceiving the 3-D AR sketch.

Figure 14:
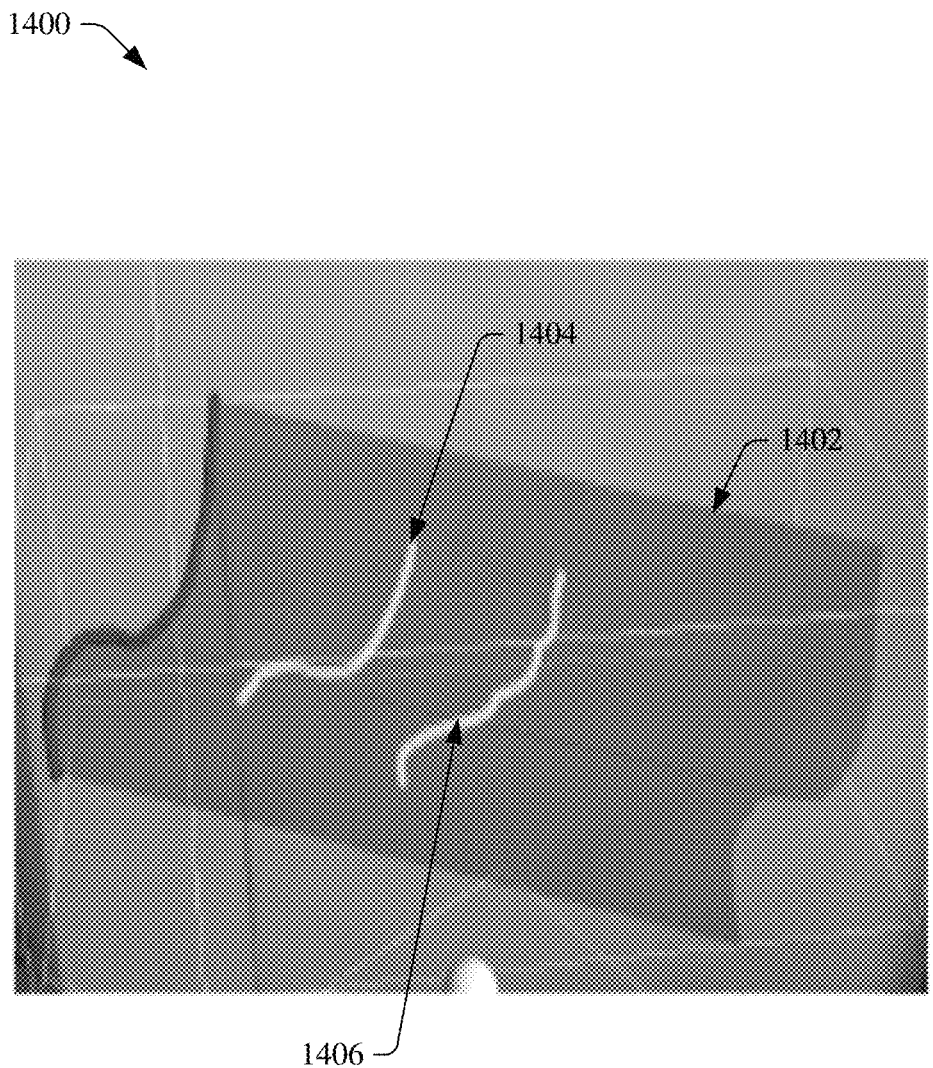
FIG. 14 illustrates a diagram of an example 3-D AR sketch that can include a curved surface proxy that can be used to constrain a stroke, in accordance with various aspects and embodiments of the disclosed subject matter.

In some embodiments, the sketch generator component 104 can enable a user to use a surface proxy (e.g., planar or curved surface proxy) to assist a user in drawing 3-D strokes more precisely by constraining the 3-D strokes onto the surface proxy, in accordance with various aspects and embodiments of the disclosed subject matter. Referring briefly to FIG. 14 (along with FIG. 1), FIG. 14 illustrates a diagram of an example 3-D AR sketch 1400 that can include a curved surface proxy that can be used to constrain a stroke, in accordance with various aspects and embodiments of the disclosed subject matter. Using the create proxy tool, and employing the sketch generator component 104, the user can create (e.g., as generated by the sketch generator component 104) a curved surface proxy 1402, which can be a 3-D curved surface proxy that can have a desired curve or shape, such as illustrated in the 3-D AR sketch 1400 or as shaped as otherwise desired by a user. The size, shape, position (e.g., 3-D position or orientation) and/or other features (e.g., coloring) of the curved surface proxy 1402 can be determined by the sketch generator component 104 based at least in part on the results of analyzing the input data received from various inputs, including touch screen data relating to touching of the touch display screen 114 by the user, which can be received from the touch display screen 114, motion data (e.g., motion data indicating position, orientation, or movement of the device 102) received from the motion sensor component 108, and/or other input data received from one or more other sensors of the device 102. The sketch generator component 104 can generate the determined curved surface proxy 1402 based at least in part on the analysis results, and the curved surface proxy 1402, or portion thereof, can be displayed on the touch display screen 114.

In some instances, the user can desire to draw strokes that conform or substantially conform to the curve of the curved surface proxy 1402. If the user were to attempt to draw the strokes completely freeform, typically the user would have some difficulty precisely drawing the strokes to conform to the curve of the curved surface proxy 1402, particularly with regard to 3-D strokes. The sketch generator component 104 can provide the user with a constrain tool, via the interface of the interface component 110, that can enable the user to constrain a stroke 1404 (e.g., 3-D stroke) to the surface (e.g., curved surface) of the curved surface proxy 1402. For instance, the user can create a stroke (e.g., using a stroke creation tool) by touching the touch display screen 114 of the device 102 and moving the user's finger along the touch display screen 114 to create the stroke. Based at least in part on the results of analyzing input data (e.g., touch screen data, motion data, and/or visual data captured by the camera component 106) relating to the stroke received by the sketch generator component 104, the sketch generator component 104 can generate a stroke that can correspond to the input data. Initially, the stroke may appear like stroke 1406, which is presented as an example of an unconstrained stroke. In response to the user selecting the constrain tool, the sketch generator component 104 can analyze the characteristics or features (e.g., position and/or orientation, shape, size, . . . ) of the initial stroke (e.g., as depicted by stroke 1406) drawn by the user and the characteristics or features of the curved surface of the curved surface proxy 1402. Based at least in part on the results of analyzing the respective characteristics or features of the initial stroke and the curved surface of the curved surface proxy 1402, the sketch generator component 104 can modify the stroke drawn by the user to generate the stroke 1404, which can be constrained to conform, or at least substantially conform, to the curved surface of the curved surface proxy 1402.

Enabling a user to use a surface proxy to constrain 3-D strokes onto a surface of the surface proxy can allow the user to create 3-D strokes more precisely, and can assist in suppressing depth errors, which can be caused by the mobile device 102 shaking as the user is holding the device 102 while drawing. The disclosed subject matter (e.g., employing the sketch generator component 104 and other features of the mobile device 102) also can support, enable, and/or facilitate desirable relative 3-D AR drawing or large-scale 3-D AR sketching by providing tools and features (e.g., constraining 3-D strokes onto surface of a surface proxy) that can allow users to draw (e.g., draw 3-D strokes or other objects) on surface proxies with perspective projection.

While there is generally no easy way to guide precise drawing of individual unconstrained 3-D freeform curves on the touch display screen of a mobile device, the sketch generator component 104 can provide enhanced tools, such as enhanced snapping tools, that can utilize end-point snapping to achieve or create well-connected strokes (e.g., 3-D strokes). In some embodiments, the sketch generator component 104 can enable the user to use the enhanced snapping tool to snap the one or both endpoints of a stroke to one or more points of a 3-D AR sketch. The enhanced snapping tool can enable the user to connect a new 3-D stroke to two existing 3-D strokes in a sketch with relative ease. Referring again briefly to FIG. 7 (along with FIG. 1), FIG. 7 presents a diagram of example images 700 comprising the first drawing image 702 that can illustrate strokes of a 3-D AR sketch before snapping has been performed, and a second drawing image 720 that can illustrate the strokes of the 3-D AR sketch after snapping has been performed using the enhanced snapping tool, in accordance with various aspects and embodiments of the disclosed subject matter.

With regard to the first drawing image 702, the user previously can have drawn stroke 706 and stroke 708 using the mobile device 102. The user, using a finger to touch the touch display screen 114 of the device 102, can draw the stroke 704 with the intention of having the stroke be connected to stroke 706 and stroke 708. In response (e.g., based at least in part on the results of analyzing the input data relating to creating the stroke 704), the sketch generator component 104 can generate the stroke 704 and present the stroke on the touch display screen 114. However, while the user may have intended to connect the endpoints 710 and 712 of stroke 704 to stroke 706 and stroke 708, and even may have thought that one or both endpoints 710 and 712 of stroke 704 were connected to stroke 706 and/or stroke 708 from the viewing perspective the user has, in the 3-D space, it can be observed that the endpoints 710 and 712 of the stroke 704 are not connected to stroke 706 and stroke 708.

Using the enhanced snapping tool, the user can select, or the enhanced snapping tool can recommend, snapping point 714 on stroke 708 and/or snapping point 716 on stroke 706, wherein the snapping point 714 and snapping point 716 can be depicted, displayed, or emphasized, as desired (e.g., depicted as semi-transparent spheres in FIG. 7). The user also can provide input data to the sketch generator component 104, via the touch display screen 114 and/or the interface of the interface component 110, indicating a desire to connect endpoint 710 to snapping point 716 on stroke 706 and endpoint 712 to snapping point 714 on stroke 708. Based at least in part on the results of analyzing such input data, the sketch generator component 104 can modify the stroke 704 to snap the endpoint 710 to snapping point 716 on stroke 706 and endpoint 712 to snapping point 714 on stroke 708, as depicted in the second drawing image 720, which depicts stroke 704, stroke 706, and stroke 708 of the 3-D AR sketch after snapping the endpoints 710 and 712 of the stroke 704 respectively to stroke 706 and stroke 708.

In some embodiments, to achieve and perform relative drawing on the mobile device 102, the user can, if desired, explicitly indicate the user's intention to perform relative drawing by using the enhanced snapping tool to first specify a snapping point (e.g., snapping point 804) on an existing stroke (e.g., stroke 806) or surface proxy in a 3-D AR sketch before drawing a new stroke (e.g., stroke 808), for example, as illustrated in FIG. 8. However, if desired, the user does not have to perform explicit switching between the absolute drawing mode and relative drawing mode, as the sketch generator component 104 can enable the user to switch (e.g., seamlessly, implicitly, and/or easily switch) between the absolute drawing mode and relative drawing mode, since both modes can be achieved by using the same mechanisms of 3-D snapping and surface proxies, employing the enhanced tools, such as described herein.

Figure 15:
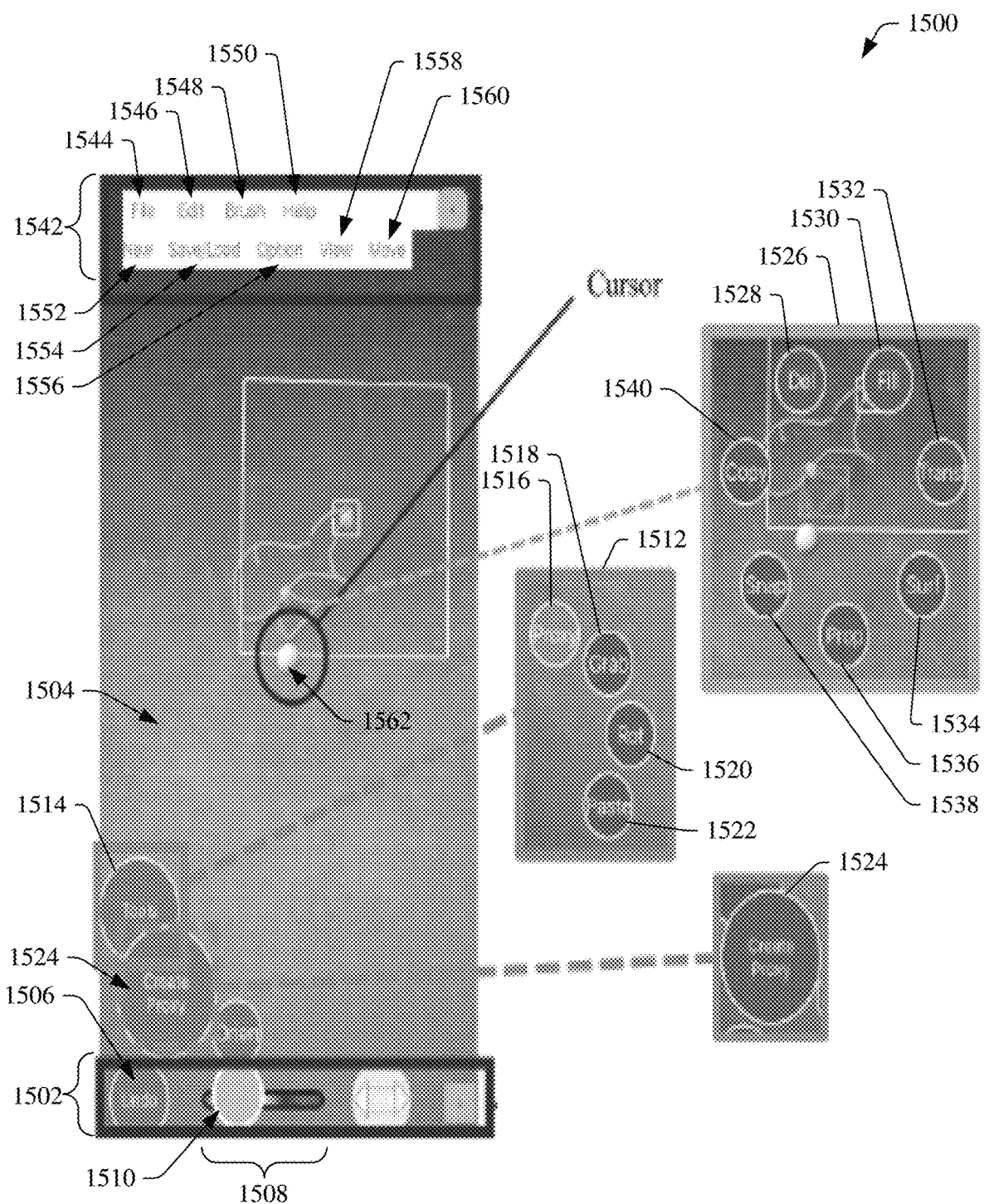
FIG. 15 illustrates a diagram of an example interface that can present various tools (e.g., enhanced tools), buttons, controls, functions, etc., provided by the sketch generator component, in accordance with various aspects and embodiments of the disclosed subject matter.

Turning to FIG. 15 (along with FIG. 1), FIG. 15 illustrates a diagram of an example interface 1500 that can present various tools (e.g., enhanced tools), buttons, controls, functions, etc., provided by the sketch generator component 104, in accordance with various aspects and embodiments of the disclosed subject matter. The interface 1500 can comprise, for example, a shortcut bar 1502, which can be in a desired location on the touch display screen 1504 (e.g., of the display component 112), such as the bottom of the touch display screen 1504. The shortcut bar 1502 can include desired tools, buttons, controls, or functions, etc., which can include frequently used, or otherwise desired tools, buttons, controls, or functions, etc. For example, as depicted in interface 1500, there can be an undo button 1506 that can undo one or more previously performed actions (e.g., drawing a stroke, creating a snapping point, creating a surface proxy, rotating a surface proxy or other object, or cloning an object, . . . ), which the user can desire to undo. While not explicitly shown in the example interface 1500, the shortcut bar 1502 or other menu or tool bar of the interface 1500 can include or present a redo button that, when pressed on the touch display screen 1504 by the user, can redo an action that was previously undone using the undo button 1506 to perform an undo action, or can redo multiple actions, when the redo button is pressed multiple times, to redo (e.g., re-perform) multiple actions that were previously undone using the undo button 1506 to perform multiple undo actions.

The shortcut bar 1502 also can include a color selection control 1508 that can enable the user to select a desired color for use in coloring of filling in with color a stroke, a surface proxy, or other object. The user can touch the color selection control 1508 in the shortcut bar 1502 on the touch display screen 1504 to manipulate the color selection control 1508 to move it to a desired color, wherein the current color can be presented as shown on the button 1510 of the color selection control 1508. The sketch generator component 104 can enable the user to modify the shortcut bar 1502 to change the tools, buttons, controls, or functions, etc., in the shortcut bar 1502, as desired.

The interface 1500 also can comprise a menu 1512 (e.g., a quick fan menu) that can be presented on the touch display screen 1504 by the interface component 110, in response to the user pressing the tools button 1514 on the touch display screen 1504 (for clarity, the menu 1512 is depicted in an exploded view in FIG. 15), wherein the tools button 1514 and associated menu 1512 can be placed in a desired location, such as near the lower left corner, of the touch display screen 1504. The menu 1512 can comprise buttons relating to desired (e.g., commonly used) functions, tools, and operations, for example. For example, as depicted in the menu 1512, the menu can comprise a proxy button 1516 (Proxy), a grab button 1518 (Grab), a rotate button 1520 (Rot), and a paste button 1522 (Paste), although, as desired, there can be other buttons that can be included in the menu 1512, in addition to or as an alternative to, the buttons presented in the menu 1512, as depicted in the example interface 1500.

The user can press the proxy button 1516 to select the proxy button 1516 to facilitate or initiate creating a curved or planar surface proxy in the 3-D AR sketch being drawn on the touch display screen 1504. The user can press the grab button 1518 to select the grab button 1518 to facilitate or initiate moving a selected object with the mobile device 102 in 3-D space to facilitate translation of the selected object in the 3-D AR sketch being drawn on the touch display screen 1504. The user can press the rotate button 1520 to select the rotate button 1520 to facilitate or initiate rotating of an object (e.g., a stroke, a surface proxy, or other object) in the 3-D AR sketch in accordance with the position and/or orientation of the mobile device 102, as the mobile device 102 is moved to rotate the object. The user can press the paste button 1522 to select the paste button 1522 to facilitate or initiate pasting a copied object in a desired location in the 3-D AR sketch.

The interface 1500 also can comprise an action button 1524, which can be located in a desired location on the touch display screen 1504, such as, for example, in proximity to the tools button 1514 near the lower left corner of the touch display screen 1504. The action button 1524 can be pressed by the user to initiate performance of an action or operation based at least in part on a selected tool and/or other factors (e.g., movement of the device 102, and/or touching or movement of the user's finger on the touch display screen 1504, . . . ). For instance, in response to the user pressing the proxy button 1516 in the menu 1512 to select to the create proxy tool, the interface 1500 can modify the action button 1524 to be a create proxy button that, when pressed by the user, can create a desired surface proxy (e.g., planar or curved surface proxy) in the 3-D AR sketch on the touch display screen 1504. The action button 1524 can enable the user to easily repeat the same or similar operation (e.g., create surface proxy) multiple times by pressing the action button multiple times to perform the desired operation in desired locations of the 3-D AR sketch. Such feature of the action button 1524 can be particularly useful for operations for which frequent usage can be desired (e.g., cloning an object multiple times) or for fine tuning (e.g., translation of an object to move the object).

The interface 1500 also can comprise an object menu 1526 (e.g., object fan menu) that can be presented on the touch display screen 1504, in response to input information indicating that the user desires the object menu 1526 to be displayed in the touch display screen 1504. For example, if the user long-presses an already-selected object, such as a virtual or drawn object (e.g., a snapping point, a stroke, or a surface proxy), on the 2-D touch display screen 1504, in response to such input information from the user, the interface component 110 can generate the object menu 1526 and present the object menu 1526 on the touch display screen 1504 in a desired location on the touch display screen 1504, such as, for example, in proximity to the selected object or in another desired location. In some embodiments, the object menu 1526 can be a pop-up menu, wherein the object menu 1526 can initially not be displayed on the interface 1500 on the touch display screen 1504, but the sketch generator component 104 and/or interface component 110 can cause the object menu 1526 to pop-up and be presented on the interface 1500, in response to input information (e.g., long-press on the already-selected object) indicating that the user desires the object menu 1526 to be displayed in the touch display screen 1504.

The object menu 1526 can comprise a desired grouping of buttons, which can be determined (e.g., by the sketch generator component 104 or interface component 110) based at least in part on the object selected and/or a context of the sketch, object, or user, as determined by the sketch generator component 104 based at least in part on the results of analyzing current or historical information relating to the sketch, user activity or preferences, or other information. In the example object menu 1526, the object menu 1526 can comprise a delete button 1528 (Del), a fill button 1530 (Fill), a transformation button 1532 (Trans), a surface creation button 1534 (Surf), a prop button 1536 (Prop), a snap button 1538 (Snap), and a copy button 1540 (Copy). It is to be appreciated and understood that the object menu can comprise other buttons in addition to or as an alternative to those depicted in the example object menu 1526.

The user can press the delete button 1528 to delete the selected object, for example. In response to the delete button 1528 being pressed, the sketch generator component 104 can delete the selected object from the 3-D AR sketch. The user can press the fill button 1530 to fill the selected object with a desired color, such as a color selected by the user using the color selection control 1508. In response to the fill button 1530 being pressed and a desired color having been selected by the user via the color selection control 1508, in the 3-D AR sketch, the sketch generator component 104 can fill the selected object with the selected color.

The user can press the transformation button 1532 to perform a transformation operation on the selected object. In response to the transformation button 1532 being pressed, the sketch generator component 104 can utilize a transformation tool (e.g., 3-D transformation widget or tool) to perform a desired transformation operation (e.g., a 3-D transformation operation) on the selected object (e.g., stroke or surface proxy), for example, to transform the object by moving, rotating, and/or scaling the object, as desired by the user, in the 3-D AR sketch. The transformation tool can perform such transformation operation to transform the selected object (e.g., stroke or surface proxy) with desired accuracy. As an example, the transformation tool can allow the user to create a detailed object (e.g., drawn or virtual object) at a relatively larger scale, and use the transformation tool to scale the object down to the desired size in the sketch (e.g., after the detailed drawing of the object has been completed).

The user can utilize (e.g., press) the surface creation button 1534 to create a surface from or based at least in part on a selected object, such as a stroke (e.g., 3-D stroke) in the 3-D AR sketch. For example, in response to selection (e.g., pressing) of the surface creation button 1534, the sketch generator component 104 can extrude the selected object (e.g., 3-D stroke) as a profile along a straight line or freeform curve by mid-air drawing (e.g., relative drawing) by the user, based at least in part on input data received by the sketch generator component 104 in connection with the surface creation operation. The input data can be received from the sensors of the touch display screen 1504 or the motion sensor component 108, and the input data can comprise touch screen data relating to touching or movement of the user's finger on the touch display screen 1504 and/or motion data relating to movement, orientation, or position of the device 102 during the surface creation operation received from the sensors of the touch display screen 1504 or the motion sensor component 108.

The user can press the snap button 1538 to create a snapping point in a desired location on an object (e.g., a stroke, or a surface proxy). For example, in response to selection of the snap button 1538, and receiving, from the user via the touch display screen 1504, input data indicating a desired location for a snapping point on an object of the 3-D AR sketch, the sketch generator component 104, employing the enhanced snapping tool, can determine the desired location of the snapping point on the object and can generate the snapping point, which can be presented at the desired location on the object, based at least in part on the results of analyzing the input data indicating the desired location of the snapping point. The user can create one or more snapping points in one or more desired locations on one or more objects of the 3-D AR sketch using the enhanced snapping tool that can be engaged in response to selecting the snap button 1538. In some embodiments, in response to selection of the snap button 1538, the sketch generator component 104, employing the enhanced snapping tool, can determine (e.g., automatically or dynamically determine) one or more snapping points that can be placed in one or more locations on one or more objects of a 3-D AR sketch, based at least in part on the context of the 3-D AR sketch, user, mobile device 102, or other desired factors. The sketch generator component 104 can determine the context of the 3-D AR sketch, user, or mobile device 102 based at least in part on the results of analyzing the 3-D AR sketch, current or historical user activity, and/or other desired information.

The user can select the copy button 1540 to copy the selected object (e.g., a snapping point, stroke, or surface proxy) in the 3-D AR sketch. In response to selection of the copy button 1540 by the user, the sketch generator component 104 can copy the selected object, wherein the sketch generator component 104 can store (e.g., temporarily store) data relating to the copied object in a data store of the sketch generator component 104 and/or mobile device 102. The user can utilize the paste button 1522 in the menu 1512, or there can be a paste button in the object menu 1526 for the user to utilize, to paste the copied object in another desired location(s) of the 3-D AR sketch. In response to the paste button (e.g., 1522) being pressed, and input data indicating the desired location for pasting the copied object, the sketch generator component 104 can paste the copied object in the desired location in the 3-D AR sketch.

In some embodiments, the example interface 1500 also can include a tool bar 1542, which can be presented in a desired location of the interface 1500 on the touch display screen 1504, such as at or near the top of the touch display screen 1504 (as depicted in FIG. 15). The tool bar 1542 can comprise a set of desired buttons or functions, such as, for example, a file button 1544, an edit button 1546, a brush button 1548, a help button 1550, a new button 1552, a save/load button 1554, an option button 1556, a view button 1558, a move button 1560, or other desired buttons. The file button 1544, when pressed by the user, can open up another menu on the interface 1500 that can present the user with a list of buttons and associated options, such as, for example, create a new file, save the current file (e.g., file of the 3-D AR sketch), open a file, close the current file, print the current file on a printer, print the current file as a document in a desired format (e.g., a visual image document in a JPEG format, or an electronic document in a portable document format (PDF)), or other desired buttons and associated options. In response to the selection of a particular button presented in response to pressing of the file button 1544, the sketch generator component 104 can perform the operation (e.g., create a new file, save the current file, open a file, close the current file, or print the file, . . . ) associated with the particular button selected by the user.

The edit button 1546, when pressed by the user, can open up and present another menu on the interface 1500 that can present the user with a list of buttons and associated options relating to editing of the 3-D AR sketch. For example, such list of buttons can comprise a copy button, a paste button, a select button, a select all button, an undo button, or a redo button. In response to the selection of a particular button presented in such other menu in response to pressing of the edit button 1546, the sketch generator component 104 can perform, or initiate or facilitate performance of, the operation (e.g., copy an object, paste an object, select an object, select all objects in the sketch, undo an action, or redo an action that had been undone, . . . ) associated with the particular button selected by the user.

The brush button 1548, when pressed by the user, can open up and present another menu on the interface 1500 that can present the user with a list of buttons and associated options relating to brushes that can be used to draw objects or content in the 3-D AR sketch. For example, such list of buttons can comprise a brush size button to select or change a brush size of the brush, a brush type button that can be used to select or change the type of brush used, or one or more other desired buttons relating to brush characteristics of brushes. In response to the selection of a particular button presented in this other menu in response to pressing of the brush button 1548, the sketch generator component 104 can perform, or initiate or facilitate performance of, the operation (e.g., select or change brush size, select or change brush type, select or change another characteristic of a brush) associated with the particular button selected by the user.

The help button 1550, when pressed by the user, can open up and present another menu on the interface 1500 that can present the user with a menu or list of buttons or functions and associated options relating to assistance that can be provided to the user in connection with using the sketching application (e.g., employing the sketch generator component 104) of the disclosed subject matter. Such list of buttons or functions can comprise a listing of help topics, a search field or search engine for searching for information regarding a desired topic, an update button that can be selected to check for an update or initiate performance of an update of the sketching application, or other desired assistance-related buttons, functions, or information. In response to the selection of a particular button or function presented in such menu or list relating to assistance to the user, in response to pressing of the help button 1550, the sketch generator component 104 can perform, or initiate or facilitate performance of, the selected operation (e.g., present a list of help topics, present information regarding a help topic selected by the user, check for a software update for the sketching application, initiate a software update of the sketching application, or provide other assistance-related information to the user) associated with the particular button selected by the user.

The new button 1552, when pressed by the user, can initiate or facilitate creation of a new file or new file template. In response to the pressing of the new button 1552 by the user, the sketch generator component 104 can create or initiate creation of a new file or new file template for use in drawing a sketch, or can query the user regarding whether the user desires to create a new file or new file template.

The save/load button 1554, when selected by the user, can initiate or facilitate saving the current file comprising the 3-D AR sketch or saving a desired set of parameters associated with the sketch or the file. For instance, in response to the pressing of the save/load button 1554 by the user, with regard to saving a file, the sketch generator component 104 can save the current file, or can query the user regarding whether the user desires to save the current file. With regard to saving parameters, in response to the pressing of the save/load button 1554 by the user, the sketch generator component 104 can save the desired set of parameters, or can query the user regarding whether the user desires to save such set of parameters.

The option button 1556, when pressed by the user, can initiate or facilitate presenting the user with a menu or list of various other types of options or functions associated with drawing 3-D AR sketches or otherwise using the sketching application. For instance, in response to the pressing of the option button 1556 by the user, the sketch generator component 104 can present such menu or list of the various other types of options or functions associated with drawing 3-D AR sketches or otherwise using the sketching application, and/or can initiate or perform a desired action associated with (e.g., corresponding or responsive to) the option or function selected by the user.

The view button 1558, when selected by the user, can initiate or facilitate presenting the user with a menu of buttons or options relating to viewing of the 3-D AR sketch or associated file in general. Such menu can comprise, for example, a zoom in button, a zoom out button, a custom zoom button, a 3-D view button, a ruler button, a gridline button, or other desired buttons relating to viewing the sketch or associated file. In response to the selection of a particular button or option presented in such menu relating to viewing of the sketch or associated file, the sketch generator component 104 can perform, or initiate or facilitate performance of, the selected operation (e.g., zoom in to enlarge a desired portion of the sketch, zoom out to reduce the presentation size of the sketch, customize a zoom setting to enlarge or reduce presentation of the sketch, or portion thereof, change a 3-D view of the sketch on the interface 1500, generate and present a ruler on the interface 1500, generate and present gridlines on the interface 1500, or perform another view-related operation) associated with the particular button selected by the user.

The move button 1560, when pressed by the user, can initiate or facilitate presenting the user with a menu of buttons or options relating to moving an object of the 3-D AR sketch. The moving of the object can be performed in the 3-D space, wherein the object can be moved in relation to other objects (e.g., real or virtual (e.g., drawn) objects) of the 3-D AR sketch. In response to the selection of a particular button or option presented in such menu relating to moving of an object of the sketch, the sketch generator component 104 can perform, or initiate or facilitate performance of, the selected operation associated with the particular button selected by the user to desirably move the object within the 3-D AR sketch.

In some embodiments, the example interface 1500 also can comprise a cursor object 1562, which can be located in various locations on the touch display screen 1504, based at least in part on the touching of the touch display screen 1504 by the user, the mode (e.g., relative drawing mode, or absolute drawing mode) the sketching application is in, or other factors. For example, during mid-air drawing in relative drawing mode, the cursor object 1562 typically can be in the center of the touch display screen 1504, wherein the user can press the cursor object 1562 and move the device 102 to facilitate creating desired objects (e.g., 3-D strokes) in the 3-D AR sketch. The user can move the cursor object 1562, by touching or manipulating the cursor object 1562, to move the cursor object 1562 to another desired location on the touch display screen 1504, if desired by the user. In response, the sketch generator component 104 and/or interface component 110 can move the cursor object to the desired location on the touch display screen 1504, based at least in part on the input data relating to touch and manipulating the cursor object 1562 received from the touch screen sensors.

With further regard to some of the operations or functions that can be performed using the sketching application, comprising the sketch generator component 104, interface component 110, and other components of the device 102, Table 1 provides a listing of some of these example operations or functions. In Table 1, the term object can refer to, for example, individual strokes, a group of strokes, or a surface proxy; and "MoT" can mean motion tracking of the motion, position, or orientation of the device 102 by the sketch generator component 104 and associated sensors (e.g., camera component 106, motion sensor component 108, and/or touch screen sensors, . . . ).

TABLE 1

| Operation | Input | Description |
| --- | --- | --- |
| Selection | touch | Single-finger tap for selecting a stroke or snapping point; or two-finger tap for selecting a surface proxy. A surface proxy also can also be selected by single-finger tapping its center. Tap on any empty space for deselection of the stroke, snapping point, or surface proxy. |
| Translation | MoT, touch | A selected object can move with the mobile device in space when the "Grab" action button is being pressed. An optional constraint for vertical translation also can be provided. |
| Rotate | IMU, touch | A selected object can rotate according to the orientation of the mobile device when the "Rotate" action button is being pressed. |
| Scaling | touch | Two-finger pinch gesture for scaling up/down a selected object. |

TABLE 1-continued

| Operation | Input | Description |
| --- | --- | --- |
| Zoom-in/out | IMU, touch | Two-finger pinch gesture for moving a selected object along the mobile device's viewing direction when the "Grab" action button is being pressed. |
| Cloning | MoT, touch | Copy a selected object, and place it in front of the mobile device when the "Paste" action button is tapped. |
| Deletion | touch | Long-press a selected stroke, surface proxy, or snapping point and then choose "Del" in the menu (e.g., pop-up fan menu). |

From Table 1, and/or as more fully described herein, based at least in part on input data received from the user by touching the touch display screen 1504, the sketch generator component 104 can perform the desired selection operation. For example, if the user performs a single-finger tap on a stroke or a snapping point in the 3-D AR sketch, the sketch generator component 104 can select the stroke or snapping point in the sketch, based at least in part on the results of analyzing the input data received from the touch screen sensors associated with the touch display screen 1504, wherein such input data can indicate that the user performed a single-finger tap on the stroke or snapping point. In selecting the stroke or snapping point, the sketch generator component 104 can present or facilitate presenting, via the interface component 110, on the touch display screen 1504 the selected stroke or snapping point in an emphasized or highlighted manner, relative to unselected objects (e.g., strokes or snapping points that are not selected). Such emphasis or highlighting can comprise, for example, presenting the selected stroke or snapping point with a different color or different colored outline than unselected objects, presenting the selected stroke or snapping point in a semi-transparent manner, presenting the selected stroke or snapping point with a different level of brightness relative to unselected objects, or presenting the selected stroke or snapping point with another desired type of emphasis or highlighting relative to unselected objects.

As another example, in response to the user using two fingers to tap on a surface proxy or a single finger to tap on a center portion of the surface proxy, the sketch generator component 104 can select the surface proxy in the sketch, based at least in part on the results of analyzing the input data received from the touch screen sensors associated with the touch display screen 1504, wherein such input data can indicate that the user performed a single-finger tap on the surface proxy or a two-finger tap on the center portion of the surface proxy. In selecting the surface proxy, the sketch generator component 104 can present or facilitate presenting, via the interface component 110, on the touch display screen 1504 the selected surface proxy in an emphasized or highlighted manner, relative to unselected objects (e.g., surface proxies that are not selected), that can be the same as or similar to that described herein with regard to emphasizing or highlighting selected strokes or snapping points.

The user can deselect a selected object, such as a selected stroke, snapping point, or surface proxy by tapping on an empty space on the touch display screen 1504. In response to receiving input data received from the user by touching an empty space (e.g., a space with no virtual object) on the touch display screen 1504, the sketch generator component 104 can perform the desired deselection operation to deselect a selected object.

From Table 1, and/or as more fully described herein, based at least in part on input data received from the user by touching the touch display screen 1504 and motion tracking data received from other sensors (e.g., camera component 106, motion sensor component 108) of the device 102, the sketch generator component 104 can perform the desired translation operation on a selected object (e.g., stroke or surface proxy) of the 3-D AR sketch. For example, in response to the user pressing the grab action button (e.g., action button 1524 after the grab button 1518 is selected from the menu 1512) and as the user moves the device 102 in 3-D space, the sketch generator component 104 can move the selected object with the device 102 in the 3-D space to translate the position, orientation, viewing perspective, and/or other features of the object in the 3-D AR sketch, based at least in part on (e.g., in accordance with) the results of analyzing the touch screen data and motion tracking data. In some embodiments, the translation tool can comprise a constraint for vertical translation, wherein the sketch generator component 104 can constrain translation of the position, orientation, viewing perspective, and/or other features of the object to allow translation of the object in the vertical direction in the 3-D AR sketch, but not allow translation of the object in the horizontal or other direction, even if the user moves the device 102 in a direction that would otherwise result in translation in the horizontal or other direction.

In certain embodiments, from Table 1, and/or as more fully described herein, based at least in part on input data received from the user by touching the touch display screen 1504 and motion data received from other sensors (e.g., camera component 106, motion sensor component 108 (e.g., IMU, accelerometer, and/or gyroscope)) of the device 102, the sketch generator component 104 can perform the desired rotation operation on a selected object (e.g., stroke or surface proxy) of the 3-D AR sketch. For instance, in response to the user pressing the rotate action button (e.g., action button 1524 after the rotate button 1520 is selected from the menu 1512) and as the user moves the device 102 in 3-D space, the sketch generator component 104 can rotate the selected object (e.g., stroke or surface proxy) with the device 102 in the 3-D space, in accordance with the orientation of the device 102, to rotate the position or orientation of the object in the 3-D AR sketch from a first (e.g., initial) position to a second position in the 3-D space that can correspond to the orientation of the device 102 at the end of the rotation operation, based at least in part on (e.g., in accordance with) the results of analyzing the touch screen data and the motion data. An example rotation of an object from performing a rotation operation is depicted in FIG. 12 and is more fully described herein in connection with FIG. 12.

From Table 1, and/or as more fully described herein, the user can use a two-finger pinch gesture to scale up or scale down in size a selected object of a 3-D AR sketch, wherein, for example, a two-finger pinch gesture that is expanding outward (e.g., fingers moving away from each other) can represent a scale up operation, and wherein a two-pinch gesture that is contracting or moving inward (e.g., fingers moving toward each other) can represent a scale down operation. Based at least in part on input data (e.g., two-finger pinch gesture) received from the user by touching the touch display screen 1504, the sketch generator component 104 can perform a desired scaling operation on a selected object (e.g., stroke or surface proxy) of the 3-D AR sketch to scale the size of the selected object to increase (e.g., scale up) or decrease (e.g., scale down) the size of the selected object. For example, in response to the user pressing a scale button from a menu (e.g., menu 1512, menu 1526, or menu from or accessible via the tool bar 1542, . . . ), the sketch generator component 104 can scale the selected object to increase or decrease the size of the selected object, as desired by the user, based at least in part on (e.g., in accordance with) the results of analyzing the touch screen data relating to the received input data (e.g., two-finger pinch gesture).

In some embodiments, as presented in Table 1, and/or as more fully described herein, the user can touch the touch display screen 1504 using a zoom-in two-finger pinch gesture (e.g., fingers moving away from each other) to zoom in or a zoom-out two-finger pinch gesture (e.g., fingers moving toward each other) to zoom out with respect to a selected object of a 3-D AR sketch. For example, the two-finger pinch gesture can be used to move the selected object along the viewing direction of the mobile device 102 when the grab action button is being pressed by the user. For instance, in response to the user pressing the grab action button (e.g., action button 1524 after the grab button 1518 is selected from the menu 1512), the sketch generator component 104 can perform a desired zoom in operation or zoom out operation on the selected object (e.g., snapping point, stroke, or surface proxy) of the 3-D AR sketch to zoom in on or zoom out from the selected object by moving the selected object along the mobile device's viewing direction as the grab action button is being pressed by the user, based at least in part on the results of analyzing the input data (e.g., two-finger pinch gesture) received from the user by touching the touch display screen 1504 and motion data received from other sensors (e.g., camera component 106, motion sensor component 108) of the device 102.

Also, as depicted in Table 1, and/or as more fully described herein, based at least in part on input data received from the user by touching the touch display screen 1504 and motion tracking data received from other sensors of the device 102, the sketch generator component 104 can perform a desired cloning operation. For instance, after selecting an object (e.g., stroke or surface proxy) in a 3-D AR sketch, the user can select a copy button (e.g., copy button 1540 in the object menu 1526) of the interface 1500 to copy the selected object. In response to this input information, the sketch generator component 104 can copy the selected object. The user can move the mobile device 102 in the 3-D space in connection with desiring to clone the selected object in another location of the 3-D AR sketch. The sketch generator component 104 can track the motion of the device 102 as the device is moved, based at least in part on the results of analyzing motion tracking data received from various sensors (e.g., motion sensor component 108, camera component 106) of the device 102. At a desired location in the 3-D AR sketch, the user can select the paste action button (e.g., action button 1524 after selecting the paste button 1522 in the menu 1512) to paste a clone object of the copied/selected object in the desired location in the 3-D AR sketch (e.g., a location in front of the device 102). Based at least in part on paste action to create the clone object in the desired location and the position and/or orientation of the device 102, as determined by the sketch generator component 104 from analyzing the motion tracking data, the sketch generator component 104 can create the clone object in the desired location of the 3-D AR sketch (e.g., a location in front of the device 102), wherein the features of the clone object can be modified or translated, in accordance with the 3-D position and/or orientation of the device 102 at the point the clone object was created in the sketch relative to the original 3-D position and/or orientation of the device 102 at the point the selected object was copied. An example cloning of an object from performing a clone operation is depicted in FIG. 13 and is more fully described herein in connection with FIG. 13.

In certain embodiments, as presented in Table 1, and/or as more fully described herein, the user can use a long-press touch interaction on a selected object (e.g., stroke, surface proxy, or snapping point) on the touch display screen 1504 and select a delete button (e.g., delete button 1528 from object menu 1526) to delete the selected object from a 3-D AR sketch. The sketch generator component 104 can receive input data relating to the long-press touch interaction on the selected object from the touch screen sensors associated with the touch display screen 1504. In response to the long-press interaction on the selected object, the sketch generator component 104 and/or the interface component 110 can present or facilitate presenting the object menu 1526 (e.g., as a pop-up fan menu) on the interface 1500 presented on the touch display screen 1504. In response to the user pressing the delete button 1528 from object menu 1526, the sketch generator component 104 can delete the selected object from the sketch, based at least in part on the results of analyzing the input data (e.g., pressing of the delete button 1528) received from the user.

It is to be appreciated and understood that the example operations of TABLE 1 are only a portion of the operations that can be performed using the sketching application, comprising the sketch generator component 104, interface component 110, and other components of the sketching application. The sketching application can comprise and can provide, to the user, various other types of sketching-related operations, including, for example, other operations, functions, and/or features, such as described herein.

Figure 16:
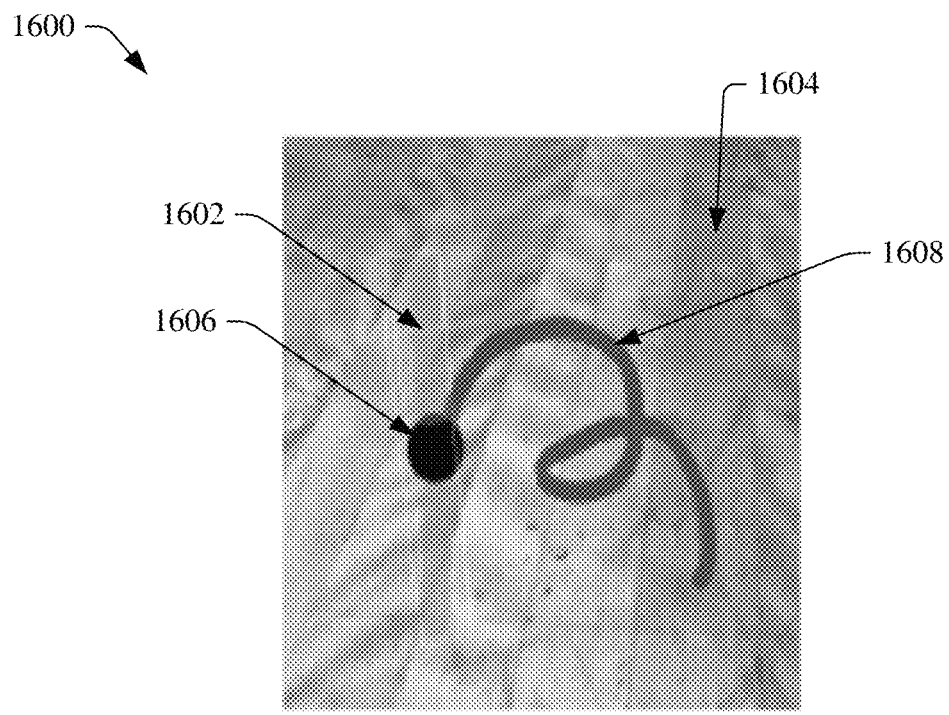
FIG. 16 illustrates a diagram of example sketch image of a stroke that can be created with respect to another (e.g., an existing) stroke, in accordance with various aspects and embodiments of the disclosed subject matter.
Figure 17:
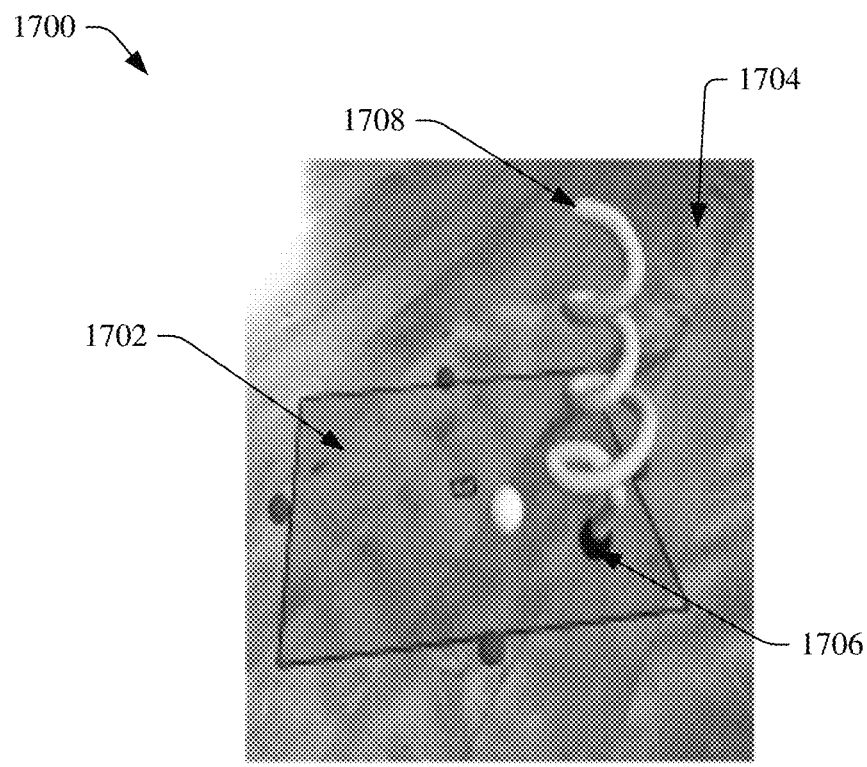
FIG. 17 illustrates a diagram of example sketch image of a stroke that can be created with respect to a surface proxy, in accordance with various aspects and embodiments of the disclosed subject matter.

Some of the primary components of 3-D AR sketching can include, for example, 3-D strokes, snapping points, and surface proxies. Further aspects of 3-D strokes, snapping points, and surface proxies will now be described in relation to various figures and with regard to the system 100 of FIG. 1. In the system 100, the sketch generator component 104 can generate and render strokes (e.g., 3-D strokes) as generalized cylinders. Referring briefly to FIGS. 16 and 17 (along with FIG. 1), FIG. 16 illustrates a diagram of example sketch image 1600 of a stroke that can be created with respect to another (e.g., an existing) stroke, and FIG. 17 illustrates a diagram of example sketch image 1700 of a stroke that can be created with respect to a surface proxy, in accordance with various aspects and embodiments of the disclosed subject matter. With regard to the example sketch image 1600 and sketch image 1700, the respective strokes can be created by a user, for example, by performing relative drawing with the device 102 in the relative drawing mode from explicitly specified snapping points on a selected stroke or surface proxy.

With regard to sketch image 1600 of FIG. 16, there can be an existing stroke 1602 that can be created by the user and positioned relative to visual content 1604 of a real-world environment in the 3-D AR sketch depicted in the sketch image 1600. In some embodiments, the user can utilize the enhanced snapping tool provided by the sketch generator component 104 to create a snapping point 1606 at a desired point on the existing stroke 1602. For instance, to specify or create a snapping point 1606, the user can tap on a specific position of a selected stroke (e.g., stroke 1602) or surface proxy (e.g., surface proxy 1702 of FIG. 17). The sketch generator component 104 can generate and render snapping points (e.g., snapping point 1606) as relatively small spheres, wherein an active (e.g., selected) snapping point can be displayed in a desired color (e.g., blue) and other snapping points (e.g., in active or unselected snapping points) can be in another color (e.g., white) and/or can be semi-transparent.

The user can create stroke 1608, for example, in relative drawing mode by touching the touch display screen 114 of the device 102 and moving the device 102 in 3-D space to create the stroke 1608 with the desired size and shape, and in a desired position relative to other objects (e.g., real or virtual objects) in the 3-D AR sketch, as more fully described herein. The sketch generator component 104 can determine and generate the stroke 1608, based at least in part on the results of analyzing the input data provided by the user via the touch display screen 114 and/or the motion data obtained from other sensors (e.g., camera component 106, motion sensor component 108) of the device 102, as more fully described herein. In some embodiments, the stroke 1608 can be created such that it can stem or begin from, and can be snapped or connected to, the snapping point 1606. In other embodiments, if the stroke 1608 is initially drawn such that it is not connected or snapped to the snapping point 1606, the user can touch or manipulate the endpoint of the stroke 1608 to connect or snap the endpoint of the stroke 1608 to the snapping point 1606, and, in response to such input data from the user received via the touch display screen 114, the sketch generator component 104 can connect or snap the endpoint of the stroke to the snapping point 1606.

With further regard to strokes, in the generation of strokes, the sketch generator component 104 can smooth or refine strokes created by the user in the sketch using one or more desired techniques that can reduce tracking noise and motor control errors. A stroke can be selected or deselected by the user, as more fully described herein.

With further regard to snapping points, if two strokes (e.g., 1602 and 1608) are linked with the same snapping point (e.g., 1606), any transformation operation performed on one stroke (e.g., 1602) can be applied (e.g., automatically applied or performed) by the sketch generator component 104 on the other stroke (e.g., 1608) so that the connectivity of the strokes can remain the same after the transformation. In response to deletion of a snapping point (e.g., 1606), the sketch generator component 104 can break the link between the two strokes (e.g., 1602, 1608).

With further regard to FIG. 17, the sketch image 1700 can comprise the surface proxy 1702 that can be created by the user and positioned relative to visual content 1704 of a real-world environment in the 3-D AR sketch depicted in the sketch image 1700. As disclosed, the sketch generator component 104 can be utilized to create planar and/or curved surface proxies. The example surface proxy 1702 can be a planar surface proxy. To create a planar surface proxy, the user can select the proxy tool, by selecting the proxy button (e.g., proxy button 1516 in the menu 1512), and can press the create-proxy action button (e.g., action button 1524, after selection of the proxy button 1516). In response to, and based at least in part on the results of analyzing, such input data and motion-related data associated with the position and/or orientation of the device 102, the sketch generator component 104 can create the planar surface proxy 1702, in accordance with the 3-D pose (e.g., 3-D position and orientations) of the device 102, as more fully described herein.

In some embodiments, the user can utilize the enhanced snapping tool provided by the sketch generator component 104 to create a snapping point 1706 at a desired point on the existing surface proxy 1702, wherein the sketch generator component 104 can generate the snapping point 1706 at the desired point on the surface proxy 1702, based at least in part on the input data received from the user via the touch display screen 114, as more fully described herein. The user can create stroke 1708, for example, in relative drawing mode by touching the touch display screen 114 of the device 102 and moving the device 102 in 3-D space to create the stroke 1708 with the desired size and shape, and in a desired position relative to other objects (e.g., real or virtual objects) in the 3-D AR sketch of sketch image 1700, as more fully described herein. The sketch generator component 104 can determine and generate the stroke 1708, based at least in part on the results of analyzing the input data provided by the user via the touch display screen 114 and/or the motion data obtained from other sensors (e.g., camera component 106, motion sensor component 108) of the device 102, as more fully described herein. In some embodiments, the stroke 1708 can be created such that it can stem or begin from, and can be snapped or connected to, the snapping point 1706.

With further regard to generating surface proxies, in some embodiments, the sketch generator component 104 can generate (e.g., quickly generate) a planar surface proxy for each pressing (e.g., clicking) of the create-proxy action button in accordance with the respective 3-D pose of the device 102 at the time of each pressing of the create-proxy action button, without having to perform a sequence of plane definition and adjustment steps. In other words, the newly created surface proxy (e.g., surface proxy 1702) can lie on the plane of the device 102 (e.g., the plane of the device 102 at the time of generation of the surface proxy). This seamless surface proxy creation process can be very useful to the user to create multiple surface proxies that can be aligned with different planar surfaces of real-world objects in a 3-D AR sketch.

Figure 18:
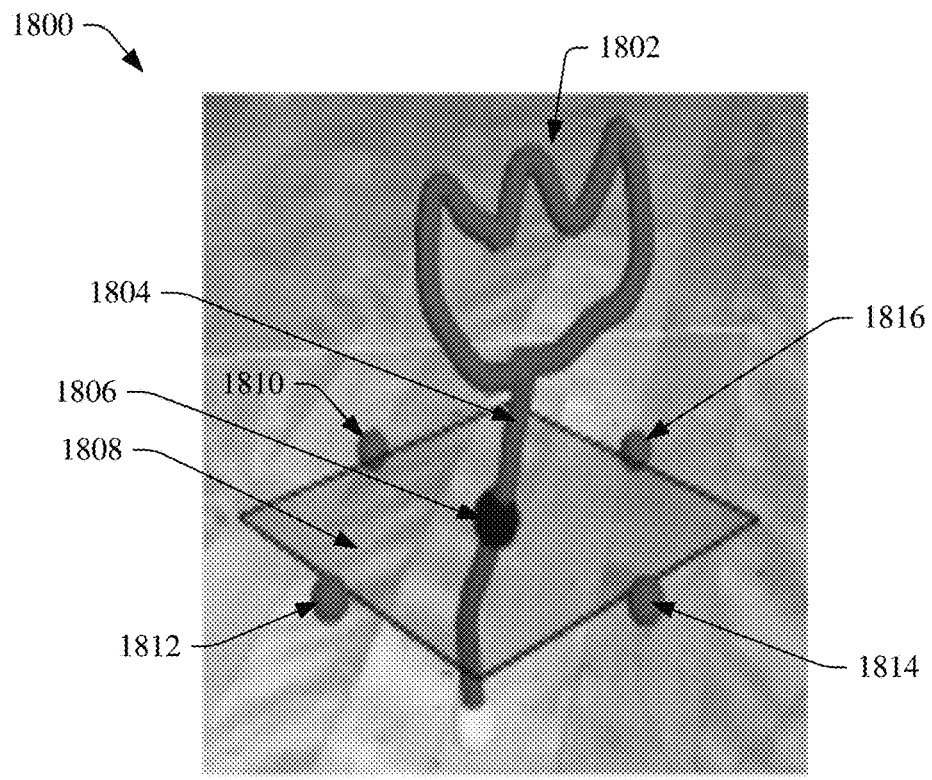
FIG. 18 depicts a diagram of an example 3-D AR sketch comprising a surface proxy created and attached with respect to an existing snapping point, in accordance with various aspects and embodiments of the disclosed subject matter.
Figure 19:
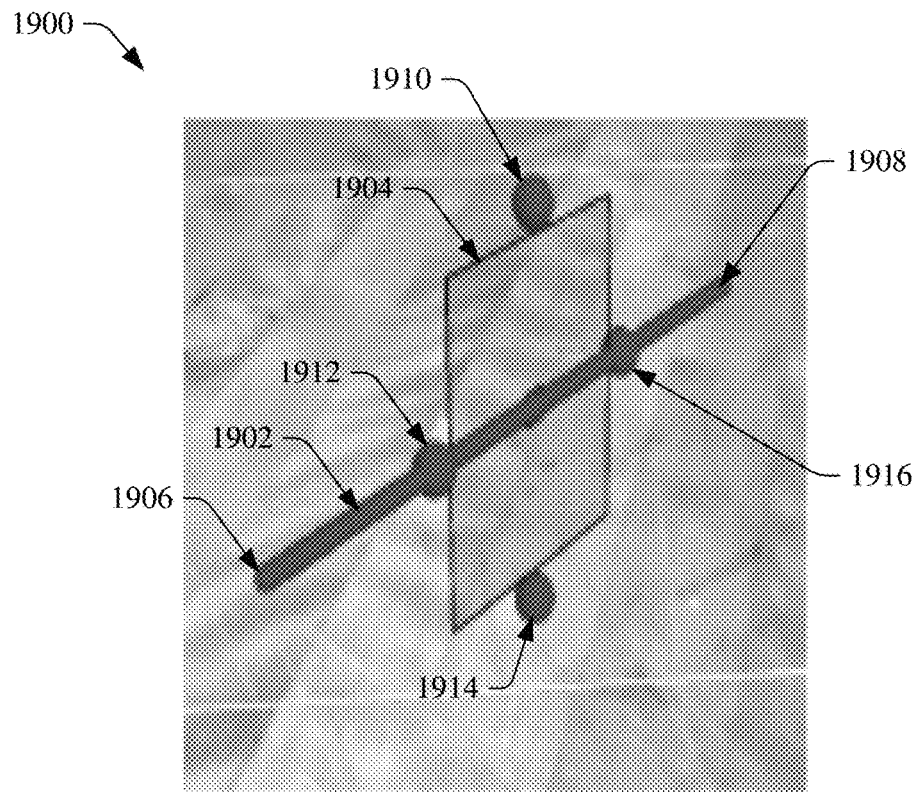
FIG. 19 depicts a diagram of an example 3-D AR sketch comprising a surface proxy created and attached with respect to an existing stroke, in accordance with various aspects and embodiments of the disclosed subject matter.

Additionally or alternatively, the user can first select an existing stroke or a snapping point on an existing stroke or surface proxy, and can create a planar surface proxy that can pass through the two endpoints of the selected stroke or selected snapping point. In that regard, referring to FIGS. 18 and 19 (along with FIG. 1), FIG. 18 depicts a diagram of an example 3-D AR sketch 1800 comprising a surface proxy created and attached with respect to an existing snapping point, and FIG. 19 depicts a diagram of an example 3-D AR sketch 1900 comprising a surface proxy created and attached with respect to an existing stroke, in accordance with various aspects and embodiments of the disclosed subject matter. With regard to FIG. 18, the 3-D AR sketch 1800 can comprise an object 1802 that can include a stroke 1804, which can be created by the user using the sketch generator component 104 and other components of the mobile device 102, as described herein. Using the sketch generator component 104, the user can create a snapping point 1806 on the stroke 1804. Using the sketch generator component 104, the user can select the snapping point 1806. The user, using the sketch generator component 104, can generate a surface proxy 1808 (e.g., planar surface proxy) that can pass through, and can be attached or snapped to, the selected snapping point 1806, wherein the orientation of the surface proxy 1808 can be determined by the sketch generator component 104, based at least in part on the position and/or orientation of the device 102 at the time of the creation of the surface proxy 1808, as determined from the motion-related data received from various sensors (e.g., camera component 106, motion sensor component 108) of the device 102.

With regard to FIG. 19, the 3-D AR sketch 1900 can comprise a stroke 1902 that, which can be created by the user using the sketch generator component 104 and other components of the mobile device 102, as described herein. Using the sketch generator component 104, the user can select the stroke 1902. The user, using the sketch generator component 104, can generate a surface proxy 1904 (e.g., planar surface proxy) that can pass through, and can be attached or snapped to, the endpoints or other desired points 1906 and 1908 of the stroke 1902.

Since unconstrained 3-D orientation control often can be imprecise, in certain embodiments, the sketch generator component 104 can provide orientation snapping to existing surface proxies, and the horizontal and vertical orientations. Also, the user, using the sketch generator component 104, can adjust the size of the surface proxy (e.g., surface proxy 1808, or surface proxy 1904), for example, by long-pressing on the surface proxy and dragging (e.g., moving) its four control handles (e.g., control handles 1810, 1812, 1814, and 1816 in FIG. 18; and control handles 1910, 1912, 1914, and 1916 in FIG. 19).

With further regard to curved surface proxies, the curved surface proxy of the disclosed subject matter can be an extruded surface (e.g., as depicted in FIG. 14). To enter the surface creation mode, the user can long-press interaction on a selected 3-D stroke on the touch display screen 114 of the device 102, and the sketch generator component 104 or interface component 110 can present the object menu (e.g., object menu 1526), in response to the long-press interaction on the selected 3-D stroke. The user can select the surface creation button (e.g., 1534) in the object menu. From mid-air drawing (e.g., relative drawing) performed by the user, the sketch generator component 104 can extrude the selected 3-D stroke as a profile along a straight line or freeform curve, based at least in part on input data received by the sketch generator component 104 from the user, via the touch display screen 114, in connection with the surface creation operation.

In some embodiments, the sketch generator component 104 can generate or render planar or curved surface proxies as semi-transparent 3-D surfaces. If the user desires to make a planar or curved surface proxy a more prominent or essential part of the design (e.g., the 3-D AR sketch), the user, using the sketch generator component 104 and interface component 110, can fill the planar or curved surface proxy with a desired color (e.g., solid color) using the fill tool by selecting the fill button (e.g., fill button 1530 in the object menu 1526) and/or the color selection tool associated with the color selection control 1508, as more fully described herein.

Further aspects relating to mid-air 3-D sketching and surface-based 2-D sketching (e.g., as depicted in FIG. 8) will now be described. Such aspects can relate to, for example, sketching in general, relative drawing on a snapping point, relative drawing on a surface proxy, in-context sketching, snapping recommendations, snapping curves, snapping surfaces, and other tools of the disclosed subject matter. As disclosed, the user can perform either mid-air 3-D sketching or surface-based 2-D sketching. For mid-air sketching, the user can utilize the mobile device 102 (e.g., comprising the sketching application, including the sketch generator component 104) as a 3-D pen, wherein the cursor (e.g., cursor object 1562 of FIG. 15) for mid-air drawing can be placed at the center portion of the touch display screen (e.g., touch display screen 114 of FIG. 1; touch display screen 1504 of FIG. 15), and wherein the user can move the device 102 in space (e.g., 3-D space) while long pressing with the user's finger anywhere on the touch display screen. Surface-based sketching can be achieved by a single finger moving on the touch display screen. During sketching, the action button (e.g., action button 1524 of FIG. 15) can become a "freeze" button. The user can press this "freeze" button to pause (e.g., freeze or suspend) the current drawing process or operation (e.g., mid-air 3-D drawing or surface-based 2-D drawing) while changing the viewpoint (e.g., 3-D position or orientation of the device 102), and can release the "freeze" button to resume the drawing process or operation from the new (e.g., changed) viewpoint, which can be determined by the sketch generator component 104 based at least in part on sensor data (e.g., motion-related data) received from various sensors (e.g., camera component 106, motion sensor component 108) of the device 102.

In some embodiments, to seamlessly support both mid-air sketching and surface-based sketching, the sketch generator component 104 of the system 100 can automatically determine the sketching mode (e.g., relative drawing mode for mid-air 3-D sketching; or absolute drawing mode for surface-based 2-D sketching) by checking if the mobile device 102 or a finger touching on the touch display screen 114 of the device 102 moves first, by thresholding (e.g., by applying respective threshold levels with respect to) the changes of touch position and mobile device position. For example, the sketch generator component 104 can determine that the mobile device 102 has moved first while the user's finger is touching the touch display screen 114 before or without any relevant (e.g., significant or meaningful) movement of the user's finger on the touch display screen 114, based at least in part on the results of analyzing the touch screen data received from the touch screen sensors associated with the touch display screen 114 and the motion data received from the other sensors (e.g., camera component 106, motion sensor component 108) of the device 102, and applying the applicable threshold level to any detected changes to the touch position of the user's finger on the touch display screen 114 and applying another applicable threshold level to any detected changes to the position of the mobile device 102. In response, the sketch generator component 104 can determine (e.g., automatically determine) that the device 102 (e.g., the sketching application used on the device 102) is operating in the relative drawing mode for mid-air 3-D sketching. If, however, based at least in part on the results of such analysis and applying the respective applicable threshold levels, the sketch generator component 104 determines that the user's finger has moved first on (e.g., across a portion of) the touch display screen 114 before any relevant (e.g., significant or meaningful) movement of the mobile device 102, the sketch generator component 104 can determine (e.g., automatically determine) that the device 102 (e.g., the sketching application used on the device 102) is operating in the absolute drawing mode for surface-based 2-D sketching.

With regard to relative drawing on a snapping point, for a given selected snapping point, in the mid-air 3-D sketching mode, in some embodiments, the sketch generator component 104 can create (e.g., draw) all new strokes starting from the selected snapping point (e.g., as depicted in FIGS. 16 and 17 and described herein in connection with FIGS. 16 and 17). The sketch generator component 104 can perform or achieve starting a new stroke from a selected snapping point by moving the starting point of a new stroke to the selected snapping point. For instance, if the user has selected a snapping point, and if the user starts to draw a stroke, but the stroke is not starting at or attached to the selected snapping point, the sketch generator component 104 can move the starting point of the new stroke to, and can attach the end point of the new stroke to, the selected snapping point.

For surface-based 2-D drawing, to prevent operations from being performed by mistake, the sketch generator component 104 can manage the drawing of a new stroke by the user to have the user draw the new stroke starting at or in sufficiently close proximity to (e.g., sufficiently near to, or within a defined distance of) the selected snapping point in the 2-D screen space, which can be determined by the sketch generator component 104, for example, by ray-line intersection. If the sketch generator component 104 determines that the user is starting the stroke on the 2-D surface of the touch display screen 114 at a point that is not in sufficiently close proximity to the selected snapping point in the 2-D screen space, the sketch generator component 104 can prevent the stroke from being created on the sketch. If, instead, the sketch generator component 104 determines that the user is starting the stroke on the 2-D surface of the touch display screen 114 at a point that is in sufficiently close proximity to the selected snapping point in the 2-D screen space, the sketch generator component 104 can allow the stroke to be created on the sketch and can snap the starting point (e.g., starting endpoint) of the new stroke to the selected snapping point.

With further regard to relative drawing on a surface proxy, the sketching application, employing the sketch generator component 104, interface component 110, and other components, can allow the user to directly draw strokes on a selected surface proxy using, for example, surface-based sketching from any desired distance and any desired orientation. The sketch generator component 104 can back-project new strokes onto the (planar or non-planar) surface proxy, for example, through perspective projection. One feature of a planar surface proxy is that the sketch generator component 104 can allow and enable the user to draw outside the proxy surface, since there can be essentially an infinitely large plane behind each planar surface proxy. This feature can be particularly useful for creating large-scale sketches (e.g., large-scale 3-D AR sketches).

Figure 20:
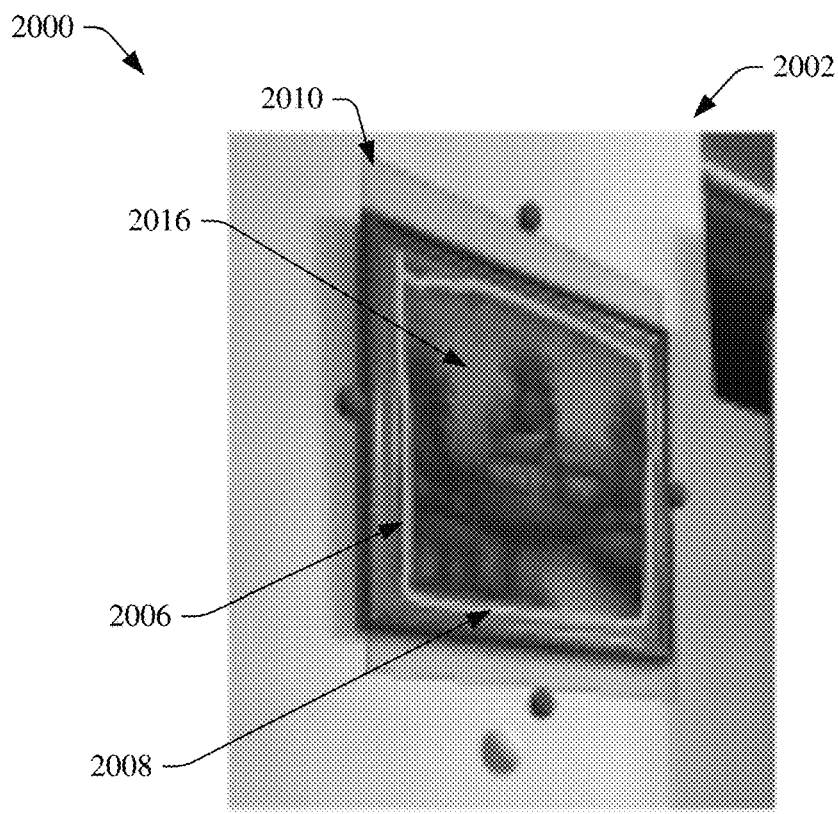
FIG. 20 presents a diagram of example sketch images that can illustrate differences between drawing while the sketching application is in the normal surface-based sketching mode and drawing while the sketching application is in the 2-D surface-based sketching mode, in accordance with various aspects and embodiments of the disclosed subject matter.
Figure 20:
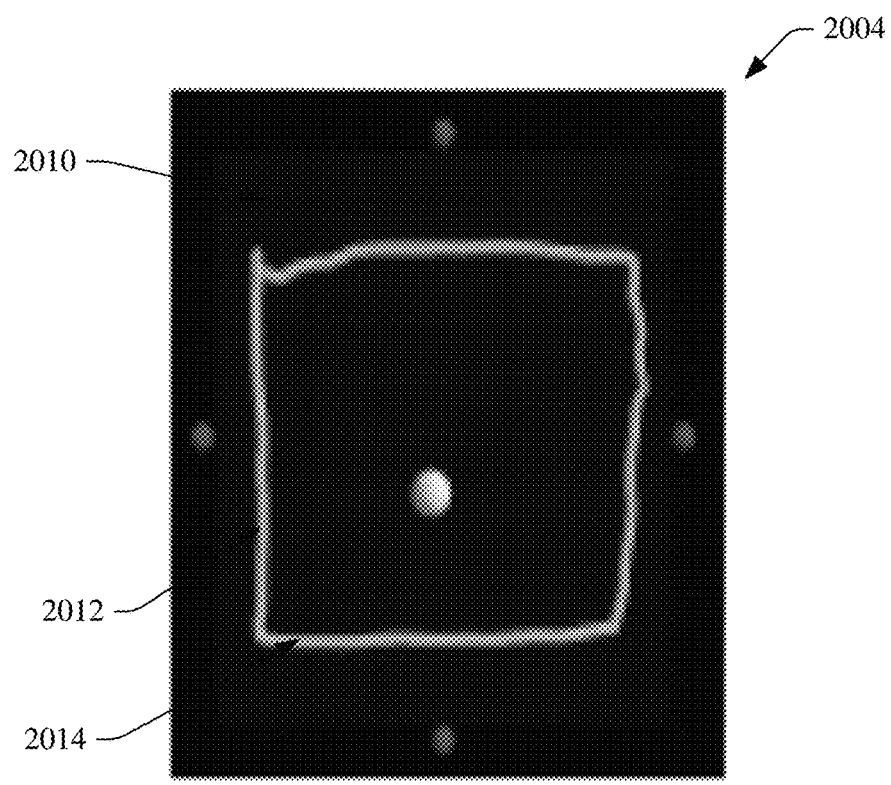

In addition, to facilitate avoiding fatigue during surface-based sketching while holding the device 102 and pointing to the selected surface proxy, the user can enter the "2-D" mode by selecting the "2-D" item (e.g., "2-D" button), which can be in a menu, such as, for example, the object menu (e.g., object menu 1526 presented in FIG. 15 and described herein), of the interface (e.g., interface 1500 of FIG. 15 and described herein), which can be presented to the user after the user has long-pressed on a selected surface proxy in the sketch. The sketch generator component 104 can switch the sketching application to the "2-D" mode, and the user can draw the desired object (e.g., stroke) on the 2-D parameter domain of the surface proxy (FIG. 12) while holding the device 102 more comfortably. Referring briefly to FIG. 20 (along with FIG. 1), FIG. 20 presents a diagram of example sketch images 2000 that can illustrate differences between drawing while the sketching application is in the normal surface-based sketching mode and drawing while the sketching application is in the 2-D surface-based sketching mode, in accordance with various aspects and embodiments of the disclosed subject matter. The sketch images 2000 can comprise a sketch image 2002, which can involve the user drawing objects (e.g., strokes) while the sketching application is in normal surface-based sketching mode, and a sketch image 2004, which can involve the user drawing objects (e.g., strokes) while the sketching application is in 2-D surface-based sketching mode.

With regard to the sketching application being in the normal surface-based sketching mode, as illustrated in sketch image 2002, when drawing the strokes (e.g., stroke 2006, stroke 2008) the user will have to hold the mobile device 102 up and point the device 102 at or to the selected surface proxy 2010. This may cause the user (e.g., hand, arm, and/or finger of the user) to become fatigued from having to hold the device 102 up and try to steadily point the device at the selected surface proxy while also drawing the strokes (e.g., stroke 2006, stroke 2008) on the sketch.

With regard to the sketching application being in the 2-D surface-based sketching mode, as illustrated in sketch image 2004, the user no longer has to hold the mobile device 102 up and point the device 102 at or to the selected surface proxy 2010, when drawing the strokes (e.g., stroke 2012, stroke 2014). Rather, the user can draw the strokes (e.g., stroke 2012, stroke 2014) on the selected surface proxy 2010 in the sketch in the 2-D parameter domain, wherein the user can be holding the device 102 in a more comfortable position to the user while the user draws such strokes. This can enable the user to avoid fatigue (e.g., fatigue to the hand, arm, and/or finger of the user) during drawing of the strokes (e.g., stroke 2012, stroke 2014) on the selected surface proxy 2010.

In some embodiments, the user, using the sketch generator component 104, can utilize the 2-D surface-based sketching mode to bring a remote surface proxy closer to the user and can make such surface proxy parallel to the image plane, which can thereby improve the precision for drawing distant sketches or drawing on surface proxies that are not parallel to the touch display screen 114. While in the 2-D surface-based sketching mode, in response to input data received from the user, for example, via the touch display screen 114, indicating the user desires to bring a remote surface proxy closer to the user and/or make such surface proxy parallel to the image plane, the sketch generator component 104 can bring the remote surface proxy closer to the user and/or can make such surface proxy parallel to the image plane.

Figure 21:
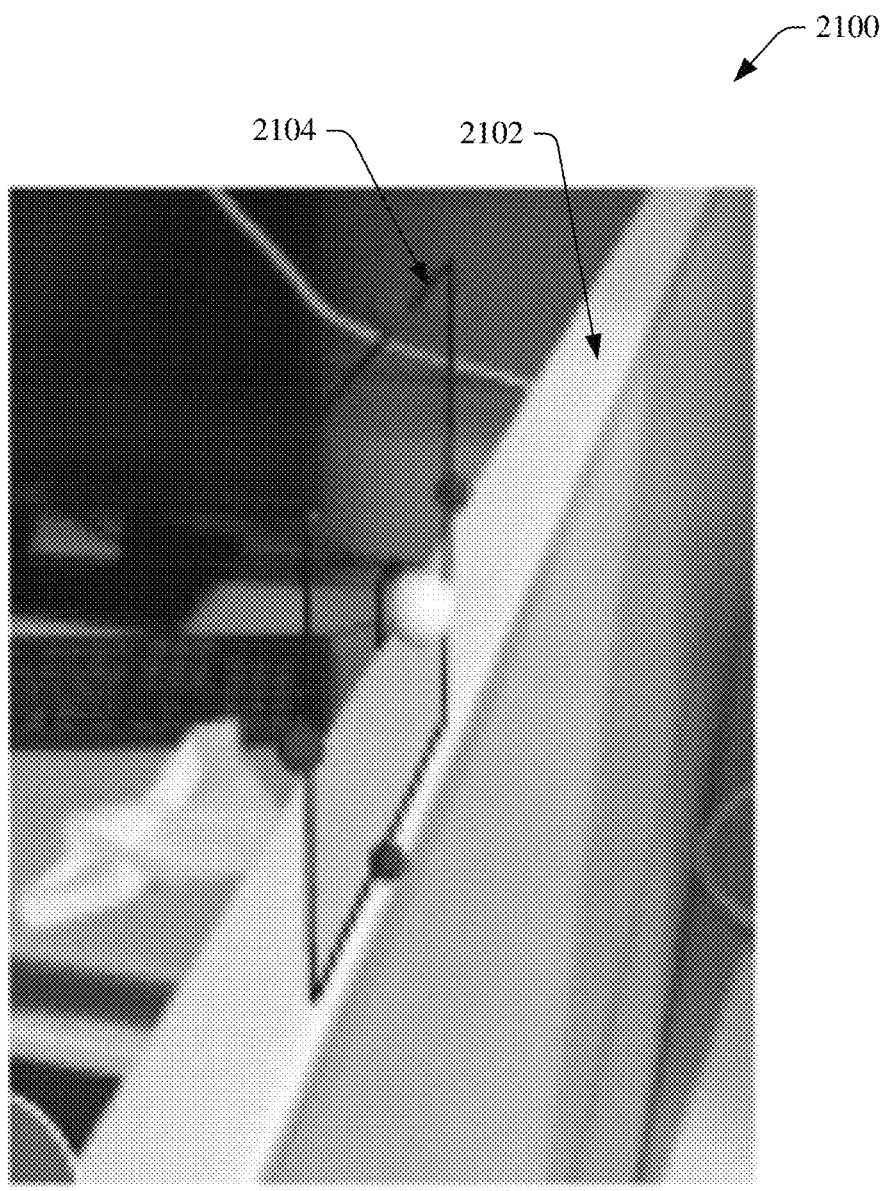
FIG. 21 presents a diagram of an example sketch image that can comprise a planar surface proxy that can be aligned with a real plane of a real-world environment, in accordance with various aspects and embodiments of the disclosed subject matter.

With regard to in-context sketching, to create 3-D AR sketches attached to a real-world environment, the user can use environment planes (e.g., real-world environment planes) that can be detected (e.g., automatically detected), by the sketch generator component 104, by environment understanding as planar surface proxies (e.g., as illustrated by the real object 2016 (e.g., painting in a rectangular frame at a particular position or orientation in relation to the mobile device 102) in a real-world environment and the surface proxy 2010, wherein the surface proxy 2010 can be aligned with the plane associated with the real object 2016). Referring briefly to FIG. 21 (along with FIG. 1), FIG. 21 presents a diagram of an example sketch image 2100 that can comprise a planar surface proxy that can be aligned with a real plane of a real-world environment, in accordance with various aspects and embodiments of the disclosed subject matter. With respect to the sketch image 2100, the user can be pointing the mobile device 102 at a real object 2102 (e.g., partition wall) of a real-world environment. In this example, the real object (e.g., partition wall) can have a planar structure that can be straight, or substantially straight, and/or uniform. The camera component 106 can capture visual information regarding the real object 2102. The sketch generator component 104 can analyze the visual information regarding the real object 2102 and/or other sensor data, such as sensor data that can indicate the position or orientation of the mobile device 102, and, based at least in part on the results of analyzing the visual information and/or the sensor data, the sketch generator component 104 can detect (e.g., automatically detect) the real object 2102, including detecting that the real object 2102 is or represents a real environment plane. In some instances, the user can desire to generate a surface proxy that can align with the real environment plane of the real object 2102 in the 3-D AR sketch. Using the sketch generator component 104, the user can create a planar surface proxy 2104, and using a desired snapping or alignment tool (e.g., orientation snapping or alignment tool) of the sketch generator component 104, the user can indicate that the user desires the planar surface proxy 2104 to align with the real environment plane of the real object 2102. In response to the utilization of such tool, the sketch generator component 104 can align or snap the planar surface proxy 2104 to have the planar surface proxy 2104 align with the real environment plane of the real object 2102 (e.g., partition wall), based at least in part on the position or orientation of the real environment plane of the real object 2102.

There may be instances when such environment planes do not exist or cannot be detected by the sketch generator component 104. In such instances, the user can move the mobile device 102 close to a real object of the real-world environment, and, using a create anchor tool of the sketch generator component 104 (e.g., by the user pressing a create anchor action button on the interface of the interface component 110), the sketch generator component 104 can create an anchor (e.g., a 3-D stroke or surface proxy) that can be utilized for the attachment of other objects (e.g., strokes). It is noted that, in certain instances, if the camera of the device 102 is moved too close to a real object, due to the inside-out motion tracking technique, the motion tracking algorithm potentially can fail. To address and overcome this issue, in some embodiments, the user, using the sketch generator component 104, can create a planar surface proxy 2104 that can pass through desired 3-D positions at the place where motion tracking is determined to be working well (e.g., as depicted in FIG. 21), and can specify an anchor on this surface proxy 2104.

With further regard to snapping recommendations, in certain embodiments, if, for example, the user does not specify any snapping point explicitly, the sketch generator component 104 can determine (e.g., automatically determine) one or more potentially desirable (e.g., potentially useful) snapping points, based at least in part on the context associated with the 3-D AR sketch, user, the mobile device 102, or other desired factor. The sketch generator component 104 can determine such context based at least in part on the results of analyzing the sketch, current or historical information relating to sketch, the user, or the device 102, and/or other desired information. The sketch generator component 104 can provide, to the user, a snapping recommendation that can recommend (e.g., suggest) the one or more potentially desirable snapping points via the interface (e.g., on the touch display screen 114) of the interface component 110, as such snapping recommendation is determined to be appropriate by the sketch generator component 104. For example, if an endpoint (either starting or ending point) of a new 3-D stroke created by the user and any point of the existing 3-D AR sketch are sufficiently (e.g., very) close to each other in the screen space, there can be a high possibility that the user intends to snap the two strokes to connect them. The sketch generator component 104 can identify that there is a high possibility that the user intends to snap the two strokes to connect them. Accordingly, the sketch generator component 104 can provide (e.g., present) a snapping recommendation regarding the identified potentially desirable snapping to the user via the interface of the device 102. As desired by the user, the user can accept the snapping recommendation by clicking (e.g., pressing) the "snap" action button (e.g., snap button 1538 of menu 1526 in FIG. 15 and described herein) or deny the snapping recommendation by tapping on an empty screen space of the touch display screen 114 of the device 102. If the user accepts the snapping recommendation and presses the snap action button, the sketch generator component 104 can perform the snapping action to snap and connect the endpoint of the new 3-D stroke to the identified snapping point of the existing 3-D AR sketch.

In some embodiments, the sketch generator component 104 can determine (e.g., automatically determine) snapping recommendations for the both endpoints of a new 3-D stroke (e.g., as illustrated by FIG. 7, wherein each of the endpoints of the stroke 704 can be snapped to respective snapping points 714 and 716 on the respective other strokes 708 and 706). In certain embodiments, the sketch generator component 104 can linearly interpolate the depth of intermediate points of the stroke from the depth of the endpoints. The sketch generator component 104 can allow the user to adjust a snapping recommendation by dragging the suggested snapping point to change its position from the recommended position to another position desired by the user, or by tapping on a recommended snapping point to remove the recommended snapping point. It often can be desirable to perform such refinements (e.g., adjustments) of snapping recommendations in a viewpoint that is different from the original viewpoint for drawing the new stroke, as the original viewpoint may not be as suitable as a different viewpoint of the new stroke and the snapping recommendation for the user to evaluate the usefulness of the recommended snapping point.

With regard to snapping curves and snapping surface, in addition to individual snapping points, the sketch generator component 104 also can provide snapping curves and snapping surfaces, which can be considered as regular strokes or surface proxies containing a desired number (e.g., many) predefined snapping points on them. The sketch generator component 104 can determine (e.g., automatically determine) the desired predefined snapping points of the snapping curve or snapping surface, based at least in part on the context of the 3-D AR sketch, the user, or the mobile device 102. Such context can be determined by the sketch generator component 104 based at least in part the results of analyzing information relating to the sketch, the user, the mobile device 102, and/or other desired information. As an example of a snapping curve or surface, when a new stroke is drawn, by the user, on the touch display screen 114 (e.g., in the 3-D space) near a snapping curve or surface of the 3-D AR sketch, the sketch generator component 104 can snap (e.g., automatically snap) one of the endpoints of the new stroke to the nearest point (e.g., predefined snapping point) of the snapping curve or surface.

Figure 22:
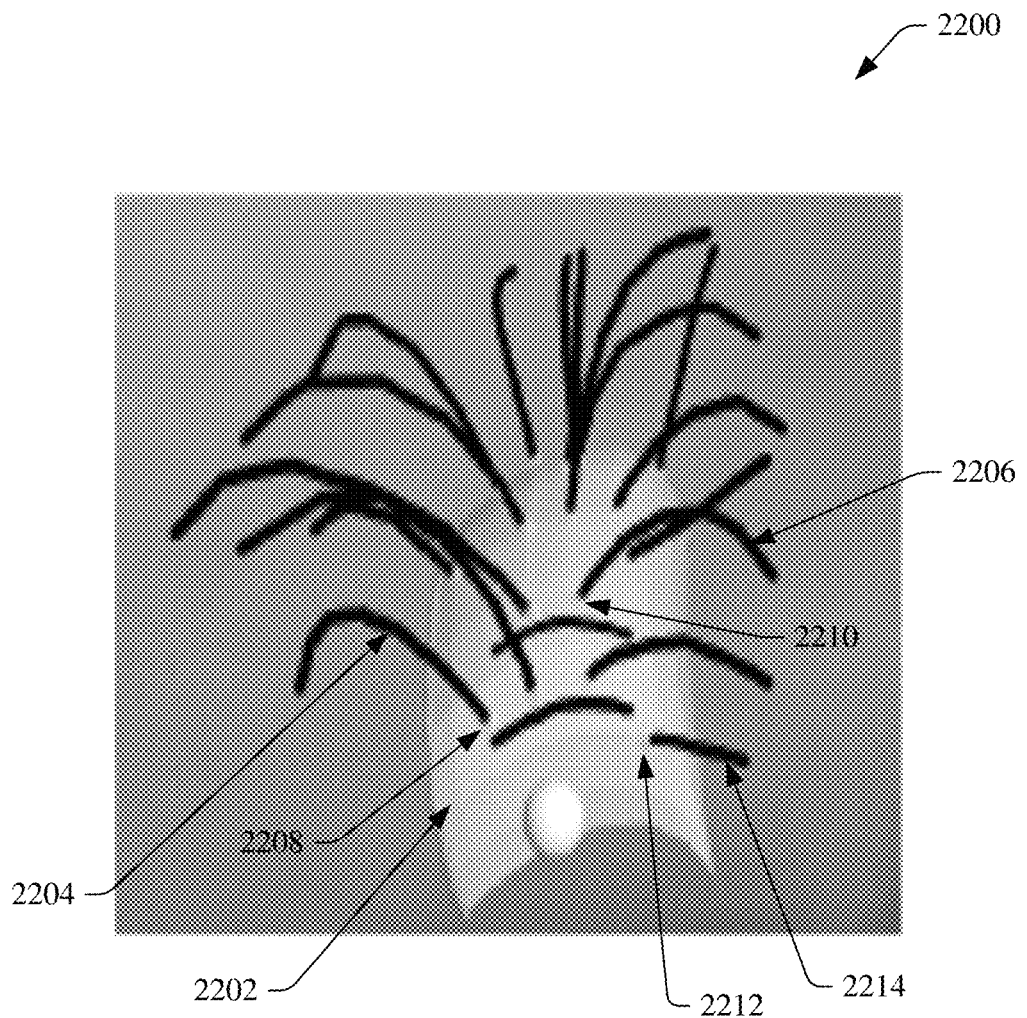
FIG. 22 depicts a diagram of an example sketch image of a head surface that has a number of hair curves drawn extending from the head surface, in accordance with various aspects and embodiments of the disclosed subject matter.

This feature can be particularly useful when it is desired, by the user, for a lot of strokes to be attached to an existing stroke or surface proxy, for example, to add hair curves (e.g., curved strokes representing hairs) to a head surface (e.g., a curved surface proxy representing the top of a head), as illustrated in FIG. 22. With regard to FIG. 22 (along with FIG. 1), FIG. 22 depicts a diagram of an example sketch image 2200 of a head surface 2202 that has a number of hair curves (e.g., curved stroke 2204, curved stroke 2206, . . . ) drawn extending from the head surface 2202, in accordance with various aspects and embodiments of the disclosed subject matter. The sketch generator component 104 can provide snapping curve or surface tool to the user via the interface (e.g., presented on the touch display screen 114) of the mobile device 102. In response to the user selecting the snapping curve or surface tool (e.g., by selecting, on the interface, an action button for create snapping curve or create snapping surface), the sketch generator component 104 can create the snapping curve or surface on the 3-D AR sketch in the desired location of the sketch. For instance, as depicted in the sketch image 2200, the sketch generator component 104 can create the head surface 2202, which can be a curved surface proxy that can be snapping curve.

The sketch generator component 104 can determine (e.g., automatically determine) the desired predefined snapping points of the head surface 2202 (e.g., snapping curve), based at least in part on the context of the 3-D AR sketch, the user, or the mobile device 102, as determined by the sketch generator component 104. For instance, in the example sketch image 2200, the sketch generator component 104 can determine (e.g., automatically determine) a number of predefined snapping points on the head surface 2202, wherein the predefined snapping points can include snapping point 2208, snapping point 2210, snapping point 2212, etc. The sketch generator component 104 can present the predefined snapping points (e.g., 2208, 2210, 2212, etc.) at their respective locations on the head surface 2202, as determined by the sketch generator component 104. When the user draws curved strokes, such as curved stroke 2204, curved stroke 2206, and curved stroke 2214, with respective endpoints in proximity to (e.g., within a defined distance of) the respective predefined snapping points (e.g., 2208, 2210, 2212), the sketch generator component 104 can snap (e.g., automatically snap) the respective endpoints of the curved strokes (e.g., 2204, 2206, 2214) to the respective predefined snapping points (e.g., 2208, 2210, 2212) on the head surface 2202.

In some embodiments, the sketch generator component 104 can utilize space-based distance measurement and screen-based distance measurement for mid-air 3-D sketching and surface-based 2-D sketching, respectively. Also, to change a selected stroke (or proxy) to a snapping stroke (or surface), the user, using the sketch generator component 104 and the interface of the interface component 110, can select a desired snapping tool by pressing a snap button (e.g., snap button 1538 from the object menu 1526, as presented in FIG. 15 and described herein) on the interface. In response to the pressing of the snap button and engaging of the desired snapping tool, the sketch generator component 104 can change the selected stroke (or proxy) in the sketch to a snapping stroke (or surface).

The sketch generator component 104 also can provide a number of other tools and functions that can be utilized by the user to desirably create 3-D AR sketches. For example, the sketch generator component 104 also can provide a symmetry proxy tool that, as desired by the user, can regularly and accurately duplicate a currently drawn stroke (e.g., 3-D stroke) to different positions or orientations in the sketch. With the symmetry proxy tool, the sketch generator component 104 can generate and provide reflective and/or rotational symmetry proxies. For instance, the user can desire to duplicate a drawn 3-D stroke in one or more other positions or orientation in the sketch. The user can select the symmetry proxy tool (e.g., by selecting an action button for creating symmetry proxies that can be presented on the interface). In response, to the user pressing such action button a number of times while the device 102 is in different 3-D positions or orientations, the sketch generator component 104 can generate a desired number of respective 3-D strokes that can duplicate the drawn 3-D stroke in respective (e.g., different) 3-D positions or orientations in the sketch, based at least in part on the different 3-D positions or orientations of the device 102 at the times the user pressed such action button for creating the symmetry proxies.

The disclosed subject matter, by employing the sketching application, including the sketch generator component 104, on a mobile device 102, can enable users to create more desirable and higher quality 3-D AR sketches that can integrate drawing content created by the user with real objects of a real-world environment, as captured by the device 102 (e.g., by the camera component 106), as compared to sketches that can be created by traditional mobile devices and sketching applications. The disclosed subject matter can overcome or address (e.g., alleviate or mitigate) certain unique challenges associated with creating 3-D AR sketches using a mobile device, wherein such challenges can include the relatively narrow field of view of mobile devices, the lack of stereoscopic displays on mobile devices, and the coupling of inputs and output of a mobile device (e.g., coupling of the output and 2-D/3-D input of a mobile device).

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 23:
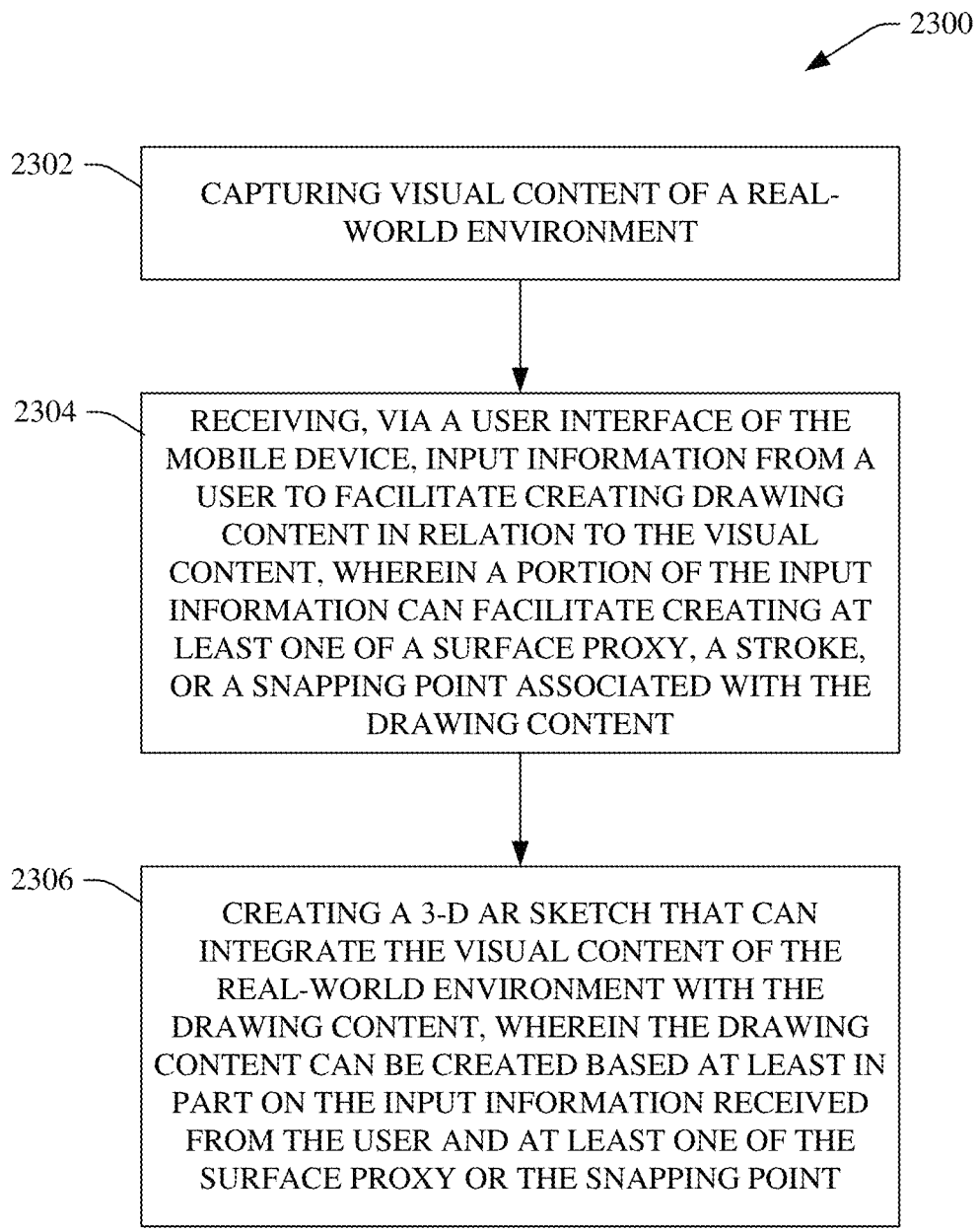
FIG. 23 illustrates a flow diagram of an example method that can efficiently and desirably create multi-dimensional (e.g., 3-D) AR sketches using a mobile device, in accordance with various aspects and embodiments of the disclosed subject matter.
Figure 24:
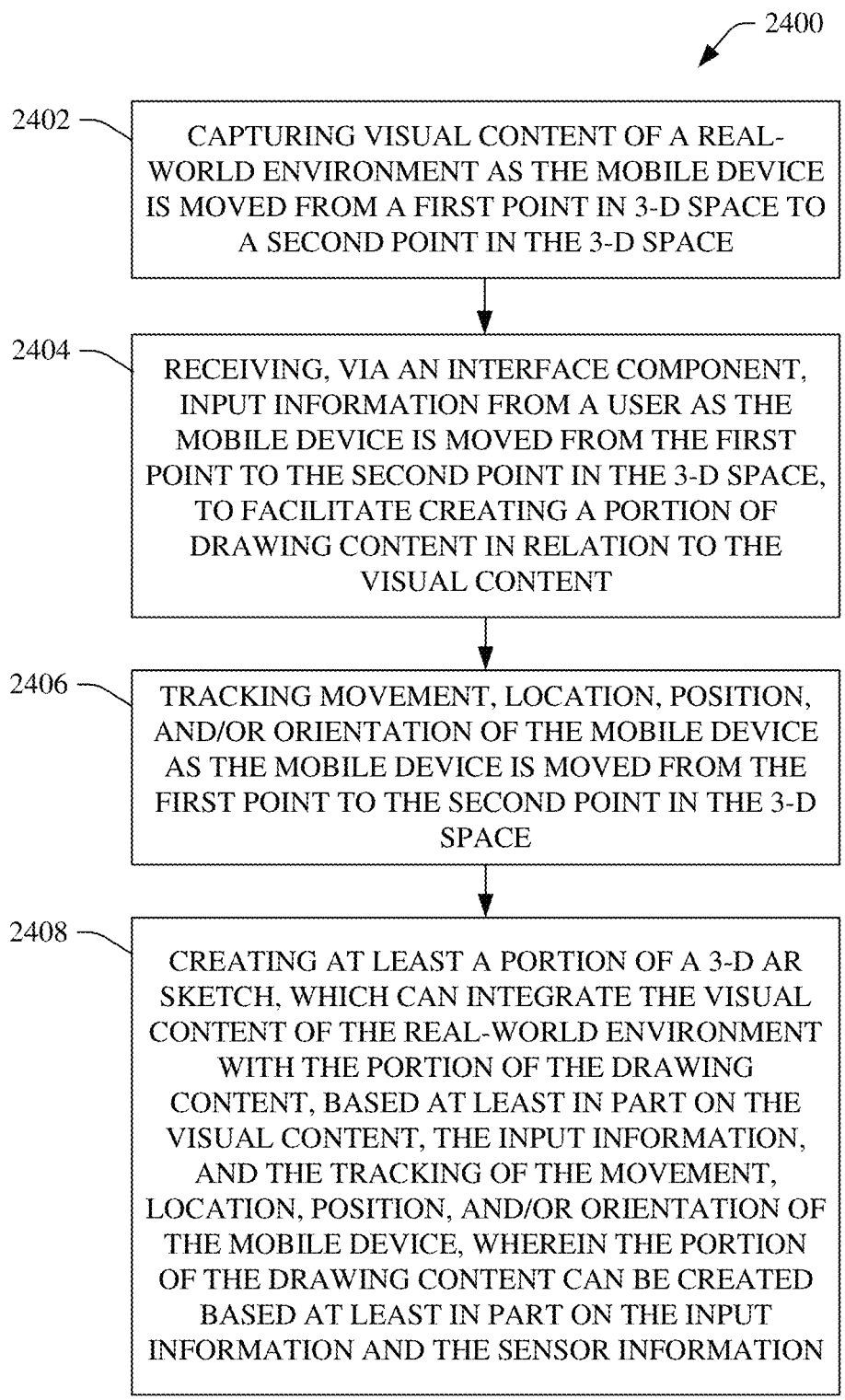
FIG. 24 depicts a flow diagram of an example method that can desirably create, using a mobile device, a 3-D AR sketch comprising 3-D drawing content, which can be integrated with visual content of a real-world environment, based at least in part on input information from a user and movement of the mobile device, in accordance with various aspects and embodiments of the disclosed subject matter.
Figure 25:
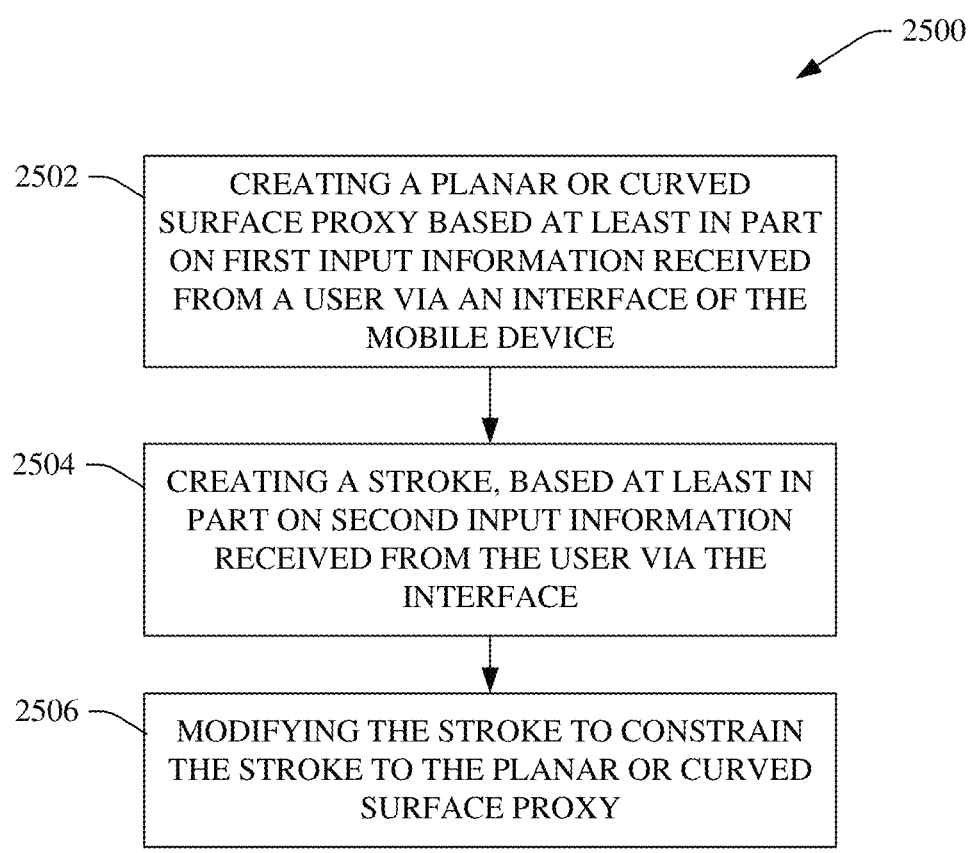
FIG. 25 illustrates a flow diagram of an example method for constraining a stroke to a planar or curved surface proxy in connection with creating a 3-D AR sketch to facilitate enhancing precision of, and/or reducing error associated with, the stroke, in accordance with various aspects and embodiments of the disclosed subject matter.

FIGS. 23-25 illustrate methods and/or flow diagrams in accordance with the disclosed subject matter. For simplicity of explanation, the methods are depicted and described as a series of acts. It is to be understood and appreciated that the subject disclosure is not limited by the acts illustrated and/or by the order of acts, for example acts can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be further appreciated that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device, carrier, or media.

Referring to FIG. 23, illustrated is a flow diagram of an example method 2300 that can efficiently and desirably create multi-dimensional (e.g., 3-D) AR sketches using a mobile device, in accordance with various aspects and embodiments of the disclosed subject matter. The method 2300 can be implemented or performed by the mobile device comprising a sketch generator component, various sensors (e.g., camera component, IMU, accelerometer, and/or gyroscope, . . . ), a processor, and/or a data store.

At 2302, visual content of a real-world environment can be captured. A camera component (e.g., one or more cameras) of the mobile device can capture visual content of a real-world environment. For instance, a user can be pointing the camera component at one or more real-world objects of a real-world environment, and the camera component can capture or sense the visual content of the real-world environment.

At 2304, input information can be received, via a user interface of the mobile device, from a user to facilitate creating drawing content in relation to the visual content, wherein a portion of the input information can facilitate creating at least one of a surface proxy, a stroke, or a snapping point associated with the drawing content. The sketch generator component can generate a user interface and can present the user interface to the user, for example, via a touch display screen of the mobile device. The user can input the input information (e.g., drawing-related information) via the user interface, which can receive the input information. The input information can comprise information relating to selection of tools (e.g., create stroke tool, create proxy tool, create snapping point tool . . . ), information relating to creating a stroke, information relating to creating a planar or curved surface proxy, information relating to creating a snapping point, information relating to filling a surface proxy with a desired color, and/or other desired information relating to creating a 3-D AR sketch.

At 2306, a 3-D AR sketch that can integrate the visual content of the real-world environment with the drawing content can be created, wherein the drawing content can be created based at least in part on the input information received from the user and at least one of the surface proxy or the snapping point. The sketch generator component can analyze the input information received from the user and/or the visual content captured by the content. Based at least in part on the results of the analysis, the sketch generator component can create (e.g., generate) and/or render the 3-D AR sketch (e.g., 3-D AR composite image), which can integrate the visual content of the real-world environment with the drawing content added by the user. The sketch generator component can present the 3-D AR sketch via the display screen, can facilitate communicating the 3-D AR sketch to another communication device or another display screen associated with (e.g., connected to) the mobile device, and/or can store the 3-D AR sketch in the data store of the mobile device.

Turning to FIG. 24, depicted is a flow diagram of an example method 2400 that can desirably create, using a mobile device, a 3-D AR sketch comprising 3-D drawing content, which can be integrated with visual content of a real-world environment, based at least in part on input information from a user and movement of the mobile device, in accordance with various aspects and embodiments of the disclosed subject matter. The method 2400 can be implemented or performed by the mobile device comprising a sketch generator component, various sensors (e.g., camera component, IMU, accelerometer, and/or gyroscope, . . . ), a processor, and/or a data store.

At 2402, visual content of a real-world environment can be captured as the mobile device is moved from a first point in 3-D space to a second point in the 3-D space. At 2404, input information can be received, via an interface component, from a user as the mobile device is moved from the first point to the second point in the 3-D space, to facilitate creating a portion of drawing content in relation to the visual content. At 2406, movement, location, position, and/or orientation of the mobile device can be tracked as the mobile device is moved from the first point to the second point in the 3-D space.

A camera component (e.g., one or more cameras) of the mobile device can capture the visual content, which can depict or represent one or more objects of the real-world environment, as the mobile device is moved from the first point (e.g., first spatial or 3-D location) to the second point (e.g., second spatial or 3-D location) in the 3-D space. For instance, as the mobile device is moved from the first point to the second point in the 3-D space, a user can be pointing the camera component at one or more real-world objects of the real-world environment, and the camera component can capture the visual content, which can depict or represent the one or more real-world objects of the real-world environment.

The sketch generator component can generate an interface (e.g., an interface component comprising the interface) and can present the interface to the user, for example, via a touch display screen of the mobile device. As the mobile device is moved from the first point to the second point in the 3-D space, the user can input the input information (e.g., the user can touch the touch display screen to facilitate creating the portion of drawing content) via the interface, which can receive the input information. For example, the user can press and hold a finger down on the touch display screen (e.g., on a center point or approximate center point on the touch display screen) as the mobile device is moved from the first point to the second point in the 3-D space, wherein the interface and associated sketch generator component can receive such input information.

The sketch generator component also can receive sensor information from one or more sensors (e.g., IMU, accelerometer, and/or gyroscope, . . . ) based at least in part on (e.g., representing and/or corresponding to) the tracking (e.g., real-time tracking) of the movement, location, position, and/or orientation of the mobile device as the mobile device is moved from the first point to the second point in the 3-D space. As the user is moving the mobile device from the first point to the second point in the 3-D space, while the mobile device is capturing the visual content, while the user is pressing a finger on the touch display screen to input the input information, and while the mobile device (e.g., utilizing the one or more sensors and associated sketch generator component) is tracking the movement, location, position, and/or orientation of the mobile device, the portion of the drawing content of the user can be created, in relation to the visual content, by the sketch generator component based at least in part on (e.g., in accordance with) the captured visual content, the received input information, and sensor information relating to the tracking of the movement, location, position, and/or orientation of the mobile device.

At 2408, at least a portion of a 3-D AR sketch, which can integrate the visual content of the real-world environment with the portion of the drawing content, can be created, based at least in part on the visual content, the input information, and the tracking of the movement, location, position, and/or orientation of the mobile device, wherein the portion of the drawing content can be created based at least in part on the input information and the sensor information. The sketch generator component can create (e.g., generate) and/or render at least the portion of the 3-D AR sketch that can integrate the visual content of the real-world environment with the portion of the drawing content, based at least in part on the visual content, the input information, and the tracking of the movement, location, position, and/or orientation of the mobile device.

The portion of the drawing content can be created based at least in part on the input information and the sensor information that can be received as the mobile device is being moved from the first point to the second point in the 3-D space. For instance, the portion of the drawing content can comprise a stroke or a surface proxy (e.g., a planar or curved surface proxy) that can span from the first point to the second point in the 3-D space based at least in part on respective spatial or 3-D positions and orientations of the mobile device along a path of movement of the mobile device as the mobile device is being moved between the first point and the second point in the 3-D space.

FIG. 25 illustrates a flow diagram of an example method 2500 for constraining a stroke to a planar or curved surface proxy in connection with creating a 3-D AR sketch to facilitate enhancing precision of, and/or reducing error associated with, the stroke, in accordance with various aspects and embodiments of the disclosed subject matter. The method 2500 can be implemented or performed by a mobile device comprising a sketch generator component, various sensors (e.g., camera component, IMU, accelerometer, and/or gyroscope, . . . ), a processor, and/or a data store.

At 2502, a planar or curved surface proxy can be created based at least in part on first input information received from a user via an interface of the mobile device. The mobile device can receive the first input information from the user via the interface, wherein the first input information can relate to or indicate the desire of the user to have the mobile device create the planar or curved surface proxy. The sketch generator component can analyze the first input information, and, based at least in part on the results of such analysis, the sketch generator component can create the planar or curved surface proxy, which can be presented on a display screen (e.g., touch display screen) of the mobile device.

At 2504, a stroke can be created, based at least in part on second input information received from the user via the interface. The mobile device can receive the second input information from the user via the interface, wherein the second input information can relate to or indicate the desire of the user to have the mobile device create the stroke (e.g., a stroke that can correspond to the planar or curved surface proxy). The sketch generator component can analyze the second input information, and, based at least in part on the results of the analysis of the second input information, the sketch generator component can create, or initiate creation of, the stroke.

At 2506, the stroke can be modified to constrain the stroke to the planar or curved surface proxy. Based at least in part on (e.g., based at least in part on the results of analyzing) the stroke (e.g., 3-D stroke) and the planar or curved surface proxy, the sketch generator component can modify the stroke (e.g., the respective positions of respective portions of the stroke) to constrain the stroke to the planar or curved surface proxy (e.g., respective positions of respective portions of the planar or curved surface proxy). This can enable the user to more precisely and/or desirably draw the stroke using the mobile device and/or facilitate suppressing or reducing depth errors associated with the stroke, which can be caused by the mobile device shaking or vibrating while being used to draw the stroke. For example, the user can desire that a stroke the user is trying to make via the interface correspond to the planar or curved surface proxy that was created. The sketch generator component can analyze the respective positions of respective portions of the stroke and the respective positions of respective portions of the planar or curved surface proxy. Based at least in part on the results of such analysis, the sketch generator component can modify the respective positions of the respective portions of the stroke to constrain the stroke to the respective positions of the respective portions of the planar or curved surface proxy.

Figure 26:
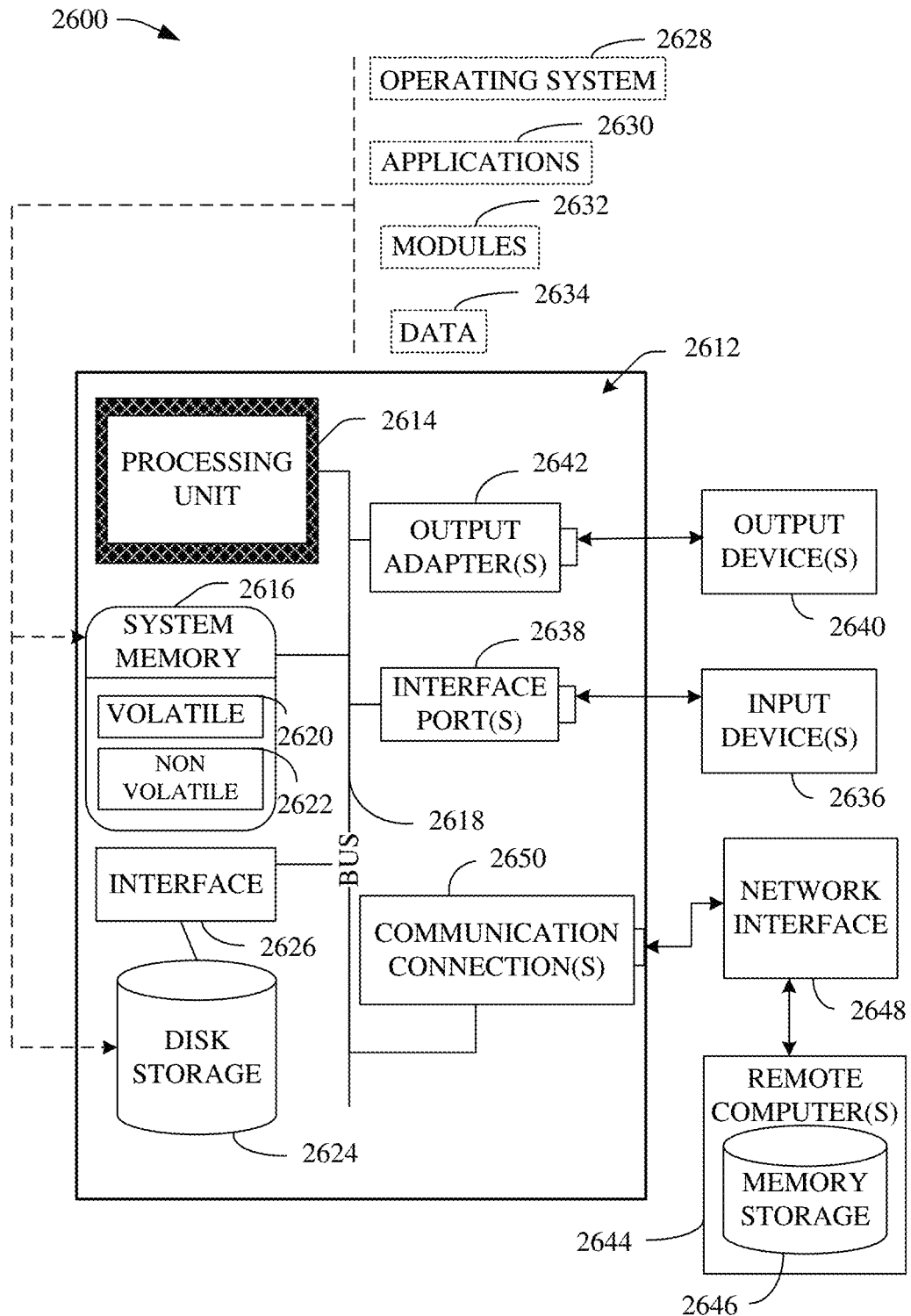
FIG. 26 is a schematic block diagram illustrating a suitable operating environment.
Figure 27:
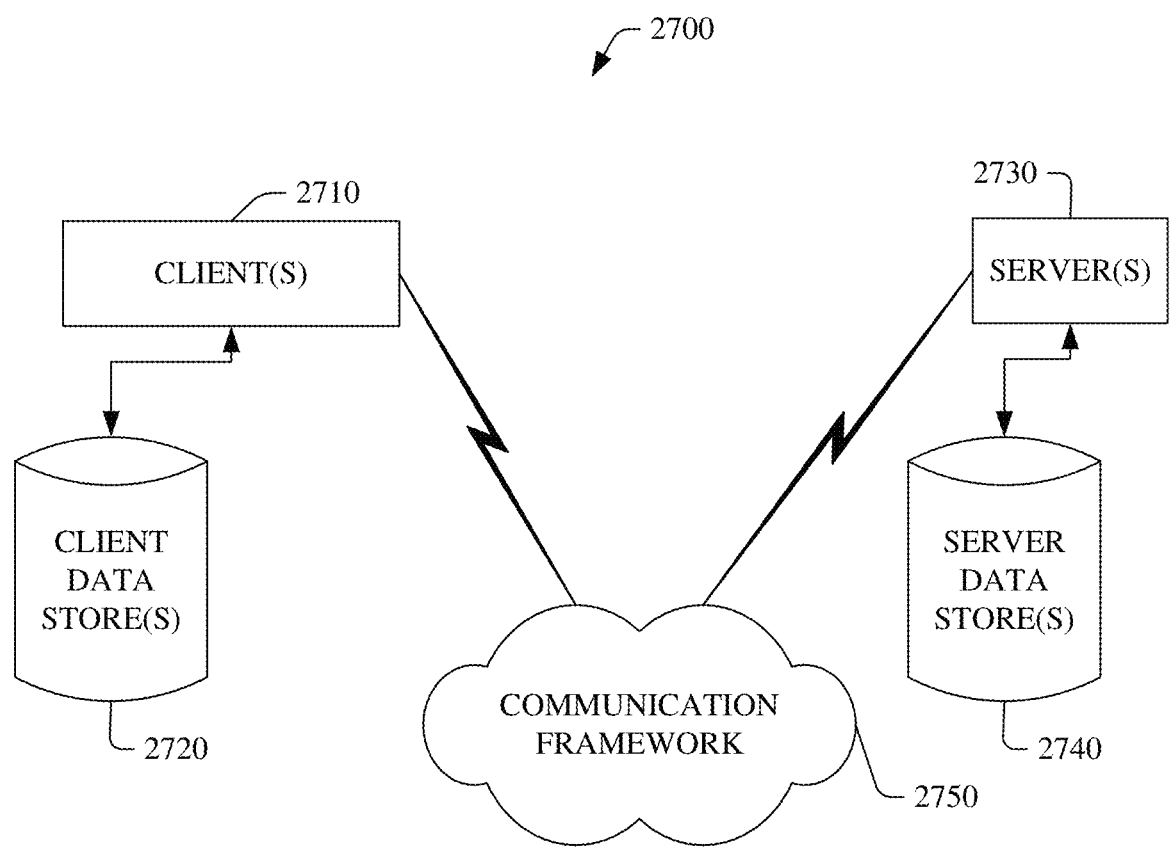
FIG. 27 is a schematic block diagram of a sample-computing environment.

In order to provide a context for the various aspects of the disclosed subject matter, FIGS. 26 and 27 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the subject disclosure also may be implemented in combination with other program modules. Generally, program modules include routines, programs, components, data structures, etc. that perform particular tasks and/or implement particular abstract data types. Moreover, those skilled in the art will appreciate that the methods may be practiced with other computer system configurations, including single-processor or multiprocessor computer systems, mini-computing devices, mainframe computers, as well as personal computers, hand-held computing devices (e.g., a mobile or smart phone, a PDA, an electronic gaming device, or a watch), microprocessor-based or programmable consumer or industrial electronics, and the like. The illustrated aspects may also be practiced in distributed computing environments where tasks are performed by remote processing devices that are linked through a communications network. However, some, if not all aspects of the subject disclosure can be practiced on stand-alone computers. In a distributed computing environment, program modules may be located in both local and remote memory storage devices.

With reference to FIG. 26, a suitable environment 2600 for implementing various aspects of the claimed subject matter includes a computer 2612. The computer 2612 includes a processing unit 2614, a system memory 2616, and a system bus 2618. It is to be appreciated that the computer 2612 can be used in connection with implementing one or more of the systems or components (e.g., sketch generator component, interface component, motion sensor component, camera component, processor component, data store, etc.) shown and/or described in connection with, for example, FIGS. 1-25. The system bus 2618 couples system components including, but not limited to, the system memory 2616 to the processing unit 2614. The processing unit 2614 can be any of various available processors. Dual microprocessors and other multiprocessor architectures also can be employed as the processing unit 2614.

The system bus 2618 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 2616 includes volatile memory 2620 and nonvolatile memory 2622. The basic input/output system (BIOS), containing the basic routines to transfer information between elements within the computer 2612, such as during start-up, is stored in nonvolatile memory 2622. By way of illustration, and not limitation, nonvolatile memory 2622 can include read only memory (ROM), programmable ROM (PROM), electrically programmable ROM (EPROM), electrically erasable programmable ROM (EEPROM), or flash memory. Volatile memory 2620 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 2612 also can include removable/non-removable, volatile/non-volatile computer storage media. FIG. 26 illustrates, for example, a disk storage 2624. Disk storage 2624 includes, but is not limited to, devices like a magnetic disk drive, floppy disk drive, tape drive, Jaz drive, Zip drive, LS-100 drive, flash memory card, or memory stick. In addition, disk storage 2624 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 2624 to the system bus 2618, a removable or non-removable interface is typically used, such as interface 2626).

It is to be appreciated that FIG. 26 describes software that acts as an intermediary between users and the basic computer resources described in the suitable operating environment 2600. Such software includes an operating system 2628. Operating system 2628, which can be stored on disk storage 2624, acts to control and allocate resources of the computer system 2612. System applications 2630 take advantage of the management of resources by operating system 2628 through program modules 2632 and program data 2634 stored either in system memory 2616 or on disk storage 2624. It is to be appreciated that the claimed subject matter can be implemented with various operating systems or combinations of operating systems.

A user enters commands or information into the computer 2612 through input device(s) 2636. Input devices 2636 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 2614 through the system bus 2618 via interface port(s) 2638. Interface port(s) 2638 include, for example, a serial port, a parallel port, a game port, and a universal serial bus (USB). Output device(s) 2640 use some of the same type of ports as input device(s) 2636. Thus, for example, a USB port may be used to provide input to computer 2612, and to output information from computer 2612 to an output device 2640. Output adapter 2642 is provided to illustrate that there are some output devices 2640 like monitors, speakers, and printers, among other output devices 2640, which require special adapters. The output adapters 2642 include, by way of illustration and not limitation, video and sound cards that provide a means of connection between the output device 2640 and the system bus 2618. It should be noted that other devices and/or systems of devices provide both input and output capabilities such as remote computer(s) 2644.

Computer 2612 can operate in a networked environment using logical connections to one or more remote computers, such as remote computer(s) 2644. The remote computer(s) 2644 can be a personal computer, a server, a router, a network PC, a workstation, a microprocessor based appliance, a peer device or other common network node and the like, and typically includes many or all of the elements described relative to computer 2612. For purposes of brevity, only a memory storage device 2646 is illustrated with remote computer(s) 2644. Remote computer(s) 2644 is logically connected to computer 2612 through a network interface 2648 and then physically connected via communication connection 2650. Network interface 2648 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 2650 refers to the hardware/software employed to connect the network interface 2648 to the bus 2618. While communication connection 2650 is shown for illustrative clarity inside computer 2612, it can also be external to computer 2612. The hardware/software necessary for connection to the network interface 2648 includes, for exemplary purposes only, internal and external technologies such as, modems including regular telephone grade modems, cable modems and DSL modems, ISDN adapters, and Ethernet cards.

FIG. 27 is a schematic block diagram of a sample-computing environment 2700 with which the subject disclosure can interact. The system 2700 includes one or more client(s) 2710. The client(s) 2710 can be hardware and/or software (e.g., threads, processes, computing devices). The system 2700 also includes one or more server(s) 2730. Thus, system 2700 can correspond to a two-tier client server model or a multi-tier model (e.g., client, middle tier server, data server), amongst other models. The server(s) 2730 can also be hardware and/or software (e.g., threads, processes, computing devices). The servers 2730 can house threads to perform transformations by employing the subject disclosure, for example. One possible communication between a client 2710 and a server 2730 may be in the form of a data packet transmitted between two or more computer processes.

The system 2700 includes a communication framework 2750 that can be employed to facilitate communications between the client(s) 2710 and the server(s) 2730. The client(s) 2710 are operatively connected to one or more client data store(s) 2720 that can be employed to store information local to the client(s) 2710. Similarly, the server(s) 2730 are operatively connected to one or more server data store(s) 2740 that can be employed to store information local to the servers 2730.

It is to be appreciated and understood that components (e.g., sketch generator component, camera component, motion sensor component, interface component, processor component, data store, etc.), as described with regard to a particular system or method, can include the same or similar functionality as respective components (e.g., respectively named components or similarly named components) as described with regard to other systems or methods disclosed herein.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As utilized herein, terms "component," "system," and the like, can refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein can encompass a computer program accessible from any computer-readable device, carrier, or media. For example, computer readable media can include, but is not limited to, magnetic storage devices (e.g., hard disk, floppy disk, magnetic strips, . . . ), optical disks (e.g., compact disk (CD), digital versatile disk (DVD), . . . ), smart cards, and flash memory devices (e.g., card, stick, key drive, . . . ). Additionally it should be appreciated that a carrier wave can be employed to carry computer-readable electronic data such as those used in transmitting and receiving electronic mail or in accessing a network such as the Internet or a local area network (LAN). As used and defined herein, the term "computer-readable storage device" excludes transitory storage media. Of course, those skilled in the art will recognize many modifications can be made to this configuration without departing from the scope or spirit of the disclosed subject matter.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a graphics processing unit (GPU), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM)). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or methods herein are intended to include, without being limited to including, these and any other suitable types of memory.

Some portions of the detailed description have been presented in terms of algorithms and/or symbolic representations of operations on data bits within a computer memory. These algorithmic descriptions and/or representations are the means employed by those cognizant in the art to effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

What has been described above includes examples of aspects of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has," or "having," or variations thereof, are used in either the detailed description or the claims, such terms are intended to be inclusive in a manner similar to the term "comprising" as "comprising" is interpreted when employed as a transitional word in a claim.

What is claimed is:

1. A mobile device, comprising:
   at least one memory that stores executable components; and
   at least one processor, coupled to the at least one memory, that executes or facilitates execution of the executable components, the executable components comprising:
   a camera component that captures visual content of a real-world environment;
   an interface component that receives drawing information from a user to facilitate generating drawing content in relation to the visual content, wherein a portion of the drawing information facilitates generation of at least one of a surface proxy, a first stroke, a second stroke, or a snapping point associated with the drawing content; and
   a sketch generator component that generates a three-dimensional augmented-reality composite image that integrates the visual content of the real-world environment with the drawing content, wherein the drawing content is generated based at least in part on the drawing information received from the user and at least one of the surface proxy, the first stroke, the second stroke, or the snapping point,
   wherein, while in a mid-air three-dimensional sketching mode, the sketch generator component determines that the user is touching a touch display screen of the interface component to generate the first stroke while the mobile device is being moved from a first location to a second location in a three-dimensional space based at least in part on the portion of the drawing information indicating the user is touching the touch display screen and based at least in part on sensor data indicating that the mobile device is being moved from the first location to the second location, wherein a distance between the first location and the second location is greater than a screen size of the touch display screen, wherein the sketch generator component generates the first stroke that has a length that corresponds to the distance and is larger than the screen size of the touch display screen,
   wherein, while in an absolute drawing mode, the sketch generator component generates the second stroke based at least in part on the drawing information, and wherein the second stroke is limited in size and cannot extend beyond the screen size of the touch display screen due to the sketch generator component being in the absolute drawing mode.

2. The mobile device of claim 1, wherein the visual content comprises three-dimensional visual content, and wherein the drawing content comprises three-dimensional drawing content.

3. The mobile device of claim 1, wherein the portion of the drawing information is a first portion of the drawing information, wherein the sensor data is first sensor data, wherein the surface proxy is a planar surface proxy, wherein the interface component presents a menu comprising a create proxy tool, wherein, in response to determining that selection information indicates a selection of the create proxy tool and in response to determining that a second portion of the drawing information indicates that the planar surface proxy is to be generated, the sketch generator component determines a three-dimensional position and an orientation of the mobile device based at least in part on second sensor data received from at least one of a motion-related sensor or the camera component, and generates the planar surface proxy on the three-dimensional augmented-reality composite image based at least in part on the three-dimensional position and the orientation of the mobile device, and wherein the planar surface proxy corresponds to a plane of the mobile device.

4. The mobile device of claim 1, wherein the portion of the drawing information is a first portion of the drawing information, wherein the surface proxy is a curved surface proxy, wherein the interface component presents a menu comprising a create surface tool, wherein, in response to determining that selection information indicates a selection of the create surface tool and in response to determining that a second portion of the drawing information indicates that the curved surface proxy is to be generated, the sketch generator component generates the curved surface proxy on the three-dimensional augmented-reality composite image based at least in part on a three-dimensional position and an orientation of the mobile device.

5. The mobile device of claim 4, wherein the first stroke is a three-dimensional stroke, and wherein the sketch generator component extrudes the three-dimensional stroke of the three-dimensional augmented-reality composite image as a profile along a straight line or a freeform curve to generate the curved surface proxy.

6. The mobile device of claim 1, wherein the portion of the drawing information is a first portion of the drawing information, wherein the sketch generator component initially renders the surface proxy as a semi-transparent three-dimensional surface, and wherein, in response to a second portion of the drawing information indicating that the surface proxy is to be filled using a defined color, the sketch generator component fills the surface proxy with and renders the surface proxy to comprise the defined color.

7. The mobile device of claim 1, wherein the sketch generator component generates a first content portion of the drawing content using absolute drawing in the absolute drawing mode and a second content portion of the drawing content using relative drawing in a relative drawing mode, based at least in part on respective portions of the drawing information.

8. The mobile device of claim 1, wherein the surface proxy is a three-dimensional surface proxy, wherein the first stroke is a three-dimensional stroke, and wherein the sketch generator component generates the three-dimensional stroke in proximity to the three-dimensional surface proxy, in response to receiving the portion of the drawing information that indicates the three-dimensional stroke is to be generated on the three-dimensional augmented-reality composite image, and modifies the three-dimensional stroke to constrain the three-dimensional stroke to a shape of a second portion of the three-dimensional surface proxy.

9. The mobile device of claim 1, wherein the portion of the drawing information is a first portion of the drawing information, wherein, in response to receiving a second portion of the drawing information that indicates the surface proxy is to be generated on the three-dimensional augmented-reality composite image in proximity to a real object of the real-world environment in the three-dimensional augmented-reality composite image, the sketch generator component detects and determines the three-dimensional plane of the real object and generates the surface proxy to align with the three-dimensional plane of the real object.

10. The mobile device of claim 1, wherein the portion of the drawing information is a first portion of the drawing information, wherein, in response to receiving a second portion of the drawing information indicating the surface proxy is to be generated, the sketch generator component generates the surface proxy in a first three-dimensional position in the three-dimensional augmented-reality composite image based at least in part on a third location and a first orientation of the mobile device, and wherein, in response to receiving a third portion of the drawing information indicating the surface proxy is to be rotated, and, in response to detecting a movement of the mobile device to a fourth location and a second orientation, the sketch generator component rotates the surface proxy to a second three-dimensional position in the three-dimensional augmented-reality composite image based at least in part on the fourth location and the second orientation of the mobile device.

11. The mobile device of claim 1, wherein the portion of the drawing information is a first portion of the drawing information, wherein, in response to receiving a second portion of the drawing information relating to generating a first drawing object of the drawing content, the sketch generator component generates a first version of the first drawing object in a first three-dimensional position in the three-dimensional augmented-reality composite image based at least in part on a third location and a first orientation of the mobile device, and wherein, in response to receiving a third portion of the drawing information that indicates a second version of the first drawing object is to be generated as a clone of the first drawing object, and, in response to detecting a movement of the mobile device to a fourth location and a second orientation, the sketch generator component generates the second version of the first drawing object in a second three-dimensional position in the three-dimensional augmented-reality composite image based at least in part on the fourth location and the second orientation of the mobile device.

12. The mobile device of claim 1, wherein the sketch generator component determines whether the sketch generator component is to be in the mid-air three-dimensional sketching mode or a surface-based two-dimensional sketching mode based at least in part on a determination regarding whether a finger of the user touching the touch display screen of the mobile device is determined to move first before the mobile device is moved or the mobile device is determined to be moving first while the finger of the user is touching the touch display screen.

13. The mobile device of claim 12, wherein the sketch generator component is in the mid-air three-dimensional sketching mode, wherein the portion of the drawing information is received by the sketch generator component by detecting that the user is touching the touch display screen while the mobile device is being moved, wherein, based at least in part on an analysis of the portion of the drawing information and the sensor data relating to the movement of the mobile device, the sketch generator component generates at least one three-dimensional stroke on the three-dimensional augmented-reality composite image, wherein the at least one three-dimensional stroke corresponds to the movement and an orientation of the mobile device in the three-dimensional space of the real-world environment, and wherein the at least one three-dimensional stroke comprises the first stroke.

14. The mobile device of claim 1, wherein the portion of the drawing information is a first portion of the drawing information, wherein the sketch generator component generates the snapping point in a spatial location within the three-dimensional augmented-reality composite image in response to receiving a second portion of the drawing information indicating the snapping point is to be generated in the spatial location.

15. The mobile device of claim 1, wherein the portion of the drawing information is a first portion of the drawing information, wherein the sketch generator component determines a spatial location for the snapping point in the three-dimensional augmented-reality composite image based at least in part on a second portion of the drawing content and the visual content rendered in the three-dimensional augmented-reality composite image and a context associated with the mobile device determined by the sketch generator component, and wherein the sketch generator component presents, on the touch display screen of the mobile device, a recommendation for generation of the snapping point at the spatial location in the three-dimensional augmented-reality composite image.

16. The mobile device of claim 1, wherein the sketch generator component generates the surface proxy comprising respective snapping points in respective locations of the surface proxy, wherein, in response to an end point of the stroke being drawn in proximity to a first snapping point of the respective snapping points at a spatial location within the three-dimensional augmented-reality composite image relative to other spatial locations of other snapping points of the respective snapping points, the sketch generator component snaps the end point of the first stroke to the first snapping point of the surface proxy.

17. The mobile device of claim 1, wherein, in response to the first stroke being drawn to have a first end point of the first stroke determined to be in proximity to a first snapping point of the second stroke and a second end point of the first stroke determined to be in proximity to a second snapping point of a third stroke in the three-dimensional augmented-reality composite image, the sketch generator component snaps the first end point of the first stroke to the first snapping point of the second stroke and snaps the second end point of the first stroke to the second snapping point of the third stroke.

18. The mobile device of claim 1, wherein the portion of the drawing information is a first portion of the drawing information, wherein the surface proxy is a planar surface proxy, wherein, in response to a second portion of the drawing information indicating the surface proxy is to be drawn with respect to the first stroke, the sketch generator component generates the planar surface proxy that passes through two of a first end point, a second end point, a first snapping point, or a second snapping point, associated with the first stroke, and wherein, based at least in part on orientation snapping, the sketch generator component modifies a first orientation of the planar surface proxy to correspond to a second orientation of another surface proxy of the three-dimensional augmented-reality composite image.

19. The mobile device of claim 1, wherein the mobile device comprises at least one of a mobile phone, a smart phone, a wireless phone, an electronic pad, an electronic tablet, a personal digital assistant, or an electronic gaming device.

20. A method, comprising:

capturing, by a mobile device comprising a processor, visual content of a real-world environment;

receiving, by a user interface of the mobile device, input information from a user to facilitate creating drawing content in relation to the visual content, wherein a portion of the input information facilitates creating at least one of a surface proxy, a first stroke, a second stroke, or a snapping point associated with the drawing content;

while in a relative drawing mode:
determining, by the mobile device, that the user is touching a touch display screen of the user interface to generate the stroke while the mobile device is being moved from a first location to a second location in a three-dimensional space based at least in part on the portion of the input information indicating the user is touching the touch display screen and based at least in part on sensor data indicating that the mobile device is being moved from the first location to the second location, wherein a distance between the first location and the second location is longer than dimensions of the touch display screen, and creating, by the mobile device, the first stroke that has a length that corresponds to the distance and is longer than the dimensions of the touch display screen based at least in part on the determining;

while in an absolute drawing mode, creating, by the mobile device, the second stroke based at least in part on the input information, wherein the second stroke is not able to extend beyond the dimensions of the touch display screen based on the absolute drawing mode; and creating, by the mobile device, a three-dimensional augmented-reality sketch that integrates the visual content of the real-world environment with the drawing content, wherein the drawing content is created based at least in part on the input information received from the user and at least one of the surface proxy, the first stroke, the second stroke, or the snapping point.

21. The method of claim 20, wherein the visual content comprises three-dimensional visual content, and wherein the drawing content comprises three-dimensional drawing content.

22. The method of claim 20, wherein the portion of the input information is a first portion of the input information, wherein the sensor data is first sensor data, wherein the surface proxy is a planar surface proxy, and wherein the method further comprises:

presenting, by the user interface of the mobile device, a menu comprising drawing tools including a create proxy tool;

selecting, by the mobile device, the create proxy tool, in response to a second portion of the input information indicating the create proxy tool is to be selected;

determining, by the mobile device, a three-dimensional position and an orientation of the mobile device based at least in part on second sensor data received from at least one of a motion-related sensor or a camera of the mobile device; and creating, by the mobile device, the planar surface proxy in the three-dimensional augmented-reality sketch based at least in part on the three-dimensional position and the orientation of the mobile device, wherein the planar surface proxy corresponds to a plane of the mobile device.

23. The method of claim 20, wherein the portion of the input information is a first portion of the input information, wherein the sensor data is first sensor data, wherein the surface proxy is a curved surface proxy, and wherein the method further comprises:

presenting, by the user interface of the mobile device, a menu comprising drawing tools including a create surface tool;

selecting, by the mobile device, the create surface tool, in response to a second portion of the input information indicating the create surface tool is to be selected;

determining, by the mobile device, a three-dimensional position and an orientation of the mobile device based at least in part on second sensor data received from at least one of a motion-related sensor or a camera of the mobile device; and creating, by the mobile device, the curved surface proxy based at least in part on the three-dimensional position and the orientation of the mobile device.

24. The method of claim 23, wherein the first stroke is a three-dimensional stroke, and wherein the method further comprises:

creating, by the mobile device, the curved surface proxy by extruding the three-dimensional stroke of the three-dimensional augmented-reality composite image as a profile along a straight line or a freeform curve.

25. The method of claim 20, wherein the portion of the input information is a first portion of the input information, wherein the surface proxy is a three-dimensional surface proxy, wherein the first stroke is a three-dimensional stroke, and wherein the method further comprises:

creating, by the mobile device, a first version of the three-dimensional stroke in proximity to the three-dimensional surface proxy, in response to receiving a second portion of the input information that indicates the three-dimensional stroke is to be created on the three-dimensional augmented-reality composite image; and altering, by the mobile device, the first version of the three-dimensional stroke to create a second version of the three-dimensional stroke that is constrained to a shape of a defined part of the three-dimensional surface proxy.

26. The method of claim 20, wherein the portion of the input information is a first portion of the input information, and wherein the method further comprises:

in response to receiving a second portion of the input information indicating the surface proxy is to be created, creating, by the mobile device, the surface proxy in a first three-dimensional position in the three-dimensional augmented-reality sketch based at least in part on a third location and a first orientation of the mobile device; and in response to receiving a third portion of the input information indicating the surface proxy is to be rotated, and, in response to sensing a movement of the mobile device to a fourth location and a second orientation, rotating, by the mobile device, the surface proxy to a second three-dimensional position in the three-dimensional augmented-reality sketch based at least in part on the fourth location and the second orientation of the mobile device.

27. The method of claim 20, wherein the portion of the input information is a first portion of the input information, and wherein the method further comprises:

in response to receiving a second portion of the input information relating to creating a first drawing object of the drawing content, creating, by the mobile device a first version of the first drawing object in a first spatial position in the three-dimensional augmented-reality sketch based at least in part on a third location and a first orientation of the mobile device; and in response to receiving a third portion of the input information that indicates a second version of the first drawing object is to be created as a clone of the first drawing object, and, in response to sensing a movement of the mobile device to a fourth location and a second orientation, creating, by the mobile device, the second version of the first drawing object in a second spatial position in the three-dimensional augmented-reality sketch based at least in part on the fourth location and the second orientation of the mobile device.

28. The method of claim 20, wherein the receiving, by the user interface of the mobile device, the input information comprises receiving, by the touch display screen of the mobile device, the portion of the input information based at least in part on sensing that the user is touching the touch display screen, and wherein the method further comprises:
sensing, by the mobile device, a movement and an orientation of the mobile device as the mobile device is being moved while sensing that the user is touching the touch display screen; and
based at least in part on an analysis of the portion of the input information and sensor data relating to the sensing of the movement and the orientation of the mobile device, creating, by the mobile device, at least one three-dimensional stroke on the three-dimensional augmented-reality sketch, wherein the at least one three-dimensional stroke corresponds to the movement and the orientation of the mobile device in a three-dimensional space of the real-world environment, and wherein the at least one three-dimensional stroke comprises the first stroke.

29. The method of claim 20, wherein the portion of the input information is a first portion of the input information, wherein the snapping point is a first snapping point, and wherein the method further comprises:
determining, by the mobile device, at least one of the first snapping point or a second snapping point based at least in part on a context associated with the three-dimensional augmented-reality sketch or a second portion of the input information relating to creating the first snapping point or the second snapping point, wherein the first snapping point is associated with the second stroke of the three-dimensional augmented-reality sketch and the second snapping point is associated with a third stroke or the surface proxy of the three-dimensional augmented-reality sketch; and
snapping, by the mobile device, at least one of a first end point of the first stroke to the first snapping point or a second end point of the first stroke to the second snapping point.

30. A non-transitory machine-readable medium storing computer-executable instructions that, in response to execution, cause a wireless device comprising a processor to perform operations, comprising:
sensing one or more objects of a real-world environment to facilitate generating three-dimensional visual image information that depicts the one or more objects;
receiving, via an interface of the wireless device, drawing information associated with a user identity to facilitate generating three-dimensional drawing content associated with the three-dimensional visual image information, wherein a portion of the drawing information facilitates generating at least one of a planar surface proxy, a curved surface proxy, a first stroke, a second stroke, or a snapping point associated with the three-dimensional drawing content;
while in a relative drawing mode:
determining, by the wireless device, that a touching of a touch display screen of the interface to generate the first stroke is occurring while the wireless device is moving from a first location to a second location in a three-dimensional space based at least in part on the portion of the drawing information indicating the touching of the touch display screen is occurring and based at least in part on sensor data indicating that the wireless device is moving from the first location to the second location, wherein a distance between the first location and the second location is greater than a size of the touch display screen, and
generating, by the wireless device, the first stroke that has a length that corresponds to the distance and is greater in length than the size of the touch display screen based at least in part on the determining; and
while in an absolute drawing mode, generating, by the wireless device, the second stroke based at least in part on the drawing information, wherein the second stroke is not able to extend beyond the size of the touch display screen based on the absolute drawing mode; and
generating, on a touch display screen of the wireless device, a three-dimensional augmented-reality sketch that incorporates the three-dimensional drawing content with the three-dimensional visual image information depicting the one or more objects of the real-world environment, wherein the three-dimensional drawing content is generated based at least in part on the drawing information and at least one of the planar surface proxy, the curved surface proxy, the first stroke, the second stroke, or the snapping point.

31. The non-transitory machine-readable medium of claim 30, wherein the operations further comprise:
based at least in part on respective portions of the drawing information, comprising the portion of the drawing information:
generating a first content portion of the three-dimensional drawing content using absolute drawing in the absolute drawing mode of the wireless device; and
generating a second content portion of the three-dimensional drawing content using relative drawing in the relative drawing mode of the wireless device.

* * * * *